L 
US011643501B2

United States Patent
Koning et al.

(10) Patent No.: US 11,643,501 B2
(45) Date of Patent: May 9, 2023

(54) OXIDIZING, IONIC AND SHORT OIL ALKYD RESINS FOR COATINGS WITH EXCELLENT BALANCE OF HARDNESS AND GLOSS

(71) Applicant: Covestro (Netherlands) B.V., Geleen (NL)

(72) Inventors: Cornelis Eme Koning, Echt (NL); Adrianus Jozephus Hendricus Lansbergen, Echt (NL); Amyke Veurink, Echt (NL); Bauke De Vries, Echt (NL); Albertus Ronald Hofkamp, Echt (NL); Bas Jacobus Catharina Tuijtelaars, Echt (NL)

(73) Assignee: Covestro (Netherlands) B.V., Geleen (NL)

( * ) Notice: Subject to any disclaimer, the term of this patent is extended or adjusted under 35 U.S.C. 154(b) by 330 days.

(21) Appl. No.: 17/056,258

(22) PCT Filed: Aug. 12, 2019

(86) PCT No.: PCT/EP2019/071556
§ 371 (c)(1),
(2) Date: Nov. 17, 2020

(87) PCT Pub. No.: WO2020/035437
PCT Pub. Date: Feb. 20, 2020

(65) Prior Publication Data
US 2021/0221947 A1    Jul. 22, 2021

(30) Foreign Application Priority Data
Aug. 14, 2018  (EP) ..................... 18188844

(51) Int. Cl.
| | |
|---|---|
| *C08G 63/48* | (2006.01) |
| *C08G 63/688* | (2006.01) |
| *C08L 71/00* | (2006.01) |
| *C09D 167/08* | (2006.01) |
| *C08G 63/672* | (2006.01) |
| *C08L 67/02* | (2006.01) |
| *C08L 67/06* | (2006.01) |
| *C08G 63/676* | (2006.01) |

(52) U.S. Cl.
CPC .......... *C08G 63/48* (2013.01); *C08G 63/672* (2013.01); *C08G 63/676* (2013.01); *C08G 63/6888* (2013.01); *C08L 67/025* (2013.01); *C08L 67/06* (2013.01); *C08L 71/00* (2013.01); *C09D 167/08* (2013.01)

(58) Field of Classification Search
CPC ............... C08G 63/48; C08G 63/6888; C08G 63/672; C08G 63/676; C08L 67/025; C08L 67/06; C08L 71/00; C09D 167/08
See application file for complete search history.

(56) References Cited

U.S. PATENT DOCUMENTS

| | | | |
|---|---|---|---|
| 2,618,616 A | 11/1952 | Tess et al. | |
| 2004/0030031 A1* | 2/2004 | Martin | ............... C09D 201/005 524/502 |
| 2013/0203903 A1* | 8/2013 | Jansen | .................. C09D 167/06 524/98 |

FOREIGN PATENT DOCUMENTS

| | | |
|---|---|---|
| CN | 107163236 | 9/2017 |
| GB | 2 306 489 | 5/1997 |
| WO | 2014/048978 | 4/2014 |

OTHER PUBLICATIONS

International Search Report for PCT/EP2019/071556 dated Sep. 13, 2019, 3 pages.
Written Opinion of the ISA for PCT/EP2019/071556 dated Sep. 13, 2019, 6 pages.

\* cited by examiner

*Primary Examiner* — Robert S Jones, Jr.
(74) *Attorney, Agent, or Firm* — The Webb Law Firm

(57) ABSTRACT

The invention relates to an oxidizing, ionic and short oil alkyd resin. The invention further relates to various compositions comprising the oxidizing, ionic and short oil alkyd resin, cured compositions derived upon curing of said compositions, objects comprising the various cured or uncured compositions as well as various uses of the oxidizing, ionic and short oil alkyd resin, and of the various compositions of the invention as well as of the various objects of the invention.

43 Claims, No Drawings

OXIDIZING, IONIC AND SHORT OIL ALKYD RESINS FOR COATINGS WITH EXCELLENT BALANCE OF HARDNESS AND GLOSS

This application is the U.S. national phase of International Application No. PCT/EP2019/071556 filed Aug. 12, 2019 which designated the U.S. and claims priority to EP Patent Application No. 18188844.7 filed Aug. 14, 2018, the entire contents of each of which are hereby incorporated by reference.

The invention relates to an oxidizing, ionic and short oil alkyd resin. The invention further relates to various compositions comprising the oxidizing, ionic and short oil alkyd resin, cured compositions derived upon curing of said compositions, objects comprising the various cured or uncured compositions as well as various uses of the oxidizing, ionic and short oil alkyd resin, and of the various compositions of the invention as well as of the various objects of the invention.

The alkyd resins (or equally mentioned as 'alkyds' in this specification) constitute a class of polymers that are typically prepared from polyols, dibasic acids and fatty acids. There are many types of alkyd resins. One classification is into oxidizing and nonoxidizing types. Oxidizing alkyd resins crosslink by the same mechanism as drying oils; the crosslink mechanism of drying oils is a complex one since it involves complex chemical reactions which involve (to mention some) peroxy radicals, free radicals, hydrogen abstraction from a methylene group between carbon-carbon double bonds, combination of radicals, hydrogen addition to a conjugated carbon-carbon double bond system, all of them contributing to the establishment of a chain reaction resulting in autoxidation. The crosslink reaction mechanism of the oxidizing alkyd resins (known in the art as 'autoxidation') may be—usually it is—catalysed by the use of 'driers' as these are known in the art of alkyd resins; typical examples of driers are organic metal compounds (as these are defined and disclosed in this specification). Nonoxidizing alkyds are used as polymeric plasticizers or as hydroxy functional resins which are crosslinked by melamine-formaldehyde (MF), or urea-formaldehyde (UF) resins, or by isocyanate crosslinkers. Therefore, oxidizing alkyd resins are very different from the nonoxidizing alkyd resins. A second classification is based on the oil length as the latter is defined in the specification. Alkyd resins with oil lengths greater than 60 are long oil alkyds; those with oil lengths of at least 40 and at most 60 are medium oil alkyds; and those with oil lengths lower than 40 are short oil alkyds. The alkyd resin of the invention is—amongst others—an oxidizing, short oil alkyd resin.

The alkyd resins have been used for years in a variety of applications, mainly though in liquid paints and coatings derived upon curing of said liquid paints. Liquid paints are typically compositions that after application to an article are able to form thin continuous (uncured) films which once cured are transformed into solid films, known in the literature as coatings.

Depending on their end use, coatings may be required to exhibit certain particular properties or property. One of the very desirable properties for a coating to exhibit is hardness determined by König pendulum, known in the literature as König hardness. König hardness ('KH') is indicative of the ability of a coating to resist deformation of its surface; more particularly, a König pendulum makes contact with a coating e.g. a coated panel through two steel balls. König hardness is reported as the time (in seconds) for the swing to be dampened from a certain angle (e.g. 6 to 3° angle) from the perpendicular. Usually, coatings having high König hardness give longer times. High König hardness is very desirable because coatings that exhibit high König hardness have higher resistance to surface deformation and thus resist degradation over longer periods of time; as a result, coatings having high König hardness may have extended life-times and reduced maintenance costs. It is hard to achieve high König hardness since it is a rather complex property. In the context of the present invention and its present description any mentioning to 'hardness' refers to the König hardness as the latter is defined and determined in the specification. The complexity of the task to develop coatings prepared from aqueous coating compositions comprising an aqueous dispersion or an emulsion of oxidizing alkyd resins, having good König hardness becomes ever more complex once one wishes to achieve a good balance between König hardness and gloss. Gloss is an important attribute of a coating's appearance since it influences our overall visual experience. Gloss affects objects by the interaction of incident light with the coating's surface and observer and depends on variables such as illumination angle, surface profile and observation conditions. For many coated objects gloss can play an important part in their visual acceptability and overall aesthetic result. Coatings possessing a good balance between KH and gloss are highly desired since they present significant advantages such as enhanced visual acceptability in combination with less maintenance and good resistance to the elements e.g. water/rain. In the context of the present invention and its present description any mentioning to 'gloss' refers to the gloss20° as the latter is defined and determined in the specification.

The alkyd resins tend to be lower in cost than most of other resins and tend to give coatings that exhibit fewer film defects. However, when it comes to other highly desirable film properties such as the combination of hardness and gloss, alkyd resins tend to give coatings which underperform. In other words, such coatings they suffer from exhibiting a good balance between hardness and gloss.

The complexity of the task to develop coatings prepared from aqueous coating compositions comprising an aqueous dispersion or an emulsion of oxidizing alkyd resins, combining good König hardness and a good balance between König hardness and gloss becomes ever more complex once one wishes to achieve this by aqueous coating compositions comprising a stable aqueous dispersion or a stable emulsion of oxidizing alkyd resins. The stability of an aqueous dispersion or an emulsion of oxidizing alkyd resins is desirable since it provides for enhanced storage stability without a change in the properties of the aqueous dispersion or of the emulsion during the storage time of the aqueous dispersion or of the emulsion.

The provision of coatings—derived from aqueous coating compositions comprising a stable aqueous dispersion or a stable emulsion of oxidizing alkyd resins—having at least a good balance of hardness and gloss that would enhance the visual acceptability of said coatings in combination with less maintenance and good resistance to the elements e.g. water/rain, is an unmet need for many years.

Therefore, there is an unmet need and a desire for coatings which are prepared from aqueous coating compositions comprising a stable aqueous dispersion or a stable emulsion of oxidizing alkyd resins, the coatings having an excellent balance of König hardness (KH) and gloss20° with the proviso that the coatings maintain also a good König hardness and a gloss20° of at least 5.

None of the GB 2306489 A, WO 2014/048978 A2, CN 107163236 A and U.S. Pat. No. 2,618,616 A dealt with the provision of coatings which are prepared from aqueous coating compositions comprising a stable aqueous dispersion or a stable emulsion of oxidizing alkyd resins, the coatings having an excellent balance of König hardness (KH) and gloss20° with the proviso that the coatings maintain also a good König hardness and a gloss20° of at least 5. In addition, at the time of the presently claimed invention none of the GB 2306489 A, WO 2014/048978 A2, CN 107163236 A and U.S. Pat. No. 2,618,616 A advanced a solution to the provision of coatings which are prepared from aqueous coating compositions comprising a stable aqueous dispersion or a stable emulsion of oxidizing alkyd resins, the coatings having an excellent balance of König hardness (KH) and gloss20° with the proviso that the coatings maintain also a good König hardness and a gloss20° of at least 5, as claimed in this specification.

It is therefore the object of the invention to provide for coatings which are prepared from aqueous coating compositions comprising a stable aqueous dispersion or a stable emulsion of oxidizing alkyd resins, the coatings having at least an excellent balance of König hardness (KH) and gloss20° with the proviso that the coatings maintain also a good König hardness and a gloss20° of at least 5.

It was surprisingly found that the object of the invention was achieved by an oxidizing, ionic and short oil alkyd resin (OSAR) as disclosed in the specification. The coatings prepared from aqueous coating compositions comprising a surprisingly stable aqueous dispersion or a surprisingly stable emulsion of the OSAR of the invention, had surprisingly an excellent balance of König hardness (KH) and gloss20° and at the same time surprisingly maintained also a good KH and a gloss20° of at least 5.

Broadly in accordance with the invention, there is provided an oxidizing, ionic and short oil alkyd resin (OSAR) as disclosed in the specification.

Broadly in accordance with the invention, there is provided a process for making an OSAR, as said process is disclosed in the specification.

Broadly in accordance with the invention, there is provided a composition C, as disclosed in the specification.

Broadly in accordance with the invention, there is provided a Binder-C as disclosed in the specification.

Broadly in accordance with the invention, there is provided a liquid composition LC, as disclosed in the specification.

Broadly in accordance with the invention, there is provided a Binder-LC as disclosed in the specification.

Broadly in accordance with the invention, there is provided a cured composition (CR-C) as disclosed in the specification.

Broadly in accordance with the invention, there is provided a cured composition (CR-LC) as disclosed in the specification.

Broadly in accordance with the invention, there is provided an object or a kit-of parts as disclosed in the specification.

Broadly in accordance with the invention, there are provided various uses as disclosed in the specification.

Broadly in accordance with the invention, there are provided various processes as disclosed in the specification.

Broadly in accordance with the invention there is provided a process for making paints, coatings, polishes, varnishes, inks, adhesives, pastes, compositions suitable for 3D-printing, 3D-printed objects, objects for automotive applications, objects for marine applications, objects for aerospace applications, objects for medical applications, objects for defense applications, objects for sports/recreational applications, objects for architectural applications, objects for bottling applications, objects for household applications, objects for machinery applications, objects for can applications, objects for coil applications, objects for energy applications, objects for textile applications, objects for electrical applications, objects for building and construction applications, objects for packaging applications, objects for telecommunications, and consumer goods, using one or any combination of a) to f):
  a) an OSAR as disclosed in the specification,
  b) a C as disclosed in the specification,
  c) a LC as disclosed in the specification,
  d) a CR-C as disclosed in the specification,
  e) a CR-LC as disclosed in the specification, and
  f) an object or a kit-of-parts as disclosed in the specification.

Broadly in accordance with the invention there is provided a process for making objects having an excellent balance of König hardness and gloss20°, using one or any combination of a) to e):
  a) an OSAR as disclosed in the specification,
  b) a C as disclosed in the specification,
  c) a LC as disclosed in the specification,
  d) a CR-C as disclosed in the specification,
  e) a CR-LC as disclosed in the specification.

Broadly in accordance with the invention there is provided a use of one or any combination of a) to f):
  a) an OSAR as disclosed in the specification,
  b) a C as disclosed in the specification,
  c) a LC as disclosed in the specification,
  d) a CR-C as disclosed in the specification,
  e) a CR-LC as disclosed in the specification, and
  f) an object or a kit-of-parts as disclosed in the specification,
  in paints, coatings, polishes, varnishes, inks, adhesives, pastes, compositions suitable for 3D-printing, 3D-printed objects, automotive applications, marine applications, aerospace applications, medical applications, defense applications, sports/recreational applications, architectural applications, bottling applications, household applications, machinery applications, can applications, coil applications, energy applications, textile applications, electrical applications, building and construction applications, packaging applications, telecommunications, and consumer goods.

Broadly in accordance of the invention there is provided a use of one or any combination of a) to e):
  a) an OSAR as disclosed in the specification,
  b) a C as disclosed in the specification,
  c) a LC as disclosed in the specification,
  d) a CR-C as disclosed in the specification,
  e) a CR-LC as disclosed in the specification,
  for achieving an excellent balance of König hardness and gloss20°.

The following paragraphs A1 to A42 constitute certain explicit preferments of their relevant subject-matter. Many other variations, combinations or embodiments of the invention will be apparent to those skilled in the art and such variations, combinations and embodiments are contemplated within the scope of the claimed invention.

A1 Broadly in accordance with the invention there is provided an oxidizing, ionic and short oil alkyd resin (OSAR) comprising one or both of: i) conjugated ethylenic unsaturations, and ii) diallylic ethylenic unsaturations, and wherein the OSAR has:

an acid value as determined titrimetrically by ISO 2114 of at most 20, preferably at most 10, more preferably at most 5 mg KOH/g, and a $M_{n\text{-}OSAR}$ as determined by Gel Permeation Chromatography (GPC) according to the description, of at least 1500 and at most 10000, preferably at least 2000 and at most 8000, more preferably at least 2500 and at most 7000, most preferably at least 3000 and at most 6000 Da, and a $M_{w\text{-}OSAR}$ as determined by GPC according to the description of at least 20000 and at most 400000, preferably at least 22000 and at most 200000, more preferably at least 25000 and at most 100000, most preferably at least 28000 and at most 80000, especially at least 30000 and at most 60000 Da, and a polydispersity ($D=M_{w\text{-}OSAR}/M_{n\text{-}OSAR}$) of at least 5 and at most 100, preferably at least 6 and at most 80, more preferably at least 7 and at most 60, most preferably at least 8 and at most 40, especially at least 8 and at most 35, more especially at least 10 and at most 35, and an oil length of at least 18 and at most 38, preferably at least 20 and at most 36, more preferably at least 22 and at most 35, even more preferably at least 24 and at most 35, most preferably at least 24 and at most 34, especially at least 26 and at most 34%, for example at least 18 and at most 36, for example at least 18 and at most 35, for example at least 18 and at most 34, for example at least 22 and at most 36, for example at least 22 and at most 35, for example at least 22 and at most 34%, and wherein the OSAR is the reaction—preferably polycondensation reaction—product of at least the following components POC, PAC, MAC, FAC, IOC, and PALC as each of them is defined below (preferably the OSAR is the reaction—preferably polycondensation reaction—product of the following components POC, PAC, MAC, FAC, IOC, and PALC), and wherein the OSAR comprises polycondensed residues of at least the following components POC, PAC, MAC, FAC, IOC, and PALC (preferably the OSAR consists of the polycondensed residues of the following components POC, PAC, MAC, FAC, IOC, and PALC):

a polyol component (POC) selected from the group consisting of trialcohols, tetralcohols, pentalcohols, hexalcohols and mixtures thereof, preferably from the group consisting of trialcohols, tetralcohols, hexalcohols and mixtures thereof, preferably from the group consisting of glycerol, trimethylolpropane, pentaerythritol, dipentaerythritol, and mixtures thereof, more preferably the POC is pentaerythritol, and wherein each of the trialcohols, tetralcohols, pentalcohols, and hexalcohols has a theoretical molecular weight of at most 400, preferably at most 350, more preferably at most 300, even more preferably at most 250, most preferably at most 200, especially at most 150 Da, and wherein the amount of the polycondensed residue of POC in the OSAR is at least 10 and at most 35, preferably at least 15 and at most 33, more preferably at least 20 and at most 30 mol %, and a polycarboxylic acid component (PAC) selected from the group consisting of $C_8\text{-}C_{12}$ cycloaliphatic polycarboxylic acids, $C_8\text{-}C_{12}$ cycloaliphatic polycarboxylic acid anhydrides, $C_{10}\text{-}C_{16}$ esters of cycloaliphatic polycarboxylic acids, $C_8\text{-}C_{12}$ aromatic polycarboxylic acids, $C_8\text{-}C_{12}$ aromatic polycarboxylic acid anhydrides, $C_{10}\text{-}C_{16}$ esters of aromatic polycarboxylic acids, and mixtures thereof, and wherein the amount of the polycondensed residue of PAC in the OSAR is at least 10 and at most 30, preferably at least 12 and at most 28, more preferably at least 15 and at most 25 mol %, and a monocarboxylic acid component (MAC) selected from the group consisting of $C_7\text{-}C_{11}$ aromatic monocarboxylic acids, $C_8\text{-}C_{13}$ esters of aromatic monocarboxylic acids, $C_7\text{-}C_{11}$ saturated cycloaliphatic monocarboxylic acids, $C_8\text{-}C_{13}$ esters of saturated cycloaliphatic monocarboxylic acids, and mixtures thereof, and wherein the amount of the polycondensed residue of MAC in the OSAR is at least 20 and at most 50, preferably at least 25 and at most 45, more preferably at least 30 and at most 40 mol %, and a fatty acid component (FAC) selected from the group consisting of fatty acids and mixtures thereof, and wherein the FAC comprises ethylenic unsaturations and has an iodine number (ION) as determined by DIN 53241-1, of at least 15 and at most 300, more preferably of at least 20 to at most 250, more preferably of at least 25 and at most 225, even more preferably of at least 30 and at most 200, most preferably of at least 40 and at most 200, especially of at least 50 and at most 200, more especially at least 80 and at most 200, even more especially at least 100 and at most 200 cg/g, and wherein the amount of the polycondensed residue of FAC in the OSAR is at least 1 and at most 30, preferably at least 2 and at most 28, more preferably at least 5 and at most 26, most preferably at least 10 and at most 25, especially at least 15 and at most 24, more especially at least 18 and at most 23 mol %, an ionic component (IOC) selected from the group consisting of aromatic monocarboxylic acid sulfonate salts, aromatic monocarboxylic acid alkyl ester sulfonate salts, aromatic dicarboxylic acid sulfonate salts, aromatic dialkyl ester sulfonate salts, and mixtures thereof, preferably aromatic dicarboxylic acid alkali metal sulfonate salts, aromatic dialkyl ester alkali metal sulfonate salts, more preferably aromatic dicarboxylic acid sodium sulfonate salts, aromatic dialkyl ester sodium sulfonate salts, aromatic dicarboxylic acid potassium sulfonate salts, aromatic dialkyl ester potassium sulfonate salts, most preferably the ionic component is selected from the group consisting of 5-(sulfo) isophthalic acid sodium salt, 5-(sulfo)isophthalic acid lithium salt, and mixtures thereof, especially the IOC is 5-(sulfo)isophthalic acid sodium salt, and wherein the amount of the polycondensed residue of IOC in the OSAR is at least 1.2 and at most 3, preferably at least 1.5 and at most 2.5, more preferably at least 1.8 and at most 2.2 mol %, and a polyalkylene component (PALC) selected from the group consisting of:

i) polyalkylene glycols A1 according to formula A1 (PG-A1)

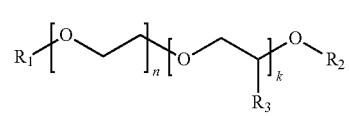

(formula A1)

wherein n is an integer of at least 1 and at most 200, and k is an integer of at least 0 and at most 50, and $R_1$ is either H or $CH_3$, and $R_2$ is selected from the group consisting of H, $CH_3$, and $C_2$-$C_{10}$ optionally substituted hydrocarbyl having at most three substituents each of which is a hydroxyl group, and $R_3$ is $CH_3$, or a $C_2$-$C_{10}$ hydrocarbyl, and wherein the formula A1 has at least one and at most four, preferably has at least two and at most three hydroxyl groups, ii) polyalkylene glycols A2 according to formula A2 (PG-A2),

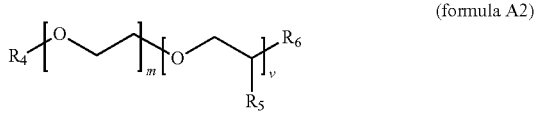

(formula A2)

wherein m is an integer of at least 1 and at most 100, and v is an integer of at least 0 and at most 40, and $R_4$ is either H or $CH_3$, and $R_5$ is $CH_3$, or a $C_2$-$C_{10}$ hydrocarbyl, and $R_6$ is selected from the group consisting of H, $CH_3$, and $C_2$-$C_{10}$ optionally substituted hydrocarbyl having at most four substituents selected from the group consisting of hydroxyl and amino groups and at least one of them—preferably two—is a hydroxyl group, and wherein the formula A2 has at least one and at most four, preferably at least two and at most three hydroxyl groups, iii) polyether amines A1 according to formula PE1 (PE-A1),

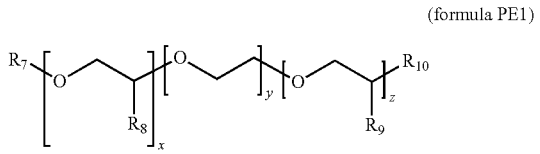

(formula PE1)

wherein x ranges from 0 up to and including 30, and y ranges from 1 up to and including 100, and z ranges from 0 up to and including 30 when x is different than 0, and from 1 up to and including 40 when x is 0, and $R_7$ is selected from the group consisting of $CH_3$, and $C_2$-$C_{10}$ optionally substituted hydrocarbyl (preferably $C_2$-$C_5$ optionally substituted hydrocarbyl, more preferably $C_3$ optionally substituted hydrocarbyl) having at most two substituents each of which is an amino group, preferably the $C_2$-$C_{10}$ optionally substituted hydrocarbyl (preferably $C_2$-$C_6$ optionally substituted hydrocarbyl, more preferably $C_3$ optionally substituted hydrocarbyl) has one amino group as substituent, and $R_8$ is $CH_3$, or a $C_2$-$C_{10}$ hydrocarbyl, preferably $CH_3$, and $R_9$ is $CH_3$, or a $C_2$-$C_{10}$ hydrocarbyl, preferably $CH_3$, and $R_{10}$ is $NH_2$, and iv) mixtures thereof, preferably from the group consisting of PG-A1, PE-A1 and mixtures thereof, more preferably the PALC is selected from the group consisting of PG-A1 and mixtures thereof, and wherein each of the PG-A1, PG-A2 and PE-A1 has a theoretical molecular weight of at least 500 and at most 5000, preferably at least 600 and at most 4000, more preferably at least 700 and at most 3000, even more preferably at least 800 and at most 2000, most preferably at least 900 and at most 1600 Da, and wherein the amount of the polycondensed residue of PALC in the OSAR is at least 0.01 and at most 1, preferably at least 0.02 and at most 0.9, more preferably at least 0.03 and at most 0.8, even more preferably at least 0.04 and at most 0.7 mol %, and wherein the sum ($S_1$) of the amounts in mol % of the polycondensed residues of MAC, FAC, IOC and PALC components ($S_1$=$MAC_{mol\ \%}$+$FAC_{mol\ \%}$+$IOC_{mol\ \%}$+$PALC_{mol\ \%}$) in the OSAR, is at least 40 and at most 70, preferably at least 45 and at most 65, more preferably at least 50 and at most 60 mol %, and wherein the ratio ($R_1$) of the amount of the polycondensed residue of MAC in mol % ($MAC_{mol\ \%}$) to the amount of the polycondensed residue of FAC in mol % ($FAC_{mol\ \%}$) ($R_1$=$MAC_{mol\ \%}$/$FAC_{mol\ \%}$) in the OSAR is at least 1 and at most 5, preferably at least 2 and at most 4, and wherein the ratio ($R_2$) of the sum of the amounts in mol % of the polycondensed residues of 100 and PALC components ($IOC_{mol\ \%}$ and $PALC_{mol\ \%}$, respectively) to the amount of the polycondensed residue of FAC in mol % ($R_2$=($IOC_{mol\ \%}$+$PALCmol\ \%$)/$FAC_{mol\ \%}$) in the OSAR, is at least 0.1 and at most 0.5, and wherein the ratio ($R_3$) of the sum of the amounts in mol % of the polycondensed residues of PAC and MAC components to the amount of the polycondensed residue of PALC in mol % ($R_3$=($PAC_{mol\ \%}$+$MAC_{mol\ \%}$)/$PALC_{mol\ \%}$) in the OSAR, is at least 150, and at most 1500, preferably is at least 150 and at most 1000, more preferably is at least 150 and at most 800, even more preferably is at least 150 and at most 500, most preferably is at least 150 and at most 400, especially is at least 150 and at most 300, more especially is at least 150 and at most 250, most especially is at least 150 and at most 200, and wherein the mol % is based on the OSAR.

A2 The OSAR according to claim 1.

A3 The OSAR according to any one of the claims directed to the OSAR.

A4 The OSAR as disclosed in the section 1 (including its subsections 1.1 to 1.7).

A5 The OSAR as disclosed in the specification.

A6 The OSAR according to any one of paragraphs A1 to A5 wherein the POC is selected from the group consisting of trialcohols, hexalcohols and mixtures thereof, preferably from the group consisting of glycerol, trimethylolpropane, pentaerythritol, dipentaerythritol, and mixtures thereof, more preferably the POC is pentaerythritol.

A7 The OSAR according to any one of paragraphs A1 to A6, wherein the PAC is selected from the group consisting of $C_8$-$C_{12}$ cycloaliphatic polycarboxylic acids, $C_8$-$C_{12}$ cycloaliphatic polycarboxylic acid anhydrides, $C_8$-$C_{12}$ aromatic polycarboxylic acids, $C_8$-$C_{12}$ aromatic polycarboxylic acid anhydrides, and mixtures thereof, preferably from the group consisting of isophthalic acid, terephthalic acid, phthalic acid, phthalic acid anhydride, pyromellitic anhydride, tetrahydrophthalic anhydride, hexahydrophthalic anhydride, and mixtures thereof, more preferably from the group consisting of isophthalic acid, terephthalic acid, phthalic acid, phthalic acid anhydride, tetrahydrophthalic anhydride, hexahydrophthalic anhydride, even more preferably the PAC is phthalic acid anhydride.

A8 The OSAR according to any one of paragraphs A1 to A7, wherein the MAC is selected from the group consisting of $C_7$-$C_{11}$ aromatic monocarboxylic acids, $C_5$-$C_9$ saturated monocarboxylic acids, and mixtures thereof, preferably from the group consisting of $C_7$-$C_{11}$ aromatic monocarboxylic acids, $C_5$-$C_9$ saturated cycloaliphatic monocarboxylic acids, and mixtures thereof, even more preferably the MAC is benzoic acid.

A9 The OSAR according to any one of paragraphs A1 to A8, wherein the FAC is selected from the group consisting of soybean oil fatty acids, sunflower oil fatty acids, tall oil fatty acids, linseed oil fatty acids, dehydrated castor oil fatty acids, cottonseed oil fatty acids, corn oil fatty acids, tung oil fatty acids, calendula oil fatty acids, safflower oil fatty acids, hemp oil fatty acids and mixtures thereof, preferably from the group consisting of soybean oil fatty acids, sunflower oil fatty acids, tall oil fatty acids, linseed oil fatty acids, dehydrated castor oil fatty acids and mixtures thereof, more preferably from the group consisting of tall oil fatty acids, soybean oil fatty acids and mixtures thereof.

A10 The OSAR according to any one of paragraphs A1 to A9, wherein the IOO is selected from the group consisting of aromatic dicarboxylic acid sulfonate salts, preferably from the group consisting of aromatic dicarboxylic acid alkali metal sulfonate salts, even more preferably from the group consisting of 5-(sulfo)isophthalic acid sodium salt, 5-(sulfo) isophthalic acid lithium salt and mixtures thereof, most preferably the IOO is 5-(sulfo)isophthalic acid sodium salt.

A11 The OSAR according to any one of paragraphs A1 to A10, wherein The PALC is selected from the group consisting of PG-A1, PE-A1 and mixtures thereof, preferably from the group consisting of PG-A1, PG-A2, and mixtures thereof, more preferably from the group consisting of PG-A1 and mixtures thereof, even more preferably from the group consisting of polyethylene glycols, the Ymer™ N120 (which is a polyalkylene glycol having the formula shown for the Ymer™ N120), and mixtures thereof.

A12 The OSAR according to any one of paragraphs A1 to A11, wherein the OSAR is substantially-free—preferably free—of one or any combination of i) to vii): i) polycondensed residues of silanols e.g. siloxane groups, ii) polycondensed residues of $C_3$-$C_4$ unsaturated monocarboxylic acids, iii) polycondensed residues of $C_3$-$C_4$ saturated monocarboxylic acids, iv) reacted residue of an acrylic resin, v) reacted residue of a polyurethane resin, vi) reacted residue of a urethane alkyd (uralkyd), and vii) reacted residue of a polysiloxane.

A13 The OSAR according to any one of paragraphs A1 to A12, wherein the OSAR has:
  an acid value of at most 10, preferably 5 mg KOH/g, and
  a $M_{n\_OSAR}$ of at least 2000 and at most 7000 Da, and
  a $M_{w\_OSAR}$ of at least 25000 and at most 80000 Da, and
  a D of at least 10 and at most 35, and
  an oil length of at least 24 and at most 35%,
  and wherein
    the POC is selected from the group consisting of glycerol, trimethylolpropane, pentaerythritol, dipentaerythritol, and mixtures thereof, and wherein the amount of the polycondensed residue of POC in the OSAR is at least 20 and at most 30 mol %, and
  the PAC is selected from the group consisting of isophthalic acid, terephthalic acid, phthalic acid, phthalic acid anhydride, tetrahydrophthalic anhydride, hexahydrophthalic anhydride, and wherein the amount of the polycondensed residue of PAC in the OSAR is at least 15 and at most 25, mol %, and
  the MAC is selected from the group consisting of $C_7$-$C_{11}$ aromatic monocarboxylic acids, $C_5$-$C_9$ saturated cycloaliphatic monocarboxylic acids, and mixtures thereof, and wherein the amount of the polycondensed residue of MAC in the OSAR is at least 30 and at most 40 mol %, and
  the FAC has an ION of at least 80 and at most 200 cg/g, and wherein the amount of the polycondensed residue of FAC in the OSAR is least 12 and at most 18 mol %, and
  the IOC is selected from the group consisting of 5-(sulfo)isophthalic acid sodium salt, 5-(sulfo)isophthalic acid lithium salt and mixtures thereof, and wherein the amount of the polycondensed residue of IOC in the OSAR is at least 1.8 and at most 2.2 mol %, and
  the PALC is selected from the group consisting of:
  i) polyalkylene glycols A1 according to formula A1 (PG-A1) wherein
    n is an integer of at least 1 and at most 100, and
    k is an integer of at least 0 and at most 10, and
    $R_1$ is either H or $CH_3$, and
    $R_2$ is selected from the group consisting of H, $CH_3$, and $C_2$-$C_{10}$ optionally substituted hydrocarbyl having at most two substituents each of which is a hydroxyl group, and
    $R_3$ is $CH_3$, or a $C_2$-$C_{10}$ hydrocarbyl, and
    wherein the formula A1 has at least one and at most three, preferably has two hydroxyl groups,
  ii) polyalkylene glycols A2 according to formula A2 (PG-A2), wherein
    m is an integer of at least 1 and at most 50, and
    v is an integer of at least 0 and at most 20, and
    $R_4$ is either H or $CH_3$, and
    $R_5$ is $CH_3$, or a $C_2$-$C_{10}$ hydrocarbyl, and
    $R_6$ is selected from the group consisting of H, $CH_3$, and $C_2$-$C_6$ optionally substituted hydrocarbyl having at most three substituents selected from the group consisting of hydroxyl and amino groups and at least one of them—preferably two—is a hydroxyl group, and
    wherein the formula A2 has at least one and at most three, preferably at least one and at most two hydroxyl groups,
  iii) mixtures thereof,
  and wherein
  each of the PG-A1 and PG-A2 has a theoretical molecular weight of at least 800 and at most 2000 Da,
  and wherein the amount of the polycondensed residue of PALC in the OSAR is at least 0.2 and at most 0.4 mol %,
  and wherein
    the S1 is at least 50 and at most 60 mol %,
  and wherein
    the $R_1$ is at least 2 and at most 4, and wherein
the R2 is at least 0.1, and at most 0.5, preferably at least 0.1 and at most 0.3,
and wherein
the R3 is at least 150 and at most 500.

A14 The OSAR according to any one of paragraphs A1 to A13, wherein at least some of the functional groups of the OSAR are neutralized with any one or a combination of an organic base, an inorganic base, and an emulsifying agent.

A15 The OSAR according to any one of A1 to A14, wherein the OSAR further comprises reacted residues of:
an epoxy component (EOC) selected from the group consisting of monoepoxides, diepoxides and mixtures thereof, and wherein each of the monoepoxides and diepoxides has an epoxy equivalent weight (EEW) determined titrimetrically according to ISO-3001, of at least 100 and at most 1000, preferably at least 150 and at most 800, more preferably at least 180 and at most 600, even more preferably at least 200 and at most 400 g/eq, and wherein the amount of reacted residue of EOC in the OSAR is in an amount of at least 0.1 and at most 5, preferably at least 0.2 and at most 4.5, more preferably at least 0.5 and at most 4, even more preferably at least 0.8 and at most 3.5, most preferably at least 1 and at most 3 mol %, wherein said reacted residues of the EOC are derived upon the reaction of the EOC with a carboxylic acid group of the OSAR forming a hydroxy ester group.

A16 The OSAR according to paragraph A15, wherein the EOC is selected from the group consisting of monoepoxides and mixtures thereof, more preferably from the group consisting of glycidyl neodecanoate, glycidyl isobutyl ether, glycidyl octyl ether, and mixtures thereof.

A17 The OSAR according to any one of paragraphs A1 to A1, wherein the OSAR is substantially-free—preferably free—of reacted residues of one or any combination of i) to iii): i) a monoepoxide, ii) a diepoxide and iii) a polyepoxide.

A18 Broadly in accordance with the invention there is provided a composition (C)—preferably solid or liquid—comprising: i) a Binder-C selected from the group consisting of an OSAR according to any one of paragraphs A1 to A17, and a mixture of an OSAR according to any one of paragraphs A1 to A17 with an oxidizing alkyd resin other than the OSAR, and ii) a drier—preferably an organic metal compound including its preferments—, preferably in an amount of at least 0.001 and at most 5, more preferably at least 0.1 and at most 4, even more preferably at least 0.2 and at most 3, especially at least 0.5 and at most 2, more especially at least 0.8 and at most 1.5 pph Binder-LC, wherein preferably the drier—preferably an organic metal compound including its preferments—, is soluble in the OSAR, more preferably the drier—preferably an organic metal compound including its preferments—is soluble in the OSAR and in the C.

A19 The C according to any one of the claims directed to the C.

A20 The C as disclosed in the section 2.

A21 The C as disclosed in the specification.

A22 The C according to any one of the paragraphs A18 to A21, wherein the C is substantially-free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond, preferably, the composition is free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond.

A23 Broadly in accordance with the invention there is provided a liquid composition (LC) comprising: i) a Binder-LC selected from the group consisting of an OSAR according to any one of paragraphs A1 to A17, and a mixture of an OSAR according to any one of paragraphs A1 to A17 with an oxidizing alkyd resin other than the OSAR, and ii) one or both of water and an organic solvent.

A24 The LC according to any one of the claims directed to the LC.

A25 The LC as disclosed in the section 3.

A26 The LC as disclosed in the specification.

A27 The LC according to any one of paragraphs A23 to A26, wherein the LC is a water-borne composition.

A28 The LC according to any one of paragraphs A23 to A26, wherein the LC is an aqueous dispersion or an emulsion.

A29 The LC according to any one of paragraphs A23 to A28, wherein the LC is substantially-free of one or both of an organic base and an emulsifying agent, more preferably the LC is free of an organic base and an emulsifying agent.

A30 The LC according to any one of paragraphs A23 to A29, wherein the LC is substantially-free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond, preferably, the liquid composition is free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond.

A31 The LC according to any one of paragraphs A23 to A30, wherein the LC further comprises: iii) a drier—preferably an organic metal compound including its preferments—, preferably in an amount of at least 0.001 and at most 5, more preferably at least 0.1 and at most 4, even more preferably at least 0.2 and at most 3, especially at least 0.5 and at most 2, more especially at least 0.8 and at most 1.5 pph Binder-LC, wherein preferably the drier—preferably an organic metal compound including its preferments—is soluble in the OSAR, more preferably the drier—preferably an organic metal compound including its preferments—is soluble in the OSAR and in the LC.

A32 The LC according to any one of paragraphs A23 to A26, wherein the LC is a solvent-borne composition.

A33 The LC according to any one of paragraphs A23 to A32, wherein the LC is a liquid coating composition.

A34 The LC according to any one of paragraphs A23 to A31, wherein the LC is an aqueous coating composition.

A35 Broadly in accordance with the invention there is provided a cured composition (CR-C) obtained upon curing of a composition (C) according to any one of paragraphs A18 to A22.

A36 The CR-C as disclosed in the specification.

A37 Broadly in accordance with the invention there is provided a cured composition (CR-LC) obtained upon curing of a liquid composition (LC) according to any one of paragraphs A23 to A34.

A38 The CR-LC as disclosed in the specification.

A39 The cured composition as disclosed in any one of paragraphs A35 to A38, wherein the cured composition is a film or a coating, preferably a coating.

A40 Broadly in accordance with the invention there is provided an object or a kit-of-parts comprising:
  i) an article, and
  ii) one or any combination of: an OSAR according to any one of paragraphs A1 to A17, a composition (C) according to any one of paragraphs A18 to A22, a liquid composition (LC) according to any one paragraphs A23 to A34, a cured composition (CR-C) according to any one of paragraphs A35, A36 and A39, and a cured composition (CR-LC) according to any one of paragraphs A37 to A39.

A39 Broadly in accordance with the invention there is provided a use of one or any combination of a) to f):
  a) an OSAR according to any one of paragraphs A1 to A17,
  b) a C according to any one of paragraphs A18 to A22,
  c) a LC according to any one of paragraphs A23 to A34,
  d) a CR-C according to any one of paragraphs A35, A36 and A39,
  e) a CR-LC according to any one of paragraphs A37 to A39, and
  f) an object or a kit-of-parts as disclosed in paragraph A40,
in paints, coatings, polishes, varnishes, inks, adhesives, pastes, compositions suitable for 3D-printing, 3D-printed objects, automotive applications, marine applications, aerospace applications, medical applications, defense applications, sports/recreational applications, architectural applications, bottling applications, household applications, machinery applications, can applications, coil applications, energy applications, textile applications, electrical applications, building and construction applications, packaging applications, telecommunications, and consumer goods.

A40 Broadly in accordance with the invention there is provided a use of one or any combination of a) to e):
  a) an OSAR according to any one of paragraphs A1 to A17,
  b) a C according to any one of paragraphs A18 to A22,
  c) a LC according to any one of paragraphs A23 to A34,
  d) a CR-C according to any one of paragraphs A35, A36 and A39,
  e) a CR-LC according to any one of paragraphs A37 to A39,
for achieving an excellent balance of König hardness and gloss20°.

A41 Broadly in accordance with the invention there is provided a process for making paints, coatings, polishes, varnishes, inks, adhesives, pastes, compositions suitable for 3D-printing, 3D-printed objects, objects for automotive applications, objects for marine applications, objects for aerospace applications, objects for medical applications, objects for defense applications, objects for sports/recreational applications, objects for architectural applications, objects for bottling applications, objects for household applications, objects for machinery applications, objects for can applications, objects for coil applications, objects for energy applications, objects for textile applications, objects for electrical applications, objects for building and construction applications, objects for packaging applications, objects for telecommunications, and consumer goods, using one or any combination of a) to f):
  a) an OSAR according to any one of paragraphs A1 to A17,
  b) a C according to any one of paragraphs A18 to A22,
  c) a LC according to any one of paragraphs A23 to A34,
  d) a CR-C according to any one of paragraphs A35, A36 and A39,
  e) a CR-LC according to any one of paragraphs A37 to A39, and
  f) an object or a kit-of-parts as disclosed in paragraph A40.

A42 Broadly in accordance with the invention there is provided a process for making objects having an excellent balance of König hardness and gloss20°, using one or any combination of a) to e):
  a) an OSAR according to any one of paragraphs A1 to A17,
  b) a C according to any one of paragraphs A18 to A22,
  c) a LC according to any one of paragraphs A23 to A34,
  d) a CR-C according to any one of paragraphs A35, A36 and A39,
  e) a CR-LC according to any one of paragraphs A37 to A39,
for achieving an excellent balance of König hardness and gloss20°.

All combinations of minimum and maximum values of the parameters disclosed in the specification may be used to define the parameter ranges for various preferments or embodiments of the invention.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects of the invention as these are disclosed in the specification can be combined with each other.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 1—and its subsections 1.1 to 1.7—can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 5 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

Definitions

By the term 'polycondensation' is meant in the specification condensation polymerization as this type of polymerization is known to one of ordinary skill in the art, and is meant to refer to one or both of: a) polyesterification, and b) polytransesterification, as each of a) and b) are known to one of ordinary skill in the art.

By the term 'functional groups' is meant in the specification a covalently bonded group of atoms within a molecule, such as for example the carboxyl group, or the hydroxyl group or the oxirane group, that determines the chemical behaviour of said entity e.g. molecule, are capable of reacting and/or interacting with functional groups of another monomeric molecule or polymer and are responsible for the characteristic chemical reactions and/or chemical behaviour of those molecules.

By the term 'ionic functional group' is meant in the specification a functional group which comprises both a cation and an anion.

By the term 'ionic' (referring to an alkyd resin) is meant in the specification an alkyd resin comprising pendant ionic functional groups in its macromolecular structure.

By the term 'AR' is meant in the specification an alkyd resin.

By the term 'OSAR' is meant in the specification an oxidizing, ionic and short oil alkyd resin which is according to the invention. The term OSAR as used in the specification includes any and all of its preferments, combinations of its features and ranges as well as combinations of any and all of its preferments with any and all of the combinations of its features and ranges.

By the term 'monoalcohol' is meant in the specification a monodispersed organic alcohol containing one hydroxyl group.

By the term 'dialcohol' is meant in the specification a monodispersed organic alcohol containing two hydroxyl groups.

By the term 'trialcohol' is meant in the specification a monodispersed organic alcohol containing three hydroxyl groups.

By the term 'tetralcohol' is meant in the specification a monodispersed organic alcohol containing four hydroxyl groups.

By the term 'pentalcohol' is meant in the specification a monodispersed organic alcohol containing five hydroxyl groups.

By the term 'hexalcohol' is meant in the specification a monodispersed organic alcohol containing six hydroxyl groups.

By the term 'monocarboxylic acid' is meant in the specification a monodispersed organic carboxylic acid containing one carboxylic acid group.

By the term 'polycarboxylic acid' is meant in the specification a monodispersed organic carboxylic acid containing at least two carboxylic acid groups.

By the term 'monoepoxide' is meant in the specification any organic compound which comprises one oxirane group in its structure. Exemplary monoepoxides include but are not limited to isopropyl glycidyl ether, butyl glycidyl ether, tertiary butyl glycidyl ether, neodecanoic acid glycidyl ester, glycidyl methacrylate.

By the term 'diepoxide' is meant in the specification any organic compound (including also those grades that are resourced or produced from biorenewable resources) which comprises two oxirane groups in its structure. Exemplary diepoxides include but are not limited to limonene dioxide, bisphenol-A diglycidyl ether, neopentyl glycol diglycidyl ether, cyclohexane diol diglycidyl ether.

By the term 'polyepoxide' is meant in the specification any organic compound (including also those grades that are resourced or produced from biorenewable resources) which comprises more than two oxirane groups in its structure. Exemplary polyepoxides include but are not limited to trimethylolpropane triglycidyl ether, triglycidyl isocyanurate, epoxidized linseed oil, epoxidized soybean oil.

By the term 'organic base' is meant an organic compound which acts as a base according to Lewis model, and is able to react with an acid to neutralize each other in water. Exemplary organic bases are amines such as alkanamines e.g. methylamine, triethylamine, hydroxides of quaternary ammonium or other organic cations, nitrogen containing heterocyclic compounds such as pyridine.

By the term 'inorganic base' is meant an inorganic compound which acts as a base according to Lewis model, and is able to react with an acid to neutralize each other in water. Exemplary inorganic bases are hydroxides of alkali metals such as sodium hydroxide, potassium hydroxide, lithium hydroxide, zinc hydroxide, calcium hydroxide, caesium hydroxide.

By the term 'emulsifying agent' (known in the art also as surfactants) is meant in the specification compounds that have both a hydrophilic and a lipophilic part in the chemical structure and are typically classified according to their: a) chemical structure e.g. ionic, non-ionic, or other sub-classification indicative of its origin or chemical make-up, or b) mechanism of action e.g. monomolecular, multi-molecular Exemplary emulsifiers include but are not limited to sodium lauryl sulphate, sodium stearate, potassium stearate, potassium oleate, sodium dioctyl sulfosuccinate, sorbitan esters and their ethoxylates under the trademarks Span® and Tween®, ethoxylated sodium lauryl sulphate (commercially available as Disponil®), ethoxylated lauryl and oleyl alcohols (commercially available as Genapol®), ethoxylated isotridecyl phosphates (Dextrol™; Rhodafac®).

By the term 'drier' is meant in the specification a chemical compound which is able to catalyse the crosslink reaction mechanism of an oxidizing alkyd resin (said crosslink reaction mechanism is known in the art of the alkyd resins as 'autoxidation'). In other words, the drier is a chemical compound which is able to catalyse the autoxidation of an oxidizing alkyd resin. Preferably, the drier is an organic metal compound. Preferably, the drier is oil-soluble. Preferably, the drier is an oil-soluble organic metal compound.

The 'organic metal compound' is defined as being selected from the group consisting of an organic metal salt of an organic acid that comprises at least an anion and a metal cation, an organic metal complex that comprises at least an anion and a metal cation, and mixtures thereof. Preferably the metal of the metal cation of the organic metal compound is selected from the group consisting of Co, Mn, Fe, Ce, V, Pb, Nd, Zr, Bi, Ba, Al, Sr, Ca, Zn, Li, K, and combinations thereof, more preferably from the group consisting of Co, Mn, Fe, Ce, V, Pb, Nd, Zr, Bi, Ba, Al, Sr, Ca, Zn, Li, K and combinations thereof, and the anion is selected from the group consisting of carboxylates OL1, OL2, OL3—the formulae of which is shown below—, hydroxyl anion ($HO^-$), halide anions e.g. $F^-$, $Cl^-$, $Br^-$, $I^-$, $At^-$, phosphate anions, sulphate anions, and combinations thereof, more preferably the anion is selected from the group consisting of carboxylates OL1, OL2, OL3—the formulae of which is shown below—, hydroxyl anion ($HO^-$), halide anions e.g. $F^-$, $Cl^-$, $Br^-$, $I^-$, $At^-$, and combinations thereof. The carboxylates OL1, OL2 and OL3 have the following formulae:

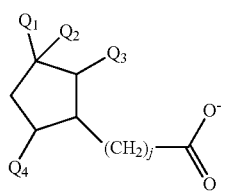

OL1

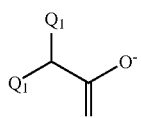

OL2

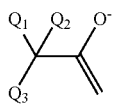

OL3 wherein
j is an integer equal to or higher than 1 and at most 34, and and Q1, Q2, Q3, Q4 is each independently selected from the group consisting of H, $CH_3$, $C_2H_5$, $C_3H_7$, $C_4H_9$ and $C_5$-$C_{20}$ saturated-hydrocarbyl. Preferably in OL1, Q1, Q2, Q3, Q4 is each independently selected from the group consisting of H and $C_1$-$C_{10}$ saturated-hydrocarbyl. Preferably in OL2, Q1 is $C_4H_9$ and Q2 is $C_2H_5$. Preferably in OL3, Q1 is $CH_3$ and Q2 and Q3 is each independently selected from a $C_1$-$C_{10}$ saturated-hydrocarbyl.

By the term 'oil-soluble drier' (or equally the 'drier is oil-soluble') is meant in the specification a drier—as this is defined in the specification—which is soluble in the oxidizing, ionic and short oil alkyd resins of the invention (OSAR), and/or in the compositions of the invention (C)—as these are disclosed in the specification—, and/or in the liquid compositions of the invention (LC)—as these are disclosed in the specification. Preferably, the oil-soluble drier is soluble in at least the oxidizing, ionic and short oil alkyd resins of the invention (OSAR). Preferably, the oil-soluble drier is soluble in the oxidizing, ionic and short oil alkyd resins of the invention (OSAR) and in the compositions of the invention (C)—as these are disclosed in the specification. Preferably, the oil-soluble drier is soluble in the oxidizing, ionic and short oil alkyd resins of the invention (OSAR) and in the liquid compositions of the invention (LC). Preferably, the oil-soluble drier is soluble in the oxidizing, ionic and short oil alkyd resins of the invention (OSAR) and in the compositions of the invention (C)—as these are disclosed in the specification—, and in the liquid compositions of the invention (LC)—as these are disclosed in the specification.

By the term 'oil-soluble organic metal compound' (or equally the 'organic metal compound is oil-soluble') is meant in the specification an organic metal compound—as this is defined in the specification—which is soluble in the oxidizing, ionic and short oil alkyd resins of the invention (OSAR), and/or in the compositions of the invention (C)—as these are disclosed in the specification—, and/or in the liquid compositions of the invention (LC)—as these are disclosed in the specification. Preferably, the oil-soluble organic metal compound is soluble in at least the oxidizing, ionic and short oil alkyd resins of the invention (OSAR). Preferably, the oil-soluble organic metal compound is soluble in the oxidizing, ionic and short oil alkyd resins of the invention (OSAR) and in the compositions of the invention (C)—as these are disclosed in the specification. Preferably, the oil-soluble organic metal compound is soluble in the oxidizing, ionic and short oil alkyd resins of the invention (OSAR) and in the liquid compositions of the invention (LC)—as these are disclosed in the specification. Preferably, the oil-soluble organic metal compound is soluble in the oxidizing, ionic and short oil alkyd resins of the invention (OSAR) and in the compositions of the invention (C)—as these are disclosed in the specification—, and in the liquid compositions of the invention (LC)—as these are disclosed in the specification.

By the term 'hydrocarbon' is meant in the specification a chemical entity e.g. a group, or an organic chain (or equally chain), or a chemical compound, consisting of carbon and hydrogen only.

By the term 'hydrocarbyl' is meant in the specification a univalent organic group formed by removing a hydrogen atom from a saturated or unsaturated hydrocarbon. Exemplary hydrocarbyls include but are not limited to methyl, ethyl, phenyl, benzyl.

By the term 'saturated-hydrocarbyl' is meant in the specification a saturated hydrocarbyl. Exemplary saturated-hydrocarbyls include but are not limited to alkyls such as methyl, ethyl, propyl, butyl, pentyl, hexyl.

By the term 'hydrocarbylene' is meant in the specification a divalent organic group formed by removing two hydrogen atoms from a saturated or unsaturated hydrocarbon, the free valences of which are not engaged in a double bond. Exemplary hydrocarbylenes include but are not limited to methylene, 1,3-phenylene.

By the term 'non-cyclic' is meant in the specification that the relevant group or entity does not contain any closed ring structure such as for example a cyclohexane ring, an aromatic ring e.g. benzene ring. Thus, by definition a 'non-cyclic' group or entity is also non-aromatic.

By the term 'unsaturation' is meant in the specification a cis- or trans-configured carbon-carbon double bond (carbon-carbon double bond unsaturation), or a carbon-carbon triple bond (carbon-carbon triple bond unsaturation).

By the term 'unsaturated' is meant in the specification that the relevant entity has at least one carbon-carbon double bond and no carbon-carbon triple bond.

By the term 'ethylenic unsaturation' is meant in the specification a non-cyclic cis- or trans-configured carbon-carbon double bond unsaturation according to the following formula:

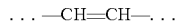

By the term 'conjugated ethylenic unsaturation' is meant in the specification a non-cyclic cis- or trans-configured hydrocarbylene of the following formula:

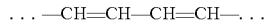

By the term 'diallylic ethylenic unsaturation' is meant in the specification a non-cyclic cis- or trans-configured hydrocarbylene of the following formula:

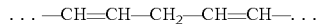

By the term 'ethylenically unsaturated' is meant in the specification that the relevant entity comprises one or more ethylenic unsaturations and said entity has neither a carbon-carbon triple bond unsaturation, nor a carbon-carbon double bond unsaturation other than the ethylenic unsaturations.

By the term 'saturated' is meant in the specification that the relevant entity does not contain any unsaturation.

By the term 'optionally substituted hydrocarbyl' is meant in the specification a hydrocarbyl optionally substituted by one or more substituents.

By the term 'substituent' is meant in the specification an atom or a group of atoms that replaces one or more hydrogen atoms attached to a parent structure. Exemplary substituents include but are not limited to oxygen, carboxyl, hydroxyl, amino, cyano, methoxy, formyl, imino, etc.

By the term 'fatty acid' is meant in the specification an entity selected from the group consisting of saturated fatty acid, A-unsaturated fatty acid, B-unsaturated fatty acid, unsaturated fatty acid, and mixtures thereof. Exemplary fatty acids include but are not limited to, myristoleic acid [$CH_3(CH_2)_3CH=CH(CH_2)_7COOH$], palmitoleic acid [$CH_3(CH_2)_5CH=CH(CH_2)_7COOH$], oleic acid [$CH_3(CH_2)_7CH=CH(CH_2)_7COOH$], linoleic acid [$CH_3(CH_2)_4CH=CHCH_2CH=CH(CH_2)_7COOH$], linolenic acid [$CH_3CH_2CH=CHCH_2CH=CHCH_2CH=CH(CH_2)_7COOH$], pinolenic acid [$CH_3(CH_2)_4CH=CHCH_2CH=CHCH_2CH_2CH=CH(CH_2)_3COOH$], palmitic acid [$CH_3(CH_2)_{14}COOH$], oleic acid [$CH_3(CH_2)_7CH=CH(CH_2)_7COOH$], α-alpha-linolenic acid [$CH_3CH_2CH=CHCH_2CH=CHCH_2CH=CH(CH_2)_7COOH$], arachidonic acid [$CH_3(CH_2)_4CH=CHCH_2CH=CHCH_2CH=CHCH_2CH=CH(CH_2)_3COOH$], eicosapentaenoic acid [$CH_3CH_2CH=CHCH_2CH=CHCH_2CH=CHCH_2CH=CHCH_2CH=CH(CH_2)_3COOH$], erucic acid [$CH_3(CH_2)_7CH=CH(CH_2)_{11}COOH$], docosahexaenoic acid [$CH_3CH_2CH=CHCH_2CH=CH\ CH_2CH=CH\ CH_2CH=CHCH_2CH=CHCH_2CH=CH(CH_2)_2COOH$], stearic acid [$CH_3CH_2(CH_2)_{15}COOH$), ricinoleic acid [$CH_3(CH_2)_5C(OH)HCH_2CH=CH(CH_2)_7COOH$, steandonic acid [$CH_3CH_2CH=CHCH_2CH=CHCH_2CH=CHCH_2CH=CH(CH_2)_4COOH$], vaccenic acid [$CH_3(CH_2)_5CH=CH(CH_2)_9COOH$], paullinic acid [$CH_3(CH_2)_5CH=CH(CH_2)_{11}COOH$], elaidic acid [$CH_3(CH_2)_7CH=CH(CH_2)_7COOH$], gondoic acid [$CH_3(CH_2)_7CH=CH(CH_2)_9COOH$], nervonic acid [$CH_3(CH_2)_7CH=CH(CH_2)_{13}COOH$], mead acid [$CH_3(CH_2)_7CH=CHCH_2CH=CHCH_2CH=CH(CH_2)_3COOH$], docosahexaenoic acid [$CH_3CH_2CH=CHCH_2CH=CHCH_2CH=CHCH_2CH=CHCH_2CH=CHCH_2CH=CH(CH_2)_2COOH$], γ-linolenic acid [$CH_3(CH_2)_4CH=CHCH_2CH=CHCH_2CH=CH(CH_2)_4COOH$], dihomo-γ-linolenic acid [$CH_3(CH_2)_4CH=CHCH_2CH=CHCH_2CH=CH(CH_2)_6COOH$], docosatetraenoic acid [$CH_3(CH_2)_4CH=CHCH_2CH=CHCH_2CH=CHCH_2CH=CH(CH_2)_5COOH$], tung oil fatty acid, soya oil fatty acid, sunflower oil fatty acid, soybean oil fatty acid, linseed oil fatty acid, dehydrated castor oil fatty acid, tall oil fatty acid, and calendula oil fatty acid.

By the term 'saturated fatty acid' is meant in the specification a non-cyclic, saturated, monocarboxylic acid having a $C_{12}$-$C_{60}$ hydrocarbon chain. Exemplary saturated fatty acids include but are not limited to, lauric acid [$CH_3(CH_2)_{10}COOH$], myristic [$CH_3(CH_2)_{12}COOH$], palmitic acid [$CH_3(CH_2)_{14}COOH$], stearic acid [$CH_3(CH_2)_{16}COOH$), arachidic acid [$CH_3(CH_2)_{18}COOH$], isostearic acid [$(CH_3)_2—CH—(CH_2)_{14}COOH$].

By the term 'A-unsaturated fatty acid' is meant in the specification a non-cyclic, ethyllenically unsaturated monocarboxylic acid having a $C_{12}$-$C_{60}$ hydrocarbon chain (preferably a $C_{12}$-$C_{34}$ hydrocarbon chain, more preferably a $C_{12}$-$C_{28}$ hydrocarbon chain) and said hydrocarbon chain comprises one or both of: i) a conjugated ethylenic unsaturation, and ii) a diallylic ethylenic unsaturation. Preferably the A-unsaturated fatty acid is non-branched. Exemplary A-unsaturated fatty acids include but are not limited to, linoleic acid [$CH_3(CH_2)_4CH=CHCH_2CH=CH(CH_2)_7COOH$], linolenic acid [$CH_3CH_2CH=CHCH_2CH=CHCH_2CH=CH(CH_2)_7COOH$], pinolenic acid [$CH_3(CH_2)_4CH=CHCH_2CH=CHCH_2CH_2CH=CH(CH_2)_3COOH$], α-alpha-linolenic acid [$CH_3CH_2CH=CHCH_2CH=CHCH_2CH=CH(CH_2)_7COOH$], arachidonic acid [$CH_3(CH_2)_4CH=CHCH_2CH=CHCH_2CH=CHCH_2CH=CH(CH_2)_3COOH$], eicosapentaenoic acid [$CH_3CH_2CH=CHCH_2CH=CHCH_2CH=CHCH_2CH=CHCH_2CH=CH(CH_2)_3COOH$], docosahexaenoic acid [$CH_3CH_2CH=CHCH_2CH=CHCH_2CH=CHCH_2CH=CHCH_2CH=CHCH_2CH=CH(CH_2)_2COOH$], stearidonic acid [$CH_3CH_2CH=CHCH_2CH=CHCH_2CH=CHCH_2CH=CH(CH_2)_4COOH$], mead acid [$CH_3(CH_2)_7CH=CHCH_2CH=CHCH_2CH=CH(CH_2)_3COOH$], γ-linolenic acid [$CH_3(CH_2)_4CH=CHCH_2CH=CHCH_2CH=CH(CH_2)_4COOH$], dihomo-γ-linolenic acid [$CH_3(CH_2)_4CH=CHCH_2CH=CHCH_2CH=CH(CH_2)_6COOH$], docosatetraenoic acid [$CH_3(CH_2)_4CH=CHCH_2CH=CHCH_2CH=CHCH_2CH=CH(CH_2)_5COOH$].

By the term 'B-unsaturated fatty acid' is meant in the specification an ethyllenically unsaturated monocarboxylic acid other than an A-unsaturated fatty acid as the latter is defined in the specification. Exemplary B-unsaturated fatty acids include but are not limited to myristoleic acid [$CH_3(CH_2)_3CH=CH(CH_2)_7COOH$], palmitoleic acid [$CH_3(CH_2)_5CH=CH(CH_2)_7COOH$], oleic acid [$CH_3(CH_2)$ $_7$CH=CH(CH$_2$)$_7$COOH], erucic acid [CH$_3$(CH$_2$)$_7$CH=CH (CH$_2$)$_{11}$COOH], ricinoleic acid [CH$_3$(CH$_2$)$_5$C(OH)HCH$_2$CH=CH(CH$_2$)$_7$COOH, vaccenic acid [CH$_3$(CH$_2$)$_5$CH=CH(CH$_2$)$_9$COOH], paullinic acid [CH$_3$(CH$_2$)$_5$CH=CH(CH$_2$)$_{11}$COOH], elaidic acid [CH$_3$(CH$_2$)$_7$CH=CH(CH$_2$)$_7$COOH], gondoic acid [CH$_3$(CH$_2$)$_7$CH=CH(CH$_2$)$_9$COOH], nervonic acid [CH$_3$(CH$_2$)$_7$CH=CH(CH$_2$)$_{13}$COOH].

By the term 'unsaturated fatty acid' is meant in the specification one or both of A-unsaturated fatty acid and B-unsaturated fatty acid. Unsaturated fatty acids may be obtained or derived from oils such as soya oil, sunflower oil, linseed oil, safflower oil, cottonseed oil, tung oil, tall oil soybean oil, dehydrated castor oil, calendula oil. Preferably the A-unsaturated fatty acids are obtained from oils.

By the term 'oil' is meant in the specification a naturally occurring oil (natural oil) which is a mixture of triglycerides.

By the term 'tung oil fatty acid' is meant in the specification a mixture of: i) saturated fatty acids—if any—and ii) unsaturated fatty acids, wherein i) and ii) are derived from tung oil.

By the term 'soya oil fatty acid' is meant in the specification a mixture of: i) saturated fatty acids—if any—and ii) unsaturated fatty acids, wherein i) and ii) are derived from soya oil.

By the term 'sunflower oil fatty acid' is meant in the specification a mixture of: i) saturated fatty acids—if any—and ii) unsaturated fatty acids, wherein i) and ii) are derived from sunflower oil.

By the term 'soybean oil fatty acid' is meant in the specification a mixture of: i) saturated fatty acids—if any—and ii) unsaturated fatty acids, wherein i) and ii) are derived from soybean oil.

By the term 'linseed oil fatty acid' is meant in the specification a mixture of: i) saturated fatty acids—if any—and ii) unsaturated fatty acids, wherein i) and ii) are derived from derived from linseed oil.

By the term 'dehydrated castor oil fatty acid' is meant in the specification a mixture of: i) saturated fatty acids—if any—and ii) unsaturated fatty acids, wherein i) and ii) are derived from dehydrated castor oil.

By the term 'tall oil fatty acid' is meant in the specification a mixture of: i) saturated fatty acids—if any—and ii) unsaturated fatty acids, wherein i) and ii) are derived from tall oil.

By the term 'calendula oil fatty acid' is meant in the specification a mixture of: i) saturated fatty acids—if any—and ii) unsaturated fatty acids, wherein i) and ii) are derived from calendula oil.

By the term 'cottonseed oil fatty acid' is meant in the specification a mixture of: i) saturated fatty acids—if any—and ii) unsaturated fatty acids, wherein i) and ii) are derived from cottonseed oil.

By the term 'corn oil fatty acid' is meant in the specification a mixture of: i) saturated fatty acids—if any—and ii) unsaturated fatty acids, wherein i) and ii) are derived from corn oil.

By the term 'safflower oil fatty acid' is meant in the specification a mixture of: i) saturated fatty acids—if any—and ii) unsaturated fatty acids, wherein i) and ii) are derived from safflower oil.

By the term 'hemp oil fatty acid' is meant in the specification a mixture of: i) saturated fatty acids—if any—and ii) unsaturated fatty acids, wherein i) and ii) are derived from hemp oil.

By the term 'theoretical molecular weight' (abbreviated as TMW) of a chemical substance is meant in the specification the molecular mass of said chemical substance calculated as the sum of the atomic masses of each constituent element multiplied by the number of atoms of that element in the molecular formula of said chemical substance; such calculation is well-known to one skilled in the art. The TMW is reported in Da. For example, the TMW of glycerol (C$_3$H$_8$O$_3$) [which is an example of the polyol component (POC) as the latter is defined in the specification] is 92 Da. For example, the TMW of Ymer™ N120 (its molecular formula is shown in § 1.6 below; which is an example of the polyalkylene component (PALC) as this is defined in the specification] is 984 Da.

By the term '$M_n$' is meant in the specification number average molecular weight and is determined as disclosed in the specification. The $M_n$ is reported in Da.

By the term '$M_w$' is meant in the specification weight average molecular weight and is determined as disclosed in the specification. The $M_w$ is reported in Da.

By the term 'Da' is meant in the specification the unit Dalton that represents g/mol according to the equation: 1 Da=1 g/mol.

By the term 'polydispersity' (abbreviated as 'D' and referring to a polymer e.g. an alkyd resin) is meant in the specification:

$$D=M_w/M_n$$

wherein each of $M_w$ and $M_n$, is determined as disclosed in the specification.

By the term 'oil length' (of a polymer, e.g. an alkyd resin) is meant in the specification:

$$\text{Oil length} = \frac{1.045 \times \text{weight of fatty acids}}{\text{weight of polymer} - \text{weight of water evolved}} \times 100$$

By the term 'iodine number' (cg/g) (abbreviated as 'ION'; also known as iodine value or iodine adsorption value or iodine index) is meant in the specification the mass of iodine in centigrams that is consumed by 1 g of a fatty acid component (FAC). The ION is used to determine the amount of ethylenic unsaturation in the FAC, since this ethylenic unsaturation reacts with iodine compounds. The higher the iodine number, the more ethylenic unsaturations are present in the FAC. The ION is determined according to the DIN 53241-1. The oil length is associated with the amount of fatty acid (in its glycerol ester form) built-in a polymer e.g. an alkyd resin. The higher the oil length of a polymer e.g. an alkyd resin, the higher is the amount of fatty acid built-in said polymer.

By the term 'the LC is substantially-free of one or both of an organic base and an emulsifying agent' is meant in the specification that the liquid composition (LC)—as this is defined and disclosed in the specification—comprises one or both of an organic base and an emulsifying agent in an amount of less than 5, preferably less than 4, more preferably less than 3, even more preferably less than 2, most preferably less than 1, especially less than 0.5, more especially less than 0.1 pph LC.

By the term 'the LC is free of an organic base and an emulsifying agent' is meant in the specification that the liquid composition (LC)—as this is defined and disclosed in the specification-does not comprise an organic base and an emulsifying agent.

By the term 'the LC is substantially-free of one or both of one or both of a polyurethane, and a urethane alkyd (uralkyd)' is meant in the specification that the liquid composition (LC)—as this is defined and disclosed in the specification—comprises one or both of a polyurethane, and a urethane alkyd (uralkyd) in an amount of less than 5, preferably less than 4, more preferably less than 3, even more preferably less than 2, most preferably less than 1, especially less than 0.5, more especially less than 0.1 pph LC.

By the term 'the LC is free of a polyurethane and a urethane alkyd (uralkyd)' is meant in the specification that the liquid composition (LC)—as this is defined and disclosed in the specification—does not comprise a polyurethane, and a urethane alkyd (uralkyd).

The term 'water-borne composition' includes any and all of the following: i) water-reducible composition (also known as aqueous dispersion), that is a polymer solution in water, or a polymer dispersion in water, or a polymer dispersion in mixtures of water and cosolvent, ii) latex, that is a dispersion of solid polymer particles in water, and iii) emulsion, that is a dispersion of liquid into liquid, for example liquid into water.

By the term 'organic cosolvent' is meant in the specification an organic solvent which is at least partially miscible with water. Preferably the cosolvent is completely miscible with water. Exemplary organic cosolvents include but are not limited to ethanol, propanol, isopropanol, butanol, propylene glycol, methoxypropylene glycol, dipropyleneglycol, dipropyleneglycol methylether, dipropyleneglycol dimethylether, ethyl diglycol, ethyl glycol acetate, butyl glycol, butyl glycol acetate, butyl diglycol, butyl diglycol acetate, methoxypropylene glycol acetate, acetone, methyl ethyl ketone.

By the term 'room temperature' (abbreviated as 'r.t.') is meant in the specification a temperature of 21° C.

By 'standard conditions' is meant in the specification that both of the following conditions are applied: i) room temperature (=21° C.), and ii) atmospheric pressure (=1 atmosphere). Any and all references to the physical state e.g. liquid, solid, aqueous, of the various chemical entities mentioned in this specification are meant to be under standard conditions. For example, when it is mentioned that a paint is liquid, this means that the paint is liquid under standard conditions that is the paint is liquid at room temperature (=21° C.) and at atmospheric pressure (=1 atmosphere).

By 'standard curing conditions' is meant in the specification that all of the following conditions are applied: i) relative humidity of 55±5%, ii) room temperature, iii) air atmosphere and air flow of less than or equal to 0.1 m/s.

By the term 'curing' or 'cure' is meant in the specification the process of becoming 'set' that is to form an irreversibly crosslinked network (the so-called 'cured form' or 'cured composition'), a material that can no longer flow, be melted or dissolved. Herein, the terms 'curing', 'cure' and 'cross-linking' are used interchangeably. Particularly, in the art of oxidizing alkyd resins the term 'drying' is also another alternative term for the term 'curing' or 'cure' or 'crosslinking'.

By the term 'autoxidative curing' or equally 'autoxidative cure' or equally 'cure autoxidatively' or equally 'cured via autoxidation' or equally 'autoxidation' is meant in the specification that the crosslinking occurs by the same mechanism as drying oils; the crosslink mechanism of drying oils is a complex one since it involves complex chemical reactions which involve (to mention some) peroxy radicals, free radicals, hydrogen abstraction from a methylene group between carbon-carbon double bonds, combination of radicals, hydrogen addition to a conjugated carbon-carbon double bond system, all of them contributing to the establishment of a chain reaction resulting in autoxidation. This crosslink reaction mechanism (known in the art as 'autoxidation') may be—usually it is—catalysed by the use of organic metal compounds (as these are explained and defined in this specification), known in the art of alkyd resins as 'driers'.

By the term 'curable' is meant in the specification that the relevant chemical entity e.g. an alkyd resin or a composition has the ability to cure at atmospheric pressure without the need to apply one or multiple of heat, radiation and pressure (above or below atmospheric pressure) in any combination, to induce and achieve the curing of the composition; heat, radiation and pressure (above or below atmospheric pressure) are not excluded but are not necessary for the curing of said composition.

By the term 'r.t.-curable' is meant in the specification that the relevant chemical entity e.g. an alkyd resin or a composition has the ability to cure autoxidatively under standard curing conditions without the need to apply one or multiple of heating above room temperature, radiation and pressure (above or below atmospheric pressure) in any combination, to induce and achieve the curing of the composition; thus, heating above room temperature, radiation and pressure (above or below atmospheric pressure) are not excluded but are not necessary for the curing of said composition.

By the term 'self-crosslinkable' is meant in the specification that the relevant chemical entity e.g. an alkyd resin or a composition, is r.t.-curable and has the ability to cure without the need to use a crosslinker e.g. a melamine-formaldehyde (MF), or urea-formaldehyde (UF) resins, or by isocyanate crosslinkers.

By the term 'cured composition' is meant in the specification an object that is derived upon, and/or obtainable by, and/or obtained by, and/or resulting from the curing of a composition; in other words a cured composition is a cross-linked composition; said curing may be effected via one or both of heat and radiation, preferably via heat; said object may have any shape, size or form and said object may for example be a coating; by 'coating' is meant in the specification a cured film that is derived upon, and/or obtainable by and/or obtained by, and/or resulting from partial or full curing of a composition; in other words a coating is a cured composition in the form of a film.

By the term 'good König hardness' (referring to a coating) is meant in the specification that the König hardness (KH)—as this is determined as disclosed in the specification—is at least 25 s, preferably at least 27 s, more preferably at least 29 s.

By the term 'poor König hardness' (referring to a coating) is meant in the specification that the König hardness (KH)—as this is determined as disclosed in the specification—is lower than 25 s.

By the term 'balance of König hardness (KH) and gloss20° ' (referring to a coating) (abbreviated as BKHG) is meant in the specification the multiplication product of the KH and gloss20° values of a coating—as each of KH and gloss20° is determined in the specification-. In other words, the BKHG of a coating is calculated by the following equation:

$$BKHG = KH \times gloss20°$$

By the term 'excellent balance of König hardness (KH) and gloss20° ' (referring to a coating) is meant in the specification that the BKHG is at least 1000, preferably at least 1050, more preferably at least 1100 GU·s (wherein 'GU' represents gloss unit—as defined in the specification, and 's' represents second).

By the term 'poor balance of König hardness (KH) and gloss20°' (referring to a coating) is meant in the specification that the BKHG is lower than 1000 GU·s.

By the term 'stable aqueous dispersion', is meant in the specification that an aqueous dispersion has the ability to resist change in its properties for a time period of at least 240, preferably at least 480, more preferably at least 720, most preferably at least 2160, especially at least 4320 hours (starting from the completion of its preparation) under standard conditions. The ability to resist change in its properties is manifested by and when neither any one of the following phenomena a)-e) and nor any combination of the following phenomena a)-e) takes place for a time period of at least 240, preferably at least 480, more preferably at least 720, most preferably at least 2160, especially at least 4320 hours (starting from the completion of its preparation) under standard conditions: a) flocculation, b) creaming/sedimentation, c) coalescence, d) phase-separation and e) Ostwald ripening. For example, when an aqueous dispersion is stable, it means that it neither flocculates, nor creams/sediments, nor coalesces, nor phase-separates, nor Ostwald ripens for a time period at least 240, preferably at least 480, more preferably at least 720, most preferably at least 2160, especially at least 4320 hours (starting from the completion of its preparation) under standard conditions. In the context of this specification, the stability of an aqueous dispersion, is observed by visual inspection at regular time intervals.

By the term 'unstable aqueous dispersion', is meant in the specification that an aqueous dispersion does not have the ability to resist change in its properties within a time period of up to and not including 240 hours (starting from the completion of its preparation) under standard conditions. The inability to resist change in its properties is manifested by and when any one of the following phenomena a)-e) or any combination of the following phenomena a)-e) takes place within a time period of up to and not including 240 hours (starting from the completion of its preparation) under standard conditions: a) flocculation, b) creaming/sedimentation, c) coalescence, d) phase-separation and e) Ostwald ripening. For example, when an aqueous dispersion is unstable, it means that it either flocculates, or creams/sediments, or coalesces, or phase-separates, or Ostwald ripens, or it shows any combination of the phenomena a)-e) within a time period of up to and not including 240 hours (starting from the completion of its preparation) under standard conditions. In the context of this specification, the instability of an aqueous dispersion, is observed by visual inspection at regular time intervals.

By the term 'stable emulsion', is meant in the specification that an emulsion has the ability to resist change in its properties for a time period of at least 240, preferably at least 480, more preferably at least 720, most preferably at least 2160, especially at least 4320 hours (starting from the completion of its preparation) under standard conditions. The ability to resist change in its properties is manifested by and when neither any one of the following phenomena a)-e) and nor any combination of the following phenomena a)-e) takes place for a time period of at least 240, preferably at least 480, more preferably at least 720, most preferably at least 2160, especially at least 4320 hours (starting from the completion of its preparation) under standard conditions: a) flocculation, b) creaming/sedimentation, c) coalescence, d) phase-separation and e) Ostwald ripening. For example, when an emulsion is stable, it means that it neither flocculates, nor creams/sediments, nor coalesces, nor phase-separates, nor Ostwald ripens for a time period greater of at least 240, preferably at least 480, more preferably at least 720, most preferably at least 2160, especially at least 4320 hours (starting from the completion of its preparation) under standard conditions. In the context of this specification, the stability of an emulsion, is observed by visual inspection at regular time intervals.

By the term 'unstable emulsion', is meant in the specification that an emulsion does not have the ability to resist change in its properties within a time period of up to and not including 240 hours (starting from the completion of its preparation) under standard conditions. The inability to resist change in its properties is manifested by and when any one of the following phenomena a)-e) or any combination of the following phenomena a)-e) takes place within a time period of up to and not including 240 hours (starting from the completion of its preparation) under standard conditions: a) flocculation, b) creaming/sedimentation, c) coalescence, d) phase-separation and e) Ostwald ripening. For example, when an emulsion is unstable, it means that it either flocculates, or creams/sediments, or coalesces, or phase-separates, or Ostwald ripens, or it shows any combination of the phenomena a)-e) within a time period of up to and not including 240 hours (starting from the completion of its preparation) under standard conditions. In the context of this specification, the instability of an emulsion, is observed by visual inspection at regular time intervals.

By the term 'components of a composition' is meant in the specification constituent elements, their preferred embodiments and combinations thereof, that constitute part of the composition; said components, their preferred embodiments and combinations thereof, should be construed in view of the whole disclosure. For example, the OSAR, the Binder, the constituent A, the constituent B are each a component of the Composition.

By the term 'lower than' is meant in the specification that the relevant maximum boundary value is not included in the range.

By the term 'higher than' (or 'greater than') is meant in the specification that the relevant minimum boundary value is not included in the range.

For all upper and lower boundaries of any parameters given in the specification, the boundary value is included in each range for each parameter. All combinations of minimum and maximum values of the parameters disclosed in the specification may be used to define the parameter ranges for various embodiments and preferences of the invention.

In the context of the present invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

By the term 'mol % based on the OSAR' (or equally the mol % is based on the OSAR') is meant in the specification that the sum of the mol fractions of: i) each of the polycondensed residues of the components POC, PAC, MAC, FAC, IOC, and PALC, and ii) any other reacted residue of a component of the OSAR—if present—forming part of the OSAR, equals 100%.

By the term 'pph' is meant in the specification weight parts per hundred weight parts.

By the term 'ppm' is meant in the specification weight parts per million weight parts.

By the term 'article' is meant in the specification an individual object or item or element of a class designed to serve a purpose or perform a special function and can stand alone; the article can be in any size, form or shape. A substrate is an example of an article. Preferably, said article is selected from the group consisting of heat-sensitive articles, non-heat sensitive articles and combinations thereof; more preferably said article is selected from the group of non-heat sensitive articles, even more preferably said article is selected from the group consisting of thermoplastic composite, thermoset composite, fibre reinforced composites, sandwich materials e.g. sandwich materials comprising heat sensitive foam core, metal and combinations thereof. Typical examples of non-heat-sensitive articles include glass, ceramic, composite, fiber cement board, or metal, for example aluminum, copper or steel articles, for instance carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate) or non-surface treated. Heat-sensitive articles for example heat-sensitive substrates, include plastic articles, wood articles for example solid wood, such as for example: hard wood, soft wood, plywood; veneer, particle board, low density fibre board, medium density fibreboard and high density fibreboard, OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resin based compositions, ABS (acrylonitrile butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethylene terephthalate (PET), and nylon, for example polyamide 6,6 and combinations thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips. The article can be a domestic furniture, such as tables, chairs, cabinets, bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and flooring, articles for automotive applications, such as interior car parts, wheel covers, bumpers, under the hood parts, flexible flooring, sporting goods, cosmetics, audio-visual applications, such as TV sets, computer housing, phones, household appliances and satellite dishes.

Any characterization of the physical state e.g. liquid, solid, paste, powder, of an entity such as the OSAR, the Binder, the Composition, refers to said physical form as observed at room temperature and at atmospheric pressure. For example, if it is said that the Composition is liquid, this means that the Composition is liquid at room temperature and at atmospheric pressure.

Certain moieties, species, groups, units, compounds, polymers, materials, mixtures, compositions and/or formulations which comprise and/or are used in some or all of the invention as disclosed in the specification may exist as one or more different forms such as any of those in the following non exhaustive list: tautomers e.g. keto and/or enol forms; isomers such as constitutional (structural) isomers, stereoisomers (spatial isomers) such as i) enantiomers, and ii) diastereomers (geometric isomers) such as cis/trans, E/Z and R/S isomers and conformers such as rotamers; tautomers. The invention comprises and/or uses all such forms which are effective as defined in the specification.

The terms 'suitable for' (for example with reference to any process, use, method, application, preparation, product, material, formulation, compound, composition, monomer, oligomer, polymer precursor, and/or polymers of the present invention and/or disclosed in the specification as appropriate) will be understood to refer to those features of the invention which if used in the correct manner provide the required properties to that which they are added and/or incorporated to be of utility as disclosed in the specification. Such utility may be direct for example where a material has the required properties for the aforementioned uses and/or indirect for example where a material has use as a synthetic intermediate and/or diagnostic tool in preparing other materials of direct utility. As used in the specification these terms also denote that a functional group is compatible with producing suitable end products.

It will be understood that the total sum of any quantities expressed in the specification as percentages cannot (allowing for rounding errors) exceed 100%. However, where a list of monomers used for the preparation of the OSAR or where a list of components of the Binders—C and LC, or of the composition C or of the liquid composition LC is non-exhaustive, the sum of the percentage for each of such components may be less than 100% to allow a certain percentage for additional amount(s) of any additional component(s) that may not be explicitly disclosed in the specification.

By the 'comprising' is meant in the specification that the list that immediately follows is non-exhaustive and may or may not include any other additional suitable items, for example one or more further feature(s), component(s) and/or substituent(s) as appropriate. The term 'comprising' will be used interchangeably with the term 'containing'. 'Substantially comprising' or 'essentially consisting of' as used in the specification means a component or list of component(s) is present in a given material in an amount greater than or equal to 95% w/w, preferably greater than or equal to 96% w/w, more preferably greater than or equal to 98% w/w, even more preferably greater than or equal to 99% w/w of the total amount of the given material.

By the term 'consisting of' (or equally 'consists of') when referring to a composition (of matter) is meant in the specification that the list that follows is exhaustive and does not include additional items.

By the term 'specification' is meant the abstract, the claims, the description—for clarity this includes the Examples section as well—, and the drawings—if any—referred to in the description or the claims, that make up the patent or patent application—as the case may be—in connection with the present invention that is disclosed in the abstract, the claims, the description—for clarity this includes the Examples section as well—, and the drawings—if any—referred to in the description or the claims.

Some additional definitions of certain terms used in the specification are shown in the rest of the description.

Any feature, element, component, embodiment, range and especially any preferred feature, preferred element, preferred embodiment, preferred range, preferred combination of ranges, preferment disclosed in the Definitions can be combined with each other.

Unless the context clearly indicates otherwise, as used in the specification plural forms of the terms in the specification (for example OSAR, Composition, Binder, copolymerizable agent, heteroatom, unsaturation, ethylenic unsaturation) are to be construed as including the singular form and vice versa.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in the Definitions can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

The decimal separator in numbers (also known as the radix character) is indicated with a period (V).

1. The Oxidizing, Ionic and Short Oil Alkyd Resin of the Invention (OSAR)

Any and all of the polymers disclosed in this section are collectively referred to—in the whole of the application—as the oxidizing, ionic and short oil alkyd resin of the invention, or equally as the 'OSAR' (which is the abbreviated form of the 'oxidizing, ionic and short oil alkyd resin of the invention'). By 'OSAR' is meant in the specification a polymer according to the invention. The term 'OSAR' as used in the specification includes any and all of its preferments, combinations of its features and ranges as well as combinations of any and all of its preferments with any and all of the combinations of its features and ranges. Thus, any and all of the OSAR disclosed in this section includes any and all of their preferments, combinations of their features and ranges as well as combinations of any and all of their preferments with any and all of the combinations of their features and ranges, are collectively referred to—in the whole of the application—as the OSAR.

The OSAR is the reaction—preferably polycondensation reaction-product of at least the following components POC, PAC, MAC, FAC, IOC, and PALC as each of them is defined below (preferably the OSAR is the reaction—preferably polycondensation reaction—product of the following components POC, PAC, MAC, FAC, IOC, and PALC). Thus, the OSAR comprises polycondensed residues of at least the following components POC, PAC, MAC, FAC, IOC, and PALC; preferably the OSAR consists of the polycondensed residues of the following components POC, PAC, MAC, FAC, IOC, and PALC.

The OSAR may further comprise reacted residues of an epoxy component (EOC) as the latter is defined in the specification. Preferably, the OSAR is substantially-free of reacted residues of one or any combination of i) to iii): i) a monoepoxide, ii) a diepoxide and iii) a polyepoxide. More preferably, the OSAR is free of reacted residues of one or any combination of i) to iii): i) a monoepoxide, ii) a diepoxide and iii) a polyepoxide. By the term 'the OSAR is substantially-free of reacted residues of one or any combination of i) to iii): i) a monoepoxide, ii) a diepoxide and iii) a polyepoxide, is meant in the specification that the OSAR comprises reacted residues of a monoepoxide, a diepoxide, a polyepoxide, or a combination thereof in an amount of less than 5, preferably less than 4.5, more preferably less than 4, even more preferably less than 3.5, most preferably less than 3, especially less than 2, more especially less than 1, most especially less than 0.8, for example less than 0.5, for example less than 0.2, for example less than 0.1 mol % based on the OSAR. By the term 'the OSAR is free of reacted residues of one or any combination of i) to iii): i) a monoepoxide, ii) a diepoxide and iii) a polyepoxide, is meant in the specification that the OSAR does not comprise reacted residues of a monoepoxide, a diepoxide, a polyepoxide, or a mixture thereof.

The sum ($S_1$) of the amounts in mol % of the polycondensed residues of MAC, FAC, IOC and PALC components ($S_1 = MAC_{mol\ \%} + FAC_{mol\ \%} + IOC_{mol\ \%} + PALC_{mol\ \%}$) in the OSAR, is at least 40 and at most 70, preferably at least 45 and at most 65, more preferably at least 50 and at most 60 mol % based on the OSAR.

The ratio ($R_1$) of the amount of the polycondensed residue of MAC in mol % ($MAC_{mol\ \%}$) to the amount of the polycondensed residue of FAC in mol % ($FAC_{mol\ \%}$) ($R_1 = MAC_{mol\ \%}/FAC_{mol\ \%}$) in the OSAR, is at least 1 and at most 5, preferably at least 2 and at most 4.

The ratio ($R_2$) of the sum of the amounts in mol % of the polycondensed residues of 100 and PALC components ($IOC_{mol\ \%}$ and $PALC_{mol\ \%}$, respectively) to the amount of the polycondensed residue of FAC in mol % ($R_2 = (IOC_{mol\ \%} + PALC_{mol\ \%})/FAC_{mol\ \%}$) in the OSAR, is at least is at least 0.1 and at most 0.5.

The ratio ($R_3$) of the sum of the amounts in mol % of the polycondensed residues of PAC and MAC components to the amount of the polycondensed residue of PALC in mol % ($R_3 = (PAC_{mol\ \%} + MAC_{mol\ \%})/PALC_{mol\ \%}$) in the OSAR, is at least 150 and at most 1500, preferably is at least 150 and at most 1000, more preferably is at least 150 and at most 800, even more preferably is at least 150 and at most 500, most preferably is at least 150 and at most 400, especially is at least 150 and at most 300, more especially is at least 150 and at most 250, most especially is at least 150 and at most 200.

Every one of the aforementioned components of the OSAR are disclosed in detail in section 1 and its subsections 1.1 to 1.7.

Broadly in accordance with the invention, there is provided an OSAR according to claim 1.

Preferably, the OSAR is according to any one of the claims directed to the OSAR.

Preferably the OSAR is according to any one of the paragraphs A1 to A17.

The OSAR may be solid or liquid.

The OSAR is oxidizing because it crosslinks by the same mechanism as drying oils; the crosslink mechanism of drying oils is a complex one since it involves complex chemical reactions which involve (to mention some) peroxy radicals, free radicals, hydrogen abstraction from a methylene group between carbon-carbon double bonds, combination of radicals, hydrogen addition to a conjugated carbon-carbon double bond system, all of them contributing to the establishment of a chain reaction resulting in autoxidation. The crosslink reaction mechanism of the oxidizing alkyd resins (known in the art as 'autoxidation') may be—usually it is—catalysed by the use of 'driers' as these are known in the art of alkyd resins; typical examples of driers are organic metal compounds (as these are defined and disclosed in this specification).

The OSAR is short oil because it has an oil length lower than 40%, more specifically it has an oil length of at least 18 and at most 38, preferably at least 20 and at most 36, more preferably at least 22 and at most 35, even more preferably at least 24 and at most 35, most preferably at least 24 and at most 34, especially at least 26 and at most 34, for example at least 18 and at most 36, for example at least 18 and at most 35, for example at least 18 and at most 34, for example at least 22 and at most 36, for example at least 22 and at most 35, for example at least 22 and at most 34%.

The OSAR is ionic because it comprises pendant ionic functional groups as the latter are defined in the specification. These groups are attributed to the presence of at least the polycondensed residues of the ionic component (IOC). At least some of the functional groups of the OSAR may be neutralized with any one or any combination of an organic base, an inorganic base, and an emulsifying agent (as each one of them is defined in the specification).

The OSAR comprises one or both of: i) conjugated ethylenic unsaturations, and ii) diallylic ethylenic unsaturations.

The OSAR has an AV—as the AV is determined in the specification—of at most 20, preferably at most 10, more preferably at most 5 mg KOH/g. The OSAR has a $M_{n\text{-}OSAR}$—as the $M_n$ is determined in the specification—of at least 1500 and at most 10000, preferably at least 2000 and at most 8000, more preferably at least 2500 and at most 7000, most preferably at least 3000 and at most 6000 Da.

The OSAR has a $M_{w\text{-}OSAR}$—as the $M_w$ is determined in the specification—of at least 20000 and at most 400000, preferably at least 22000 and at most 200000, more preferably at least 25000 and at most 100000, most preferably at least 28000 and at most 80000, especially at least 30000 and at most 60000 Da.

The OSAR has a polydispersity (D=$M_{w\text{-}OSAR}/M_{n\text{-}OSAR}$) of at least 5 and at most 100, preferably at least 6 and at most 80, more preferably at least 7 and at most 60, most preferably at least 8 and at most 40, especially at least 8 and at most 35, more especially at least 10 and at most 35.

The OSAR has an oil length of at least 18 and at most 38, preferably at least 20 and at most 36, more preferably at least 22 and at most 34, even more preferably at least 24 and at most 32, most preferably at least 26 and at most 30, for example at least 18 and at most 36, for example at least 18 and at most 35, for example at least 18 and at most 34, for example at least 22 and at most 36, for example at least 22 and at most 35, for example at least 22 and at most 34%.

Preferably the OSAR is substantially-free of one or any combination of i) to vii): i) polycondensed residues of silanols e.g. siloxane groups, ii) polycondensed residues of $C_3$-$C_4$ unsaturated monocarboxylic acids, iii) polycondensed residues of 03-$C_4$ saturated monocarboxylic acids, iv) reacted residue of an acrylic resin, v) reacted residue of a polyurethane resin, vi) reacted residue of a urethane alkyd (uralkyd), and vii) reacted residue of a polysiloxane. By the term 'the OSAR is substantially-free of one or any combination of i) to vii): i) polycondensed residues of silanols e.g. siloxane groups, ii) polycondensed residues of $C_3$-$C_4$ unsaturated monocarboxylic acids, iii) polycondensed residues of $C_3$-$C_4$ saturated monocarboxylic acids, iv) reacted residues of an acrylic resin, v) reacted residues of a polyurethane resin, vi) reacted residues of a urethane alkyd (uralkyd), and vii) reacted residues of a polysiloxane', is meant in the specification that the OSAR comprises one or any combination of said i) to vii) in an amount of less than 5, preferably less than 4, more preferably less than 3, even more preferably less than 2, most preferably less than 1, especially less than 0.5, more especially less than 0.1 mol % based on the OSAR.

Preferably the OSAR is free of one or any combination of i) to vii): i) polycondensed residues of silanols e.g. siloxane groups, ii) polycondensed residues of $C_3$-$C_4$ unsaturated monocarboxylic acids, iii) polycondensed residues of $C_3$-$C_4$ saturated monocarboxylic acids, iv) reacted residues of an acrylic resin, v) reacted residues of a polyurethane resin, vi) reacted residues of a urethane alkyd (uralkyd), and vii) reacted residues of a polysiloxane', is meant in the specification that the OSAR does not comprise one or any combination of said i) to vii).

The OSAR is r.t.-curable. The OSAR is self-crosslinkable.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 1—including its subsections 1.1 to 1.7—can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

1.1 POC: The Polyol Component

The polyol component (POC) is selected from the group consisting of trialcohols, tetralcohols, pentalcohols, hexalcohols and mixtures thereof, and wherein each of the trialcohols, tetralcohols, pentalcohols, and hexalcohols has a theoretical molecular weight ($TMW_{trialcohol}$, $TMW_{tetralcohol}$, $TMW_{pentalcohol}$, $TMW_{hexalcohol}$, respectively) of at most 400, preferably at most 350, more preferably at most 300, even more preferably at most 250, most preferably at most 200, especially at most 150 Da.

The polycondensed residue of the POC is present in the OSAR in an amount of at least 10 and at most 35, preferably at least 15 and at most 33, more preferably at least 20 and at most 30 mol % based on the OSAR.

Preferably, the POC is selected from the group consisting of trialcohols, tetralcohols, hexalcohols and mixtures thereof and wherein each of the trialcohols, tetralcohols, hexalcohols has a theoretical molecular weight ($TMW_{trialcohol}$, $TMW_{tetralcohol}$, $TMW_{hexalcohol}$, respectively) of at most 400, preferably at most 350, more preferably at most 300, even more preferably at most 250, most preferably at most 200, especially at most 150 Da. More preferably the POC is selected from the group consisting of glycerol, trimethylolpropane, pentaerythritol, dipentaerythritol, and mixtures thereof, even more preferably the POC is pentaerythritol.

Exemplary trialcohols include but are not limited to glycerol, trimethylolpropane.

Exemplary tetralcohols include but are not limited to pentaerythritol, bis(trimethylolpropane) ether.

Exemplary pentalcohols include but are not limited to xylitol.

Exemplary hexalcohols include but are not limited to dipentaerythritol and sorbitol.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.2 PAC: The Polycarboxylic Acid Component

The polycarboxylic acid component (PAC) is selected from the group consisting of $C_8$-$C_{12}$ cycloaliphatic polycarboxylic acids, $C_8$-$C_{12}$ cycloaliphatic polycarboxylic acid anhydrides, $C_{10}$-$C_{16}$ esters of cycloaliphatic polycarboxylic acids, $C_8$-$C_{12}$ aromatic polycarboxylic acids, $C_8$-$C_{12}$ aromatic polycarboxylic acid anhydrides, $C_{10}$-$C_{16}$ esters of aromatic polycarboxylic acids, and mixtures thereof.

The polycondensed residue of the PAC is present in the OSAR in an amount of at least 10 and at most 30, preferably at least 12 and at most 28, more preferably at least 15 and at most 25 mol % based on the OSAR.

Preferably the PAC is selected from the group consisting of isophthalic acid, terephthalic acid, phthalic acid, phthalic acid anhydride, pyromellitic anhydride, tetrahydrophthalic anhydride, hexahydrophthalic anhydride, and mixtures thereof, more preferably from the group consisting of isophthalic acid, phthalic acid anhydride, hexahydrophthalic anhydride, even more preferably the PAC is phthalic acid anhydride.

Exemplary $C_8$-$C_{12}$ cycloaliphatic polycarboxylic acids include but are not limited to 1,4-cyclohexane dicarboxylic acid, 1,2-cyclohexanedicarboxylic acid.

Exemplary $C_8$-$C_{12}$ cycloaliphatic polycarboxylic acid anhydrides include but are not limited to phthalic anhydride, trimellitic anhydride.

Exemplary $C_{10}$-$C_{16}$ esters of cycloaliphatic polycarboxylic acids include but are not limited to diethyl tetrahydrophthalate, dimethyl hexahydrophthalate.

Exemplary $C_8$-$C_{12}$ aromatic polycarboxylic acids include but are not limited to isophthalic acid, terephthalic acid, phthalic acid.

Exemplary $C_8$-$C_{12}$ aromatic polycarboxylic acid anhydrides include but are not limited to phthalic anhydride (known also as phthalic acid anhydride), pyromellitic anhydride, trimellitic anhydride.

Exemplary $C_{10}$-$C_{16}$ esters of aromatic polycarboxylic acids include but are not limited to diethyl phthalate, dimethyl terephthalate, dibutyl isophthalate.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.3 MAC: The Monocarboxylic Acid Component

The monocarboxylic acid component (MAC) is selected from the group consisting of $C_7$-$C_{11}$ aromatic monocarboxylic acids, $C_8$-$C_{13}$ esters of aromatic monocarboxylic acids, $C_7$-$C_{11}$ saturated cycloaliphatic monocarboxylic acids, $C_8$-$C_{13}$ esters of saturated cycloaliphatic monocarboxylic acids, and mixtures thereof.

The polycondensed residue of the MAC is present in the OSAR in an amount of at least 20 and at most 50, preferably at least 25 and at most 45, more preferably at least 30 and at most 40 mol % based on the OSAR.

Preferably the MAC is selected from the group consisting of benzoic acid, 4-tertiary-butylbenzoic acid, and mixtures thereof, more preferably the MAC is benzoic acid.

Exemplary $C_7$-$C_{11}$ aromatic monocarboxylic acids include but are not limited to benzoic acid, 4-tertiary-butylbenzoic acid.

Exemplary $C_5$-$C_9$ saturated cycloaliphatic monocarboxylic acids include but are not limited to cyclohexane carboxylic acid.

Exemplary $C_8$-$C_{13}$ esters of saturated cycloaliphatic monocarboxylic acids include but are not limited to the methyl ester of the cyclohexane carboxylic acid.

Exemplary $C_8$-$C_{13}$ esters of aromatic monocarboxylic acids include but are not limited to methyl benzoate.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.4 FAC: The Fatty Acid Component

The fatty acid component (FAC) is selected from the group consisting of fatty acids and mixtures thereof, and wherein the FAC comprises ethylenic unsaturations and has an iodine number (ION) as determined by DIN 53241-1, of at least 15 and at most 300, more preferably of at least 20 to at most 250, more preferably of at least 25 and at most 225, even more preferably of at least 30 and at most 200, most preferably of at least 40 and at most 200, especially of at least 50 and at most 200, more especially at least 80 and at most 200, even more especially at least 100 and at most 200 cg/g, and wherein the amount of the polycondensed residue of FAC in the OSAR is least 1 and at most 30, preferably at least 2 and at most 28, more preferably at least 5 and at most 26, most preferably at least 10 and at most 25, especially at least 15 and at most 24, more especially at least 18 and at most 23 mol % based on the OSAR.

Preferably the FAC is selected from the group consisting of soybean oil fatty acids, sunflower oil fatty acids, tall oil fatty acids, linseed oil fatty acids, dehydrated castor oil fatty acids, cottonseed oil fatty acids, corn oil fatty acids, tung oil fatty acids, calendula oil fatty acids, safflower oil fatty acids, hemp oil fatty acids, and mixtures thereof, more preferably from the group consisting of soybean oil fatty acids, sunflower oil fatty acids, tall oil fatty acids, linseed oil fatty acids, dehydrated castor oil fatty acids and mixtures thereof, even more preferably from the group consisting of tall oil fatty acids, soybean oil fatty acids and mixtures thereof.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.5 IOC: The Ionic Component

The ionic component (IOC) is selected from the group consisting of aromatic monocarboxylic acid sulfonate salts, aromatic monocarboxylic acid alkyl ester sulfonate salts, aromatic dicarboxylic acid sulfonate salts, aromatic dialkyl ester sulfonate salts, and mixtures thereof, preferably aromatic dicarboxylic acid alkali metal sulfonate salts, aromatic dialkyl ester alkali metal sulfonate salts, more preferably aromatic dicarboxylic acid sodium sulfonate salts, aromatic dialkyl ester sodium sulfonate salts, aromatic dicarboxylic acid potassium sulfonate salts, aromatic dialkyl ester potassium sulfonate salts, most preferably the ionic component is selected from the group consisting of 5-(sulfo)isophthalic acid sodium salt, 5-(sulfo)isophthalic acid lithium salt, and mixtures thereof, especially the IOC is 5-(sulfo)isophthalic acid sodium salt.

The polycondensed residue of the IOC is present in the OSAR in an amount of at least 1.2 and at most 3, preferably at least 1.5 and at most 2.5, more preferably at least 1.8 and at most 2.2 mol % based on the OSAR.

Preferably the IOC is selected from the group consisting of aromatic dicarboxylic acid sulfonate salts and mixtures thereof, more preferably from the group consisting of aromatic dicarboxylic acid alkali metal sulfonate salts and mixtures thereof, even more preferably from the group consisting of 5-(sulfo)isophthalic acid alkali metal salts and mixtures thereof, most preferably from the group consisting of 5-(sulfo)isophthalic acid sodium salt, 5-(sulfo)isophthalic acid lithium salt and mixtures thereof, especially the IOC is 5-(sulfo)isophthalic acid sodium salt.

Exemplary aromatic monocarboxylic acid sulfonate salts include but are not limited to 3-(sulfo)benzoic acid sodium salt, 4-(sulfo)benzoic acid lithium salt.

Exemplary aromatic dicarboxylic acid sulfonate salts include but are not limited to 5-(sulfo)isophthalic acid sodium salt (abbreviated in the specification as SSIPA), 5-(sulfo)isophthalic acid lithium salt (abbreviated in the specification as LiSIPA).

Exemplary aromatic dialkyl ester sulfonate salts include but are not limited to 5-(sulfo)isophthalic acid sodium salt dimethyl ester, 5-(sulfo)isophthalic acid lithium salt dimethyl ester.

Exemplary aromatic dicarboxylic acid alkali metal sulfonate salts include but are not limited to SSIPA and LiSIPA.

Exemplary aromatic dialkyl ester alkali metal sulfonate salts include but are not limited to 5-(sulfo)isophthalic acid sodium salt dimethyl ester, 5-(sulfo)isophthalic acid lithium salt dimethyl ester.

Exemplary aromatic dicarboxylic acid sodium sulfonate salts include but are not limited to SSIPA and LiSIPA.

Exemplary aromatic dialkyl ester sodium sulfonate salts include but are not limited to 5-(sulfo)isophthalic acid sodium salt dimethyl ester, 5-(sulfo)isophthalic acid lithium salt dimethyl ester.

Exemplary aromatic dicarboxylic acid potassium sulfonate salts include but are not limited to SSIPA and LiSIPA.

Exemplary aromatic dialkyl ester potassium sulfonate salts include but are not limited to 5-(sulfo)isophthalic acid sodium salt dimethyl ester, 5-(sulfo)isophthalic acid lithium salt dimethyl ester.

The LiSIPA has the following formula:

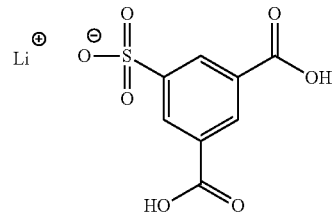 [SMILES: [Li+] ; O=C(O)c1cc(C(=O)O)cc(S(=O)(=O)[O-])c1]

The SSIPA has the following formula:

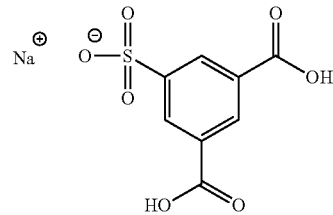 [SMILES: [Na+] ; O=C(O)c1cc(C(=O)O)cc(S(=O)(=O)[O-])c1]

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.5 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.6 PALC: The Polyalkylene Component

The polyalkylene component (PALC) is selected from the group consisting of polyalkylene glycols A1 (abbreviated as PG-A1), polyalkylene glycols A2 (abbreviated as PG-A2), polyether amines A1 (abbreviated as PE-A1), and mixtures thereof, preferably from the group consisting of PG-A1, PE-A1 and mixtures thereof, preferably from the group consisting of PG-A1, PG-A2, and mixtures thereof, more preferably the PALC is selected from the group consisting of PG-A1 and mixtures thereof, and wherein each of the PG-A1, PG-A2 and PE-A1 has a theoretical molecular weight ($TMW_{PG-A1}$ $TMW_{PG-A2}$ $TMW_{PE-A1}$, respectively) of at least 500 and at most 5000, preferably at least 600 and at most 4000, more preferably at least 700 and at most 3000, even more preferably at least 800 and at most 2000, most preferably at least 900 and at most 1600 Da.

The polycondensed residue of the PALC is present in the OSAR in an amount of at least 0.01 and at most 1, preferably at least 0.02 and at most 0.9, more preferably at least 0.03 and at most 0.8, even more preferably at least 0.04 and at most 0.7 mol % based on the OSAR.

Preferably the PALC is a polyalkylene glycol having a theoretical molecular weight ($TMW_{polyalkylene\ glycol}$) of at least 500 and at most 5000, preferably at least 600 and at most 4000, more preferably at least 700 and at most 3000, even more preferably at least 800 and at most 2000, most preferably at least 900 and at most 1600 Da, more preferably the PALC is polyethylene glycol having theoretical molecular weight ($TMW_{polyethylene\ glycol}$) of at least 500 and at most 5000, preferably at least 600 and at most 4000, more preferably at least 700 and at most 3000, even more preferably at least 800 and at most 2000, most preferably at least 900 and at most 1600 Da.

The polyalkylene glycols A1 (abbreviated as PG-A1) have the following formula A1 and a theoretical molecular weight ($TMW_{PG-A1}$) of at least 500 and at most 5000, preferably at least 600 and at most 4000, more preferably at least 700 and at most 3000, even more preferably at least 800 and at most 2000, most preferably at least 900 and at most 1600 Da:

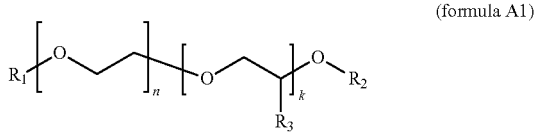

(formula A1)

wherein n is an integer of at least 1 and at most 200, and k is an integer of at least 0 and at most 50, and $R_1$ is either H or $CH_3$, and $R_2$ is selected from the group consisting of H, $CH_3$, and $C_2$-$C_{10}$ optionally substituted hydrocarbyl having at most three substituents each of which is a hydroxyl group, and $R_3$ is $CH_3$, or a $C_2$-$C_{10}$ hydrocarbyl, and wherein the formula A1 has at least one and at most four, preferably has at least two and at most three hydroxyl groups.

Preferably the polyalkylene glycols A1 have the following formula A1a and a theoretical molecular weight ($TMW_{PG-A1a}$) of at least 500 and at most 5000, preferably at least 600 and at most 4000, more preferably at least 700 and at most 3000, even more preferably at least 800 and at most 2000, most preferably at least 900 and at most 1600 Da:

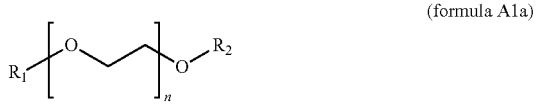

(formula A1a)

wherein n is an integer of at least 1 and at most 50, and $R_1$ is either H or $CH_3$, and $R_2$ is selected from the group consisting of H, $CH_3$, and $C_2$-$C_{10}$ optionally substituted hydrocarbyl having at most three substituents each of which is a hydroxyl group, and wherein the formula A1 has at least one and at most four, preferably has at least two and at most three hydroxyl groups.

More preferably the polyalkylene glycols A1 have the following formula A1b and a theoretical molecular weight ($TMW_{PG-A1b}$) of at least 500 and at most 5000, preferably at least 600 and at most 4000, more preferably at least 700 and at most 3000, even more preferably at least 800 and at most 2000, most preferably at least 900 and at most 1600 Da:

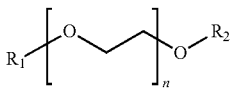

(formula A1b)

wherein n is an integer of at least 1 and at most 50, and $R_1$ is either H or $CH_3$, and $R_2$ is selected from the group consisting of H, and $C_2$-$C_8$ substituted hydrocarbyl having at most three substituents each of which is a hydroxyl group, preferably the $C_2$-$C_8$ substituted hydrocarbyl has two hydroxyl groups as substituents.

The polyalkylene glycols A1 of formula A1a (in the specification abbreviated as PG-A1a) constitute a sub-category of the polyalkylene glycols A1.

The polyalkylene glycols A1 of formula A1b (in the specification abbreviated as PG-A1b) constitute a sub-category of the polyalkylene glycols A1.

The polyalkylene glycols A1 of formulae A1a and A1b constitute sub-categories of the polyalkylene glycols A1, thus also each of the polyalkylene glycols A1 of formulae A1a and A1b have a theoretical molecular weight ($TMW_{PG-A1a}$ and $TMW_{PG-A1b}$, respectively) of at least 500 and at most 5000, preferably at least 600 and at most 4000, more preferably at least 700 and at most 3000, even more preferably at least 800 and at most 2000, most preferably at least 900 and at most 1600 Da.

Exemplary polyalkylene glycols A1 include but are not limited to polyethylene glycol, and to Ymer™ N120 (available from Perstorp). The Ymer™ N120 has the following formula:

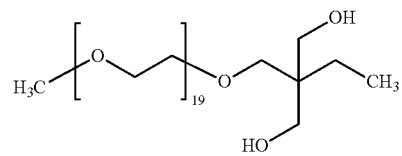

The polyethylene glycol and the Ymer™ N120 read on each of the formulae A1, A1a and A1b. Preferably, the PALC is selected from the group consisting of polyethylene glycols, the Ymer™ N120 (which is a polyalkylene glycol having the formula shown for the Ymer™ N120), and mixtures thereof.

The polyalkylene glycols A2 (abbreviated as PG-A2) have the following formula A2 and a theoretical molecular weight ($TMW_{PG-A2}$) of at least 500 and at most 5000, preferably at least 600 and at most 4000, more preferably at least 700 and at most 3000, even more preferably at least 800 and at most 2000, most preferably at least 900 and at most 1600 Da:

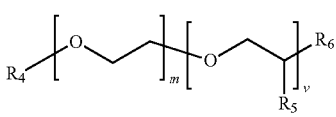

(formula A2)

wherein m is an integer of at least 1 and at most 100, and v is an integer of at least 0 and at most 40, and $R_4$ is either H or $CH_3$, and $R_5$ is $CH_3$, or a $C_2$-$C_{10}$ hydrocarbyl, and $R_6$ is selected from the group consisting of H, $CH_3$, and $C_2$-$C_{10}$ optionally substituted hydrocarbyl having at most four substituents selected from the group consisting of hydroxyl and amino groups and at least one of them—preferably two—is a hydroxyl group, and wherein the formula A2 has at least one and at most four, preferably at least two and at most three hydroxyl groups.

Exemplary polyalkylene glycols A2 include but are not limited to (ethylene glycol)-block-(propylene glycol) polyalkylene glycols [also known as poly(ethyleneglycol)-block-poly(propyleneglycol)s].

The polyether amines A1 (abbreviated as PE-A1) have the following formula PE1 and a theoretical molecular weight ($TMW_{PE-A1}$) of at least 500 and at most 5000, preferably at least 600 and at most 4000, more preferably at least 700 and at most 3000, even more preferably at least 800 and at most 2000, most preferably at least 900 and at most 1600 Da:

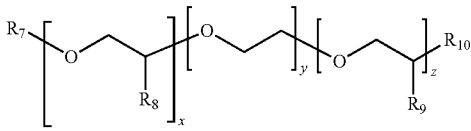

(formula PE1)

wherein x ranges from 0 up to and including 30, and y ranges from 1 up to and including 100, and z ranges from 0 up to and including 30 when x is different than 0, and from 1 up to and including 40 when x is 0, and $R_7$ is selected from the group consisting of $CH_3$, and $C_2$-$C_{10}$ optionally substituted hydrocarbyl (preferably $C_2$-$C_5$ optionally substituted hydrocarbyl, more preferably $C_3$ optionally substituted hydrocarbyl) having at most two substituents each of which is an amino group, preferably the $C_2$-$C_{10}$ optionally substituted hydrocarbyl (preferably $C_2$-$C_5$ optionally substituted hydrocarbyl, more preferably $C_3$ optionally substituted hydrocarbyl) has one amino group as substituent, and $R_8$ is $CH_3$, or a $C_2$-$C_{10}$ hydrocarbyl, preferably $CH_3$, and $R_9$ is $CH_3$, or a $C_2$-$C_{10}$ hydrocarbyl, preferably $CH_3$, and $R_{10}$ is $NH_2$.

Exemplary polyether amines A1 include but are not limited to Jeffamine® polyether amines (available from HUNTSMAN) such as the Jeffamine® M-1000 which has the following formula:

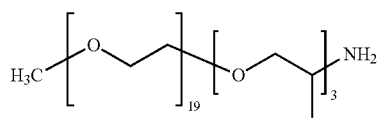

the Jeffamine® M-2005 which has the following formula:

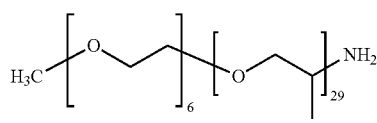

the Jeffamine® M-2070 which has the following formula:

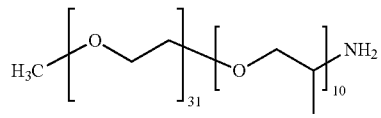

and Jeffamine® which have the following formula:

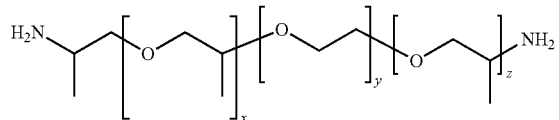

wherein y=9 and x+z=3.6 (Jeffamine® ED-600), or y=12.5 and x+z=6 (Jeffamine® ED-900), or y=39 and x+z=6 (Jeffamine® ED-2003).

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.6 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.7 EOC: The Epoxy Component

The epoxy component (EOC) is optional.

If present, the epoxy component (EOC) is selected from the group consisting of monoepoxides, diepoxides and mixtures thereof, and wherein each of the monoepoxides and diepoxides has an epoxy equivalent weight (EEW) determined titrimetrically according to ISO-3001, of at least 100 and at most 1000, preferably at least 150 and at most 800, more preferably at least 180 and at most 600, even more preferably at least 200 and at most 400 g/eq. The EEW is the number of grams of epoxy material containing one equivalent of epoxy groups. It is determined by titrating a sample solution in tetrahydrofuran containing tetraethylammonium bromide using 0.1 M perchloric acid in glacial acetic acid and crystal violet visual end point indicator.

If present, the reacted residue of the EOC is present in the OSAR in an amount of at least 0.1 and at most 5, preferably at least 0.2 and at most 4.5, more preferably at least 0.5 and at most 4, even more preferably at least 0.8 and at most 3.5, most preferably at least 1 and at most 3 mol % based on the OSAR.

If present, preferably the EOC is selected from the group consisting of monoepoxides and mixtures thereof, more preferably from the group consisting of glycidyl neodecanoate, glycidyl isobutyl ether, glycidyl octyl ether, and mixtures thereof.

The reacted residues of the EOC are derived upon the reaction of the EOC with a carboxylic acid group of the OSAR, forming a hydroxy ester group.

Exemplary monoepoxides include but are not limited to glycidyl neodecanoate, glycidyl isobutyl ether, glycidyl octyl ether.

Exemplary diepoxides include but are not limited to bisphenol-A diglycidylether.

Preferably, the OSAR is substantially-free of reacted residues of one or any combination of i) to iii): i) a monoepoxide, ii) a diepoxide and iii) a polyepoxide. By the term 'the OSAR is substantially-free of reacted residues of one or any combination of i) to iii): i) a monoepoxide, ii) a diepoxide and iii) a polyepoxide, is meant in the specification that the OSAR comprises reacted residues of a monoepoxide, a diepoxide, a polyepoxide, or a combination thereof in an amount of less than 5, preferably less than 4.5, more preferably less than 4, even more preferably less than 3.5, most preferably less than 3, especially less than 2, more especially less than 1, most especially less than 0.8, for example less than 0.5, for example less than 0.2, for example less than 0.1 mol % based on the OSAR.

Preferably, the OSAR is free of reacted residues of one or any combination of i) to iii): i) a monoepoxide, ii) a diepoxide and iii) a polyepoxide. By the term 'the OSAR is free of reacted residues of one or any combination of i) to iii): i) a monoepoxide, ii) a diepoxide and iii) a polyepoxide, is meant in the specification that the OSAR does not comprise reacted residues of a monoepoxide, a diepoxide, a polyepoxide, or a mixture thereof.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.7 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

2. The Processes for Making the OSAR

The OSAR is the polycondensation reaction product of at least the following components POC, PAC, MAC, FAC, IOC, and PALC—as each of them is defined below—, and as such the OSAR comprises polycondensed residues of at least the aforementioned components POC, PAC, MAC, FAC, IOC, and PALC. The OSAR may further comprise reacted residues of an epoxy component (EOC) as the latter is defined in the specification. Preferably, the OSAR is substantially-free, preferably free of reacted residues of a monoepoxide, a diepoxide, a polyepoxide, or a mixture thereof. Preferably, the OSAR is the polycondensation reaction product of the following components POC, PAC, MAC, FAC, IOC, and PALC and as such the OSAR consists of polycondensed residues of at least the aforementioned components POC, PAC, MAC, FAC, IOC, and PALC.

The OSAR is prepared according to conventional polycondensation polymerization procedures by esterification or transesterification, optionally in the presence of customary polycondensation catalysts for example dibutyltin oxide, butyl stannoic acid or tetrabutyl titanate. General processes for the preparation of alkyd polyesters are disclosed in 'Alkyd Resin Technology: Formulation Techniques and Allied calculations' by Temple C. Patton (publisher Interscience, 1962).

The preparation conditions and the —COOH/—OH ratio may be selected so as to obtain an OSAR that has an acid value and a hydroxyl value within a targeted range of values as disclosed in the specification. Preferably the OSAR is prepared in bulk without the use of a solvent. The polycondensation reaction may occur at a temperature of from 140 to 290, preferably from 150 to 270, more preferably from 200 to 250, even more preferably from 220 to 240° C. Reaction times may range from 2 to 96 hours, preferably less than 72 hours, more preferably less than 60 hours. The condensation polymerization reaction is preferably carried out in a reaction vessel (the term reaction vessel is used in the specification interchangeably with the term reactor). The condensation polymerization reaction is preferably carried out in a nitrogen atmosphere. Preferably the reaction is carried out under vacuum e.g. 0.05 to 0.9, preferably 0.05 to 0.3 bar, to remove the by-product produced during the condensation polymerization reaction e.g. water, whilst vacuum is typically applied during the synthesis of an OSAR in order to achieve the desired specifications of the OSAR. Azeotropic distillation techniques that are well-known in the art of condensation polymerization, may be used in order to facilitate the removal of the by-product produced during the condensation polymerization reaction e.g. water.

Once prepared and while still in the reactor at temperatures in the range of 130 to 240° C., the OSAR is in a liquid state. An OSAR can be isolated in any known way including direct discharge from a reactor, from a temperature as high as for example 200° C. and as low as room temperature, any known way of spray drying, freeze drying, flashing or through devolatization after the condensation polymerization reaction or combinations thereof.

One or any combination of the following analytical techniques NMR spectroscopy, viscometry, and titration, may be employed to follow the progress of any one of the steps of the condensation polymerization.

Typically and depending on the reaction set up, one skilled in the art knows that an additional amount of alcohols e.g. diols, during the synthesis of a polyester resin such as an OSAR, may be used to compensate for alcohol losses that may take place during the synthesis of an OSAR; one skilled in the art knows and can easily calculate said amount of alcohols e.g. diols, given the experimental set up, the composition of the OSAR, said polyester resin's desired AV and desired OHV.

If desired, additives such anti-oxidants, flow additives, tribo additives can be added to the OSAR whilst the OSAR is in the reactor and prior the OSAR is discharged as mentioned in the specification; this addition typically takes place at temperatures in the range of 170-195° C. or in the range of 160-210° C. If said additives are mixed within the OSAR, a reasonable amount of time to ensure proper mixing of the additive into the OSAR is carried out; for example, the mixing can last from 15 to 60 min at temperatures in the range of 170-195° C.; subsequently, the OSAR is ready for being discharged.

A typical process for preparing the OSAR (in isolated or solution form) comprises the steps of:
i) providing a reaction vessel (reactor), the components POC, PAC, MAC, FAC, IOC, PALC, and polycondensation catalyst e.g. dibutyltin oxide, tetrabutyl titanate or butyl stannoic acid, in an amount of at least 50 and at most 2500, preferably at least 100 and at most 1500, more preferably at least 250 and at most 1000, most preferably at least 400 and at most 600, especially 450 ppm on the total weight of the components POC, PAC, MAC, FAC, IOC, PALC, and
ii) charging the reactor with a mixture of POC, MAC, IOC, PALC, and the catalyst, and iii) heating the above mixture up to 200-220° C. (and removing the polycondensation reaction by-product e.g. water or alcohol, via distillation), for as long as it takes to render the mixture transparent, preferably for 0.1 to 6 h, more preferably 0.5 to 3 h, even more preferably for 1 to 2 h, and iv) subsequently cooling down the mixture to 120-180° C., and once said temperature is reached, adding the component PAC to the mixture, and once the addition of the component PAC is completed heating the mixture up again to 200-220° C., and v) once the temperature of the mixture reached 200-220° C. dosing the component FAC over a period of time preferably over 1 h, more preferably over 2 h, even more preferably over 3 hours maintaining the temperature of the reaction mixture constant at 200-220° C., and vi) once the addition of the FAC is completed, heating the reaction mixture up to 230-240° C., and vii) removing the polycondensation reaction by-product e.g. water or alcohol, via distillation, optionally via azeotropic distillation, maintaining the temperature of the reaction mixture at 230-240° C. for as long as to obtain the desired acid value—as this is disclosed in the specification for the OSAR—, and viii) optionally, cooling the reaction mixture down to 200-210° C. in order to remove all the components of the azeotropic mixture [in case an azeotropic distillation was used in step vii)], and ix) cooling the reaction mixture down to room temperature, and either discharging it from the reaction vessel to obtain the OSAR or adding an organic solvent e.g. acetone to solubilise the OSAR whilst in the reaction vessel and thus obtaining a solution of the OSAR in the organic solvent used, and subsequently discharging said solution from the reaction vessel to obtain a solution of the OSAR in said organic solvent.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

3. The Composition of the Invention (C)

Any and all of the compositions disclosed in this section are collectively referred to—in the whole of the application—as the compositions of the invention, or equally as the 'C'. By 'C' is meant in the specification a composition according to the invention. The term 'C' as used in the specification includes any and all of its preferments, combinations of its features and ranges as well as combinations of any and all of its preferments with any and all of the combinations of its features and ranges. Thus, any and all of the C disclosed in this section includes any and all of their preferments, combinations of their features and ranges as well as combinations of any and all of their preferments with any and all of the combinations of their features and ranges, are collectively referred to—in the whole of the application—as the C.

The C comprises:

i) a Binder-C selected from the group consisting of an OSAR as claimed in any one of the preceding claims, and a mixture of an OSAR with an oxidizing alkyd resin other than the OSAR, and ii) a drier, preferably in an amount of at least 0.001 and at most 5, more preferably at least 0.1 and at most 4, even more preferably at least 0.2 and at most 3, especially at least 0.5 and at most 2, more especially at least 0.8 and at most 1.5 pph Binder-LC, wherein preferably the drier is an organic metal compound, preferably the drier is soluble in the OSAR, preferably the drier is soluble in the OSAR and in the C, preferably the drier is an organic metal compound soluble in the OSAR, preferably the drier is an organic metal compound soluble in the OSAR and in the C.

The drier—preferably an organic metal compound—is able to catalyse the crosslink reaction mechanism of the Binder-C. In other words, the drier is able to catalyse the autoxidation of the Binder-C.

Preferably, the drier is an organic metal compound.
Preferably, the drier is soluble in the OSAR.
Preferably, the drier is soluble in the OSAR and in the C.
Preferably, the drier is soluble in the OSAR and in the C and in the LC.
Preferably, the drier is an organic metal compound soluble in the OSAR.
Preferably, the drier is an organic metal compound soluble in the OSAR and in the C.
Preferably, the drier is an organic metal compound soluble in the OSAR and in the LC and in the C.

Preferably, the C comprises:

i) a Binder-C selected from the group consisting of an OSAR as claimed in any one of the preceding claims, and a mixture of an OSAR with an oxidizing alkyd resin other than the OSAR, and ii) a drier which is an organic metal compound, preferably in an amount of at least 0.001 and at most 5, more preferably at least 0.1 and at most 4, even more preferably at least 0.2 and at most 3, especially at least 0.5 and at most 2, more especially at least 0.8 and at most 1.5 pph Binder-LC, wherein preferably the organic metal compound is soluble in the OSAR, more preferably the organic metal compound is soluble in the OSAR and in the C.

Any reference to the organic metal compound shown in this section 3, is made on the basis of the definition of the organic metal compound—including any and all of its preferments—as defined in the description.

Exemplary organic metal compounds include but are not limited to Borchi® OXY—Coat 1101 (supplied by Borchers; see Examples).

Broadly in accordance with the invention, there is provided a composition (C) according to any one of the claims directed to the C.

Preferably the C is according to any one of the paragraphs A18 to A22.

The C may be solid (e.g. in the form of powder or a paste), or liquid.

Preferably the C is solid (e.g. in the form of powder or a paste), or liquid.

Preferably the C comprises the Binder-C in an amount of at least 20 and at most 99.999, more preferably at least 25 and at most 90, even more preferably at least 30 and at most 80, most preferably at least 35 and at most 70, especially at least 40 and at most 60, more especially at least 45 and at most 55 pph C. Preferably, the Binder-C comprises the OSAR in an amount of at least 1 and at most 100, more preferably at least 20 and at most 100, even more preferably at least 50 and at most 100, most preferably at least 80 and at most 100 pph Binder-C, especially the Binder-C is (consists of) the OSAR.

The C and equally the Binder-C may be prepared by any well-known method of mixing for example melt-mixing, mechanical mixing, combination of mechanical and melt-mixing of their corresponding components at a temperature and for a time that prevent their decomposition, parameters that can be easily fixed and are understood by one of ordinary skill in the art.

Preferably, the C is substantially-free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond.

By the term 'the C is substantially-free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond' is meant in the specification that the C comprises one or any combination of said i) to iv) in an amount of less than 5, preferably less than 4, more preferably less than 3, even more preferably less than 2, most preferably less than 1, especially less than 0.5, more especially less than 0.1 pph C.

Preferably, the C is free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond. By the term 'the C is free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond' is meant in the specification that the C does not comprise one or any combination of said i) to iv).

The C may further comprise one or any combination of a pigment, a dye, and an additive. The pigments, the dyes and the additives that may be used in the C are disclosed in section 4 of the description.

The amount of pigment in the C may be at least 0.1 and at most 100, preferably at least 0.1 and at most 60 pph Binder-C.

The amount of dyes in the C may be at least 0.01 and at most 7, preferably at least 0.1 and at most 5 pph Binder-C.

The amount of dyes in the C may be at least 0.01 and at most 7, preferably at least 0.1 and at most 8 pph Binder-C.

The C is r.t.-curable.

The C is self-crosslinkable.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

4. The Liquid Composition of the Invention (LC)

Any and all of the liquid compositions disclosed in this section are collectively referred to—in the whole of the application—as the compositions of the invention, or equally as the 'LC'. By 'LC' is meant in the specification a liquid composition according to the invention. The term 'LC' as used in the specification includes any and all of its preferments, combinations of its features and ranges as well as combinations of any and all of its preferments with any and all of the combinations of its features and ranges. Thus, any and all of the LC disclosed in this section includes any and all of their preferments, combinations of their features and ranges as well as combinations of any and all of their preferments with any and all of the combinations of their features and ranges, are collectively referred to—in the whole of the application—as the LC.

The LC comprises:
i) a Binder-LC selected from the group consisting of an OSAR as disclosed in the specification, and a mixture of an OSAR with an oxidizing alkyd resin other than the OSAR, and
ii) one or both of water and an organic solvent, preferably the organic solvent is a cosolvent.

Thus, the LC may be water-borne or solvent-borne.

Preferably, the LC is a water-borne composition (as this is defined in the specification), more preferably the LC is an emulsion or an aqueous dispersion, even more preferably the LC is a liquid coating composition, most preferably the LC is an aqueous coating composition.

Preferably the LC comprises the Binder-LC in an amount of at least 1 and at most 95, more preferably at least 40 and at most 90, even more preferably at least 50 and at most 75 pph LC.

Preferably, the Binder-LC comprises the OSAR in an amount of at least 1 and at most 100, more preferably at least 20 and at most 70, even more preferably at least 30 and at most 60, most preferably at least 40 and at most 50 pph Binder-LC, especially the Binder-LC is (consists of) the OSAR.

Preferably, the LC is substantially-free of one or both of an organic base and an emulsifying agent, more preferably the LC is free of an organic base and an emulsifying agent. By the term 'the LC is substantially-free of one or both of an organic base and an emulsifying agent' is meant in the specification that the LC comprises one or both of an organic base and an emulsifying agent in an amount of less than 5, preferably less than 4, more preferably less than 3, even more preferably less than 2, most preferably less than 1, especially less than 0.5, more especially less than 0.1 pph LC. By the term 'the LC is free of an organic base and an emulsifying agent' is meant in the specification that the LC does not comprise an organic base and an emulsifying agent.

Although one may use an organic base to neutralize some of the functional groups of the OSAR, and/or reacting or interacting at least some of the functional groups of the OSAR with an emulsifying agent, their presence in the LC is optional, and preferably—as stated just above—their use is to be either restricted to low amounts or avoided completely.

Preferably, the LC is substantially-free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond. By the term 'the LC is substantially-free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond' is meant in the specification that the LC comprises one or any combination of said i) to iv) in an amount of less than 5, preferably less than 4, more preferably less than 3, even more preferably less than 2, most preferably less than 1, especially less than 0.5, more especially less than 0.1 pph LC.

Preferably, the LC is free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond. By the term 'the LC is free of one or any combination of i) to iv): i) an acrylic resin, ii) a polyurethane resin, iii) a urethane alkyd (uralkyd), and iv) a polysiloxane, wherein each of the acrylic resin, polyurethane resin and the uralkyd is separate and distinct from the OSAR, and not bonded to the OSAR by a covalent bond' is meant in the specification that the LC does not comprise one or any combination of said i) to iv).

Preferably, the LC further comprises: iii) a drier preferably in an amount of at least 0.001 and at most 5, more preferably at least 0.1 and at most 4, even more preferably at least 0.2 and at most 3, especially at least 0.5 and at most 2, more especially at least 0.8 and at most 1.5 pph Binder-LC, wherein preferably the drier is an organic metal compound, preferably the drier is soluble in the OSAR, preferably the drier is soluble in the OSAR and in the LC, preferably the drier is an organic metal compound soluble in the OSAR, preferably the drier is an organic metal compound soluble in the OSAR and in the LC.

The drier—preferably an organic metal compound—is able to catalyse the crosslink reaction mechanism of the Binder-LC. In other words, the drier is able to catalyse the autoxidation of the Binder-LC.

Preferably, the drier is an organic metal compound.
Preferably, the drier is soluble in the OSAR.
Preferably, the drier is soluble in the OSAR and in the LC.
Preferably, the drier is soluble in the OSAR and in the LC and in the C.
Preferably, the drier is an organic metal compound soluble in the OSAR.
Preferably, the drier is an organic metal compound soluble in the OSAR and in the LC.
Preferably, the drier is an organic metal compound soluble in the OSAR and in the LC and in the C.

Broadly in accordance with the invention, there is provided a liquid composition (LC) according to any one of the claims directed to the LC.

Preferably the LC is according to any one of the paragraphs A23 to A34.

Preferably, the LC comprises:
i) a Binder-LC selected from the group consisting of an OSAR as disclosed in the specification, and a mixture of an OSAR with an oxidizing alkyd resin other than the OSAR, and
ii) one or both of water and an organic solvent, preferably the organic solvent is a cosolvent, and iii) a drier which is an organic metal compound, preferably in an amount of at least 0.001 and at most 5, more preferably at least 0.1 and at most 4, even more preferably at least 0.2 and at most 3, especially at least 0.5 and at most 2, more especially at least 0.8 and at most 1.5 pph Binder-LC, wherein preferably the organic metal compound is soluble in the OSAR, more preferably the organic metal compound is soluble in the OSAR and in the LC.

Exemplary organic metal compounds include but are not limited to Borchi® OXY—Coat 1101 (supplied by Borchers; see Examples).

Any reference to the organic metal compound shown in this section 4, is made on the basis of the definition of the organic metal compound—including any and all of its preferments—as defined in the description.

The LC may or may not comprise an organic solvent. In other words, the LC may optionally comprise an organic solvent. Exemplary organic solvents include but are not limited mineral spirits, benzene, xylene, naphtha type solvents, toluene, n-butyl acetate, isobutyl acetate, t-butyl acetate, ethyl acetate, n-propyl acetate, isopropyl acetate, ethyl acetate, methyl acetate, trimethylpentane diol mono-isobutyrate, ethylene glycol mono-octyl ether, diacetone alcohol, ester alcohols e.g. those available by Eastman under the trade name Texanol™, alcohol ethers, alcohol ether acetates, ethyl diglycol, ethyl glycol acetate, butyl glycol, butyl glycol acetate, butyl diglycol, butyl diglycol acetate, and methoxypropylene glycol acetate, methyl ethyl ketone, acetone, methyl isobutyl ketone, methyl isoamyl ketone, methyl amyl ketone, hydrocarbons e.g. aliphatic hydrocarbons, cycloaliphatic hydrocarbons, aromatic hydrocarbons, some of them available by Shell under the trade name ShellSol® e.g. ShellSol® H, ShellSol® K, AB, ShellSol® T, some others available by Esso under the trade names Solvesso™ and Exxsol™ e.g. Solvesso™ 150, Exxsol™ D30, Exxsol™ D40, Exxsol™ D60, and any combination of any one of the above mentioned in this paragraph. If the LC comprises an organic solvent, then the preferably the LC comprises organic solvent in an amount of at most 40, more preferably at most 30, even more preferably at most 20, most preferably at most 10, especially at most 5, more especially at most 2, most especially at most 1 pph LC.

The LC may or may not comprise an organic cosolvent. In other words, the LC may optionally comprise an organic cosolvent. If the LC comprises an organic cosolvent, then the preferably the LC comprises organic cosolvent in an amount of at most 15, more preferably at most 10, even more preferably at most 8, most preferably at most 5, especially at most 3, more especially at most 2, most especially at most 1 pph LC.

The LC may be a solvent-borne coating composition, preferably a high-solids solvent-borne coating composition. The solvent-borne coating compositions of the invention may comprise organic solvent as this and its amount was disclosed above. Z. W. Wicks, Jr., F. N. Jones, S. P. Pappas, in 'Organic Coatings—Science & Technology', J. Wiley & Sons, 1999, $2^{nd}$ edition, Ch. 24, pp. 453-466, explain the terminology used in the art of solvent-borne coating compositions and provide ways and methods for their preparation and further literature on this matter.

Preferably the LC is an aqueous dispersion or an emulsion. Aqueous dispersions and emulsions of the OSAR may be obtained by conventional means, by once having prepared the OSAR as disclosed in the specification to subsequently prepare a solution of the OSAR into an organic solvent such as acetone, in order to prepare a solution (50-70 wt % solids) and then heating under atmospheric pressure the thus obtained solution up to a temperature that fulfills both i) and ii): i) the temperature is below the boiling point of the organic solvent by about 10° C. (in the case of acetone, at about 45° C.), and ii) the temperature does not exceed 65° C. Optionally, an organic or inorganic base may be used—at any stage of the process—to neutralize at least some of the functional groups of the OSAR e.g. carboxyl groups, and/or an emulsifying agent may be used to react or interact with at least some of the functional groups of the OSAR. Subsequently, at the temperature previously reached and now maintained e.g. 45° C. in case of acetone, and under atmospheric pressure water is slowly added to the solution, typically rendering gradually the solution into a mixture of milky appearance. Upon completion of the water addition or during the addition of water, additives such as defoamers e.g. Byk® 028, may be optionally added to the mixture (this mixture if isolated is an aqueous dispersion of the OSAR). Upon the completion of the water addition, the acetone may be removed by vacuum distillation, to obtain an emulsion of the OSAR.

The LC may further comprise one or any combination of a pigment, a dye, and an additive.

Pigments are insoluble, fine particle size materials (typical particle ranges from 0.01 to 100 micron) that are mainly used to provide colour and reduce cost. In general, the amount of pigment in the LC may be at least 0.1 and at most 95, preferably at least 0.1 and at most 60 pph Binder-LC. Pigments are divided into four broad classes: white, colour, inert, and functional pigments. Exemplary pigments include but are not limited to carbon black, shepard black No. 1, titanium dioxide white, chromium oxide green, zinc oxide, iron oxide yellows, reds, browns and blacks, such as ferrite yellow oxide, ferric oxides, raw sienna and burnt sienna, lead chromate, copper phthalonitrile blue, phthalocyanine blues and greens, ultramarine blue, toluidine red, parachlor red, cadmium reds and yellows, phthaloorganamine blues and greens, iron blues, organic maroons, anatase titanium dioxide, zinc sulfide, and the mixed metal oxide pigments, such as manganese ferrite black, chromium green black hematite, cobalt aluminate blue spinel, copper chromite black spinel, and sodium alumina sulfosilicate, metallics made with aluminum, mica, or brass. Fillers are inert pigments typically used to occupy volume in the coating and reduce the coating's cost. Exemplary fillers include but are not limited to silica, such as fumed silica, glass frit, flour, calcium carbonate, barium sulphate, mica, ammonium chloride, ammonium bromide, boric acid, antimony trioxide, fumed alumina, clays such as kaolin, china clay, talc, lithopone, zinc sulfide, lead titanate, zirconium oxide, white lead, barium oxide, calcium oxide or hydroxide, magnesium oxide or hydroxide, chalk, asbestos, ceramic, hollow glass, resin microspheres, pearl essence, barytes, diatomaceous earth, aluminum trihydrate, onyx flour, calcium silicate, mixed silicates.

Dyes are soluble colored substances used to impart color to a coating. In general, the amount of dyes in the LC may be at least 0.01 and at most 7, preferably at least 0.1 and at most 5 pph Binder-LC. Exemplary dyes include but are not limited to metal complex dyes, anionic dyes, and azo dyes. Metal complex dyes consist of a metal atom (generally Cr, Cu, Co, Ni) which is coordinated with chelating ligands mainly azo dyes via 0 and N atoms. Anionic dyes (known also as acid dyes) are azo dyes containing one or more sulphonic groups. Pararosanil, methyl violet, crystal violet, methyl green are typical examples of dyes.

Additives are substances added to a composition in small quantities (typically from 0.1 to 8 pph Binder-LC) in order to impart specific properties to the composition or to the coating produced from the composition. Exemplary additives include but are not limited to gloss control aids, flow aids, thixotropic agents, leveling agents, wetting and dispersing agents, anti-cratering agents, light stabilizers, biocides, surface active additives. Exemplary gloss control agents are polyethylene waxes, oxidized polyethylenes, polyamides. Exemplary flow aids include but are not limited to acrylic or silicone flow aids, which are composed of acrylic or silicone resins, respectively. The acrylic resins are generally liquids which have been converted to powder form by absorption onto silica-type materials. Examples of acrylic flow aids are Resiflow® P67 which is a 2-propenoic acid, ethyl ester polymer BYK® 352 and BYK® 300. Anti-cratering aids can be used in these formulations to reduce or eliminate bubbles or trapped gas from the substrate or coating. Typical anti-cratering agents include, benzoin (2-hydroxy-1,2-diphenylethanone) and its analogs, and plasticizers, such as low molecular weight phenoxies and phthalates.

The LC is r.t.-curable.

The LC is self-crosslinkable.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification

5. Other Aspects of the Invention

Each of the OSAR, the Binder-C, the Binder-LC, the composition C, and the liquid composition LC is particularly suitable for paints (especially water-borne coating compositions, e.g. aqueous coating compositions) and coatings.

The invention further relates to methods for coating articles having the C coated thereon.

The invention further relates to methods for coating articles having the LC coated thereon.

The C and the LC may be applied to an article by any conventional and well-known liquid paint (coating) application methods; exemplary paint application methods include but are not limited to brushing, dipping, autodeposition, flow coating, spraying, deposition, electro-deposition, electrostatic spray, rolling, roll-to-roll, web-based coating, curtain coating, slot die coating, wire-wound rod coating, screen printing, rotary screen coating, flexography, ink-jet printing, sputtering, embossing, in-mould finish, fluidized bed, electrostatic fluidized bed, flame spray. Some of these methods are particularly suited for certain types of coating compositions mainly depending on the physical form said compositions are available. One skilled in the art knows well what paint/coating application to use for a particular coating composition. Details as to these methods are also available by A. A. Tracton in 'Coatings Technology Handbook' CRC Taylor & Francis Group, 2005, $3^{rd}$ edition, Ch. II, from 18-1 to 45-1, and also in Z. W. Wicks, Jr., F. N.

Jones, S. P. Pappas, in 'Organic Coatings—Science & Technology', John Wiley & Sons, 1999, $2^{nd}$ edition, Ch. 22, pp. 417-432.

Broadly in accordance with the invention there is provided a process for preparing an article having a C coated thereon, said process comprising the steps of:
i) providing a C and an article; and
ii) depositing the C onto the article via any one of the following ways: brushing, dipping, autodeposition, flow coating, spraying, vapour deposition, deposition, electro-deposition, electrostatic spray, rolling, roll-to-roll, web-based coating, curtain coating, slot die coating, wire-wound rod coating, screen printing, rotary screen coating, flexography, ink-jet printing, sputtering, embossing, in-mould coating, fluidized bed, electrostatic fluidized bed, flame spray, to obtain the article having the C coated thereon.

Broadly in accordance with the invention there is provided a process for preparing an article having a LC coated thereon, said process comprising the steps of:
i) providing a LC and an article; and
ii) depositing the LC onto the article via any one of the following ways: brushing, dipping, autodeposition, flow coating, spraying, vapour deposition, deposition, electro-deposition, electrostatic spray, rolling, roll-to-roll, web-based coating, curtain coating, slot die coating, wire-wound rod coating, screen printing, rotary screen coating, flexography, ink-jet printing, sputtering, embossing, in-mould coating, fluidized bed, electrostatic fluidized bed, flame spray, to obtain the article having the LC coated thereon.

The C is r.t.-curable. Once the C is cured forms an object. The object is thus derived upon, and/or obtainable by and/or obtained by, and/or resulting from partial or full curing of a C; in other words, a cured composition (CR-C) obtained upon curing of a C is a cross-linked C. The object may have any shape, size or form and said object may for example be a coating. Hence, the invention further relates to CR-C.

The LC is r.t.-curable. Once the LC is cured forms an object. The object is thus derived upon, and/or obtainable by and/or obtained by, and/or resulting from partial or full curing of a LC; in other words, a cured composition (CR-LC) obtained upon curing of a LC is a cross-linked LC. The object may have any shape, size or form and said object may for example be a coating. Hence, the invention further relates to CR-LC.

The invention further relates to methods for coating articles having the C coated and cured thereon.

The invention further relates to methods for coating articles having the LC coated and cured thereon.

Broadly in accordance with the invention there is provided a process for preparing and having a C coated and cured thereon, said process comprising the steps of:
i) providing a C and an article; and
ii) depositing the C onto the article via any one of the following ways: brushing, dipping, autodeposition, flow coating, spraying, vapour deposition, deposition, electro-deposition, electrostatic spray, rolling, roll-to-roll, web-based coating, curtain coating, slot die coating, wire-wound rod coating, screen printing, rotary screen coating, flexography, ink-jet printing, sputtering, embossing, in-mould finish, fluidized bed, electrostatic fluidized bed, flame spray, to obtain an article having the C coated thereon, and
iii) curing the C at a temperature—preferably at r.t.—and for time enough (e.g. from 1 min up to 168 h) to crosslink the C.

Broadly in accordance with the invention there is provided a process for preparing and having a LC coated and cured thereon, said process comprising the steps of:
i) providing a LC and an article; and
ii) depositing the LC onto the article via any one of the following ways: brushing, dipping, autodeposition, flow coating, spraying, vapour deposition, deposition, electro-deposition, electrostatic spray, rolling, roll-to-roll, web-based coating, curtain coating, slot die coating, wire-wound rod coating, screen printing, rotary screen coating, flexography, ink-jet printing, sputtering, embossing, in-mould finish, fluidized bed, electrostatic fluidized bed, flame spray, to obtain an article having the LC coated thereon, and
iii) curing the LC at a temperature—preferably at r.t.—and for time enough (e.g. from 1 min up to 168 h) to crosslink the LC.

The invention further relates to cured compositions (CR-C) obtained upon curing of a composition C as the latter is disclosed in the specification.

Broadly in accordance with the invention, there is provided a cured composition (CR-C) according to any one of the claims directed to the CR-C.

Preferably the CR-C is according to any one of the paragraphs A35, A36 and A39.

The invention further relates to cured compositions (CR-LC) obtained upon curing of a liquid composition LC as the latter is disclosed in the specification. Preferably, the CR-LC is a film or a coating.

Broadly in accordance with the invention, there is provided a cured composition (CR-LC) according to any one of the claims directed to the CR-LC.

Preferably the CR-LC is according to any one of the paragraphs A37 to A39.

The invention further relates to an object or a kit-of-parts comprising:
i) an article, and
ii) one or any combination of: an OSAR as disclosed in the specification, a composition C as disclosed in the specification, a liquid composition LC as disclosed in the specification, a cured composition CR-C as disclosed in the specification, and a cured composition CR-LC as disclosed in the specification.

Broadly in accordance with the invention, there is provided an object or a kit-of-parts according to any one of the claims directed to the object or kit-of-parts.

Preferably the object or kit-of-parts is according to paragraph A40.

The invention further relates to a process for making paints, coatings, polishes, inks, adhesives, pastes, compositions suitable for 3D-printing, 3D-printed objects, objects for automotive applications (car parts, refinishes, agricultural machines, composite structures, ceramic structures), objects for marine applications (ships, boats), objects for aerospace applications (planes, helicopters, composite structures, ceramic structures), objects for medical applications (artificial joints, meshes, woven or non-woven sheets, tapes, ribbons, bands, cables, tube-like products for e.g. ligament replacement, composite structures, ceramic structures), objects for defense applications (ballistic protection, body armour, ballistic vests, ballistic helmets, ballistic vehicle protection, composite structures, ceramic structures), objects for sports/recreational applications (fencing, skates, skateboarding, snowboarding, suspension lines on sport parachutes, paragliders, kites, kite lines for kite sports, climbing equipment, composite structures, ceramic structures), objects for architectural applications [windows, doors, (pseudo-)walls, cables], objects for bottling applications, objects for household applications (household appliances, white goods, furniture, computer housings), objects for machinery applications (can and bottle handling machine parts, moving parts on weaving machines, bearings, gears, composite structures, ceramic structures, computer housings), objects for can applications (cans, containers), objects for coil applications (coils), objects for energy applications e.g. generators for wind, tide or solar energy, objects for textile applications e.g. fabrics, this can be very broad from impregnation technical textiles to for example complete composites both as coating and as a binder for composites, and objects for electrical applications (cabinets for electrical wire or switch boards), objects for building and construction (flooring, decorative, joinery, façade, concrete constructions), objects for packaging (flexible packaging, paper), objects for telecommunications, and consumer goods, using one or any combination of a) to f):
  a) an OSAR as disclosed in the specification,
  b) a C as disclosed in the specification,
  c) a LC as disclosed in the specification,
  d) a CR-C as disclosed in the specification,
  e) a CR-LC as disclosed in the specification, and
  f) an object or a kit-of-parts as disclosed in the specification.

The invention further relates to a use of one or any combination of a) to f):
  a) an OSAR as disclosed in the specification,
  b) a C as disclosed in the specification,
  c) a LC as disclosed in the specification,
  d) a CR-C as disclosed in the specification,
  e) a CR-LC as disclosed in the specification, and
  f) an object or a kit-of-parts as disclosed in the specification,
in paints, coatings, polishes, inks, adhesives, pastes, compositions suitable for 3D-printing, 3D-printed objects, automotive applications (car parts, refinishes, agricultural machines, composite structures, ceramic structures), marine applications (ships, boats), aerospace applications (planes, helicopters, composite structures, ceramic structures), medical applications (artificial joints, meshes, woven or nonwoven sheets, tapes, ribbons, bands, cables, tube-like products for e.g. ligament replacement, composite structures, ceramic structures), defense applications (ballistic protection, body armour, ballistic vests, ballistic helmets, ballistic vehicle protection, composite structures, ceramic structures), sports/recreational applications (fencing, skates, skateboarding, snowboarding, suspension lines on sport parachutes, paragliders, kites, kite lines for kite sports, climbing equipment, composite structures, ceramic structures), architectural applications [windows, doors, (pseudo-)walls, cables], bottling applications, household applications (household appliances, white goods, furniture, computer housings), machinery applications (can and bottle handling machine parts, moving parts on weaving machines, bearings, gears, composite structures, ceramic structures, computer housings), can applications (cans, containers), coil applications (coils), energy applications for e.g. generators for wind, tide or solar energy, textile applications for e.g. fabrics, this can be very broad from impregnation technical textiles to for example complete composites both as coating and as a binder for composites, and electrical applications (cabinets for electrical wire or switch boards), building and construction applications (flooring, decorative, joinery, facade, concrete constructions), and packaging (flexible packaging, paper), packaging applications, telecommunications, and consumer goods.

The invention further relates to a use of one or any combination of a) to e):
  a) an OSAR as disclosed in the specification,
  b) a C as disclosed in the specification,
  c) a LC as disclosed in the specification,
  d) a CR-C as disclosed in the specification,
  e) a CR-LC as disclosed in the specification,
for achieving an excellent balance of König hardness and gloss20°.

The invention further relates to a process for making objects having an excellent balance of König hardness and gloss20°, using one or any combination of a) to e):
  a) an OSAR as disclosed in the specification,
  b) a C as disclosed in the specification,
  c) a LC as disclosed in the specification,
  d) a CR-C as disclosed in the specification,
  e) a CR-LC as disclosed in the specification.

There is an increasing demand to use raw materials e.g. monomers for polymerization, additives, derived from biorenewable resources (biomass) (referred in the specification as biorenewable monomers) in order to improve the sustainability of the polymers such as alkyd resins. In view of concerns about depletion of fossil fuel resources or an increase in carbon dioxide in the atmosphere that poses a global-scale environmental problem in recent years, methods for producing raw materials (e.g. monomers for polymers such as alkyd resins) from biomass have attracted a lot of attention. Since biomass is renewable and therefore has a carbon-neutral foot-print, such methods are expected to gain in particular importance in future. It is therefore a preferred feature of the present invention and the aspects disclosed in the specification that where possible the components used in the specification for preparing the OSAR, the Binders-C and -LC, the Composition (C), and the liquid composition (LC), are as far as possible biorenewable.

Yet, another aspect of the invention is any one of the OSAR1-OSAR7 as shown in the Examples.

Yet another aspect of the invention is any one of the emulsions EM-OSAR1-EM-OSAR7 as shown in the Examples.

Yet another aspect of the invention is any one of the liquid (aqueous) coating compositions InvLC1-InvLC7 (and their corresponding Binders-LC), as shown in the Examples.

Yet another aspect of the invention is any one of the cured compositions InvCR-LC1-InvCR-LC7 [that is a (cured) coating], as shown in the Examples.

Many other variations, preferments and embodiments of the invention will be apparent to those skilled in the art and such variations preferments and embodiments are contemplated within the scope of the claims. All embodiments disclosed and preferments disclosed in the specification may be combined with each other and/or with preferments of the invention as disclosed in the specification.

Further aspects of the invention and preferred features thereof are given in the claims.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 5 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the specification.

The invention will now be disclosed in detail with reference to the following non-limiting examples which are by way of illustration only.

EXAMPLES

1. Chemicals & Raw Materials

Tetrahydrofuran (THF), was purchased from Biosolve and purified using an activated alumina purification system. Phthalic anhydride (>99.8%) was supplied by BASF. Benzoic acid (99.9%) was supplied by Brenntag. Pentaerythritol (>98%) and Ymer™ N120 were supplied by Perstorp. SSIPA (>98%) was supplied by Future Fuel Corporation; sulphuric acid impurities contained in SSIPA were stoichiometrically neutralized with lithium hydroxide monohydrate. Lithium hydroxide monohydrate (LiOH>56.5%) was supplied by Caldic. Butyl stannoic acid (>96.5%) was supplied by Chemtura. Soybean fatty acid (Radiacid® 121; ION 127-140 cg/g) and tall oil fatty acid (SYLFAT® FA2; ION 130 cg/g) were supplied by Oleon and Arizona Chemical, respectively. Methylcyclohexane (99.8%) was supplied by Möller Chemie. Acetone (99.9%) is supplied by Ineos. Byk® 028 is a defoamer supplied by Byk. Borchi® Oxy Coat 1101 (supplied by Borchers) is an organic metal compound (1% w/w solution in propane diol) wherein the metal of the metal cation of the organic metal compound is Fe (Borchi® Oxy Coat 1101 contains 800-1000 ppm of Fe) and it was used as a drier. Nuosperse® FX 610 (supplied by Elementis specialties) is a pigment dispersant with an active content of 25 wt %. Rheolate® 212 (supplied by Elementis Specialties) is a rheology modifier. Kronos® 2190 is a $TiO_2$ white pigment supplied by Kronos. All the chemicals mentioned in this paragraph were used as supplied. Any other chemicals mentioned in the Examples and not explicitly mentioned in this paragraph, were supplied by Aldrich and they were used as supplied.

Glass plates of 3 mm in thickness (normal flat glass type, supplied by Boer Glas), Leneta Black Scrub Test Panels P121-10N.

2. Experimental Methods & Techniques

The acid value (AV) was determined titrimetrically according to ISO 2114. The AV is given as the mass of potassium hydroxide (KOH) in milligrams that is required to neutralize one gram of the tested substance and is used as a measure of the concentration of carboxyl groups present.

The oil length was calculated according to the equation shown in the section Definitions (see definition for the term 'oil length').

The number average molecular weight ($M_a$) and the weight average molecular weight ($M_w$) were determined via Gel Permeation Chromatography (GPC) calibrated with a set of polystyrene standards with a molecular weight range of from 162 up to $3.8 \times 10^6$ Da, and using as eluent stabilized tetrahydrofuran (THF) modified with 0.5 (v/v %) acetic acid, 3 (v/v %) water and 0.1 (m/v %) LiBr, at a flow rate of 1 mL/min at 40° C. 50 mg of a resin dissolved in a suitable organic solvent e.g. acetone were diluted with 5 ml of eluent, and used for the measurement. The GPC measurements were carried out on a Waters Alliance system equipped with: i) a Waters Alliance 2414 refractive index detector at 40° C., and ii) a Waters Alliance 2695 separation module equipped with two consecutive PL-gel columns of Mixed-C type with l/d=300/7.5 mm and filled with particles having a particle size of 20 micron (supplied by Agilent).

The polydispersity (D) was calculated according to the following equation: $D=M_w/M_n$.

The iodine number (ION) is determined according to the DIN 53241-1.

The chemical composition (mol %) of an OSAR or another alkyd resin can be determined by $^1$H- and $^{13}$C-NMR spectroscopy. The OSAR or the other alkyd resin is dissolved in a suitable deuterated organic solvent e.g. deuterated chloroform, once any other solvent(s) and/or water are removed from the OSAR or the other alkyd resin by for example drying in a vacuum oven.

Gloss measurements at 20° angle (reported in GU which stands for gloss units; (the GU scale of a glossmeter is based on a highly polished, reference black glass standard with a defined refractive index having a specular reflectance of 100 GU at 20° angle) were carried out with BYK micro-TRI-gloss glossmeter in accordance with the ASTM D523 89, on (cured) coatings which were derived upon curing under standard drying of films of 100 micron (1 micron=$10^{-6}$ m) wet film thickness coated and cured on Leneta Black Scrub Test Panels P121-10N, within 1 h from the lapse of 24 h from their application. The higher the value of gloss20°, the glossier the coating.

The König hardness (reported in seconds) of the (cured) coatings was determined in accordance with the DIN 53157 [using a BYK pendulum hardness tester (Cat. No 5858] on (cured) coatings which were derived upon curing of films of 100-micron wet film thickness coated and cured on glass panels, within 1 h from the lapse of 24 h from their application. The higher the number of seconds, the higher the König hardness.

3. Example of Inventive Alkyd Resins (OSAR Series) and their Corresponding Emulsions (EM-OSAR Series)

3.1 Example 3.1: Preparation of the OSAR1

A reaction vessel (reactor) equipped with a thermocouple, a nitrogen inlet, a mechanical stirrer and a distillation column was charged with 76.6 g of Ymer™ N120, 862.9 g of pentaerythritol, 946.3 g of benzoic acid, 134.3 g of SSIPA, and 1.75 g of butyl stannoic acid (catalyst). Subsequently, the reactor was flashed with N2 and under N2 flow the reaction mixture was stirred and heated up to 210° C. whilst the water produced as the polycondensation reaction by-product, was being removed via distillation. The reaction mixture was maintained at 210° C. for as long as it was rendered transparent. Once the reaction mixture turned transparent, it was cooled down to 160° C. 762.7 g of phthalic anhydride was added and afterwards the reaction mixture was heated up to 210° C. Subsequently a mixture of 174.9 g of tall oil fatty acids and 936.5 g of soybean fatty acids were dosed to the precursor resin over one hour making sure that the temperature did not exceed 210° C. After the dosing was completed the reaction mixture was heated up to 235° C.; at that point 55 g of methylcyclohexane (azeotropic agent) was introduced and the polyesterification reaction was conducted using azeotropic water removal (with methylcyclohexane) until an acid value of 3.3 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the OSAR1 in order to afford a solution of the OSAR1 in acetone. This solution was discharged from the reactor and isolated.

A portion of the isolated acetone solution of the OSAR1 was used to characterize the OSAR1 by removing the acetone under vacuum evaporation.

The OSAR1 was isolated as a highly viscous liquid and its properties are shown in Table 1.

Example 3.1EM: Preparation of the EM-OSAR1 (Emulsion of the OSAR1)

The inventive alkyd resin was emulsified (to 45% solids) as follows.

In a glass reactor equipped with a nitrogen inlet, a mechanical stirrer and a distillation column, 109.4 g of acetone were added to 435 g of the OSAR1 solution in acetone isolated previously in order to obtain an acetone solution of 55 wt % solids. This solution was heated up to 45° C. and was neutralised with 0.91 g of lithium hydroxide monohydrate. 415 g of demineralised water were slowly added under stirring at 45° C. Subsequently, 0.22 g of Byk® 028 were added to the mixture, and the acetone was removed by vacuum distillation. The emulsion thus prepared, with a solids content of 47.6%, had a milky appearance and was stable (visual inspection by the completion of 2160 hours starting from the end of the preparation of the emulsion).

For use in a coating composition a sample was further diluted to 45% solids by adding demineralised water.

3.2 Example 3.2: Preparation of the OSAR7

A reaction vessel (reactor) equipped with a thermocouple, a nitrogen inlet, a mechanical stirrer and a distillation column was charged with 92.5 g of Ymer™ N120, 1042 g of pentaerythritol, 1204 g of benzoic acid, 147.8 g of SSIPA, 0.8 g of lithium hydroxide monohydrate, and 2.1 g of butyl stannoic acid (catalyst). Subsequently, the reactor was flashed with N2 and under N2 flow the reaction mixture was stirred and heated up to 185° C. Once the temperature reached 185° C., the distillation of water started; subsequently the reaction mixture was heated up to 210° C. At that point the reaction mixture became clear; once this happened the reaction mixture was cooled down to 160° C. 942.8 g of phthalic anhydride was added and afterwards the reaction mixture was heated up to 210° C. Subsequently a mixture of 211.2 g of tall oil fatty acids and 996.1 g of soybean fatty acids were dosed to the precursor resin over one hour making sure that the temperature did not exceed 210° C. After the dosing was completed the reaction mixture was heated up to 235° C.; at that point 60 g of methylcyclohexane (azeotropic agent) was introduced and the polyesterification reaction was conducted using azeotropic water removal (with methylcyclohexane) until an acid value of 3.9 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the OSAR7 in order to afford a solution of the OSAR7 in acetone. This solution was discharged from the reactor and isolated.

A portion of the isolated acetone solution of the OSAR7 was used to characterize the OSAR7 by removing the acetone under vacuum evaporation.

The OSAR7 was isolated as a highly viscous liquid and its properties are shown in Table 1.

Example 3.2EM: Preparation of the EM-OSAR7 (Emulsion of the OSAR7)

The inventive alkyd resin was emulsified (to 45% solids) as follows.

In a glass reactor equipped with a nitrogen inlet, a mechanical stirrer and a distillation column, 109.4 g of acetone were added to 435 g of the OSAR7 solution in acetone isolated previously in order to obtain an acetone solution of 55 wt % solids. This solution was heated up to 45° C. and was neutralised with 0.91 g of lithium hydroxide monohydrate. 415 g of demineralised water were slowly added under stirring at 45° C. Subsequently, 0.22 g of Byk® 028 were added to the mixture, and the acetone was removed by vacuum distillation. The emulsion thus prepared, with a solids content of 47.6%, had a milky appearance and was stable (visual inspection by the completion of 2160 hours starting from the end of the preparation of the emulsion).

For use in a coating composition a sample was further diluted to 45% solids by adding demineralised water.

3.3 Example 3.3: Preparation of the OSAR2

A reaction vessel (reactor) equipped with a thermocouple, a nitrogen inlet, a mechanical stirrer and a distillation column was charged with 90.7 g of Ymer™ N120, 810.6 g of pentaerythritol, 258.6 g of trimethylolpropane, 941.5 g of benzoic acid, 159.1 g of SSIPA, 0.8 g of lithium hydroxide monohydrate, and 2.07 g of butyl stannoic acid (catalyst). Subsequently, the reactor was flashed with N2 and under N2 flow the reaction mixture was stirred and heated up to 185° C. Once the temperature reached 185° C., the distillation of water started; subsequently the reaction mixture was heated up to 210° C. At that point the reaction mixture became clear; once this happened the reaction mixture was cooled down to 160° C. 971.6 g of phthalic anhydride was added and afterwards the reaction mixture was heated up to 210° C. Subsequently a mixture of 217.4 g of tall oil fatty acids and 1164.5 g of soybean fatty acids were dosed to the precursor resin over one hour making sure that the temperature did not exceed 210° C. After the dosing was completed the reaction mixture was heated up to 235° C.; at that point 55 g of methylcyclohexane (azeotropic agent) was introduced and the polyesterification reaction was conducted using azeotropic water removal (with methylcyclohexane) until an acid value of 3.4 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the OSAR2 in order to afford a solution of the OSAR2 in acetone. This solution was discharged from the reactor and isolated.

A portion of the isolated acetone solution of the OSAR2 was used to characterize the OSAR2 by removing the acetone under vacuum evaporation.

The OSAR2 was isolated as a highly viscous liquid and its properties are shown in Table 1.

Example 3.3EM: Preparation of the EM-OSAR2 (Emulsion of the OSAR2)

The inventive alkyd resin was emulsified (to 45% solids) as follows.

In a glass reactor equipped with a nitrogen inlet, a mechanical stirrer and a distillation column, 150.5 g of acetone were added to 435 g of the OSAR2 solution in acetone isolated previously in order to obtain an acetone solution of 55 wt % solids. This solution was heated up to 45° C. and was neutralised with 0.66 g of lithium hydroxide monohydrate. 455 g of demineralised water were slowly added under stirring at 45° C. Subsequently, 0.22 g of Byk® 028 were added to the mixture, and the acetone was removed by vacuum distillation. The emulsion thus prepared, with a solids content of 45.8%, had a milky appearance and was stable (visual inspection by the completion of 2160 hours starting from the end of the preparation of the emulsion).

For use in a coating composition a sample was further diluted to 45% solids by adding demineralised water.

3.4 Example 3.4: Preparation of the OSAR3

A reaction vessel (reactor) equipped with a thermocouple, a nitrogen inlet, a mechanical stirrer and a distillation column was charged with 90.8 g of Ymer™ N120, 1023.5 g of pentaerythritol, 1122.4 g of benzoic acid, 159.4 g of SSIPA, 0.8 g of lithium hydroxide monohydrate, and 2.1 g of butyl stannoic acid (catalyst). Subsequently, the reactor was flashed with N2 and under N2 flow the reaction mixture was stirred and heated up to 185° C. Once the temperature reached 185° C., the distillation of water started; subsequently the reaction mixture was heated up to 210° C. At that point the reaction mixture became clear; once this happened the reaction mixture was cooled down to 160° C. 915.7 g of phthalic anhydride was added and afterwards the reaction mixture was heated up to 210° C. Subsequently a mixture of 207.4 g of tall oil fatty acids and 1110.8 g of soybean fatty acids were dosed to the precursor resin over one hour making sure that the temperature did not exceed 210° C. After the dosing was completed the reaction mixture was heated up to 235° C.; at that point 55 g of methylcyclohexane (azeotropic agent) was introduced and the polyesterification reaction was conducted using azeotropic water removal (with methylcyclohexane) until an acid value of 3.5 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the OSAR3 in order to afford a solution of the OSAR3 in acetone. This solution was discharged from the reactor and isolated.

A portion of the isolated acetone solution of the OSAR3 was used to characterize the OSAR3 by removing the acetone under vacuum evaporation.

The OSAR3 was isolated as a highly viscous liquid and its properties are shown in Table 1.

Example 3.4EM: Preparation of the EM-OSAR3 (Emulsion of the OSAR3)

The inventive alkyd resin was emulsified (to 45% solids) as follows.

In a glass reactor equipped with a nitrogen inlet, a mechanical stirrer and a distillation column, 260.4 g of acetone were added to 730 g of the OSAR3 solution in acetone isolated previously in order to obtain an acetone solution of 55 wt % solids. This solution was heated up to 45° C. and was neutralised with 0.67 g of lithium hydroxide monohydrate. 750 g of demineralised water were slowly added under stirring at 45° C. Subsequently, 0.22 g of Byk® 028 were added to the mixture, and the acetone was removed by vacuum distillation. The emulsion thus prepared, with a solids content of 45.5%, had a milky appearance and was stable (visual inspection by the completion of 2160 hours starting from the end of the preparation of the emulsion).

For use in a coating composition a sample was further diluted to 45% solids by adding demineralised water.

3.5 Example 3.5: Preparation of the OSAR5

A reaction vessel (reactor) equipped with a thermocouple, a nitrogen inlet, a mechanical stirrer and a distillation column was charged with 57.0 g of Ymer™ N120, 630.7 g of pentaerythritol, 722.5 g of benzoic acid, 73.7 g of SSIPA, 0.53 g of lithium hydroxide monohydrate, and 1.33 g of butyl stannoic acid (catalyst). Subsequently, the reactor was flashed with N2 and under N2 flow the reaction mixture was stirred and heated up to 185° C. Once the temperature reached 185° C., the distillation of water started; subsequently the reaction mixture was heated up to 210° C. At that point the reaction mixture became clear; once this happened the reaction mixture was cooled down to 160° C. 601.7 g of phthalic anhydride was added and afterwards the reaction mixture was heated up to 210° C. Subsequently a mixture of 132.8 g of tall oil fatty acids and 702.9 g of soybean fatty acids were dosed to the precursor resin over one hour making sure that the temperature did not exceed 210° C. After the dosing was completed the reaction mixture was heated up to 235° C.; at that point 45 g of methylcyclohexane (azeotropic agent) was introduced and the polyesterification reaction was conducted using azeotropic water removal (with methylcyclohexane) until an acid value of 4.1 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the OSAR5 in order to afford a solution of the OSAR5 in acetone. This solution was discharged from the reactor and isolated.

A portion of the isolated acetone solution of the OSAR5 was used to characterize the OSAR5 by removing the acetone under vacuum evaporation.

The OSAR5 was isolated as a highly viscous liquid and its properties are shown in Table 1.

Example 3.5EM: Preparation of the EM-OSAR5 (Emulsion of the OSAR5)

The inventive alkyd resin was emulsified (to 45% solids) as follows.

In a glass reactor equipped with a nitrogen inlet, a mechanical stirrer and a distillation column, 333.1 g of acetone were added to 480 g of the OSAR solution in acetone isolated previously in order to obtain an acetone solution of 43 wt % solids. This solution was heated up to 45° C. and was neutralised with 0.67 g of lithium hydroxide monohydrate. 483 g of demineralised water were slowly added under stirring at 45° C. Subsequently, 0.22 g of Byk® 028 were added to the mixture, and the acetone was removed by vacuum distillation. The emulsion thus prepared, with a solids content of 45.3%, had a milky appearance and was stable (visual inspection by the completion of 2160 hours starting from the end of the preparation of the emulsion).

For use in a coating composition a sample was further diluted to 45 solids by adding demineralised water.

3.6 Example 3.6: Preparation of the OSAR4

A reaction vessel (reactor) equipped with a thermocouple, a nitrogen inlet, a mechanical stirrer and a distillation column was charged with 57.3 g of Ymer™ N120, 400.1 g of pentaerythritol, 255.2 g of dipentaerythritol, 816.2 g of benzoic acid, 100.4 g of SSIPA, 0.43 g of lithium hydroxide monohydrate, and 1.06 g of butyl stannoic acid (catalyst). Subsequently, the reactor was flashed with $N_2$ and under $N_2$ flow the reaction mixture was stirred and heated up to 185° C. Once the temperature reached 185° C., the distillation of water started; subsequently the reaction mixture was heated up to 210° C. At that point the reaction mixture became clear; once this happened the reaction mixture was cooled down to 160° C. 463.2 g of phthalic anhydride was added and afterwards the reaction mixture was heated up to 210° C. Subsequently a mixture of 143.8 g of tall oil fatty acids and 685.7 g of soybean fatty acids were dosed to the precursor resin over one hour making sure that the temperature did not exceed 210° C. After the dosing was completed the reaction mixture was heated up to 235° C.; at that point 55 g of methylcyclohexane (azeotropic agent) was introduced and the polyesterification reaction was conducted using azeotropic water removal (with methylcyclohexane) until an acid value of 3.9 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the OSAR4 in order to afford a solution of the OSAR4 in acetone. This solution was discharged from the reactor and isolated.

A portion of the isolated acetone solution of the OSAR4 was used to characterize the OSAR4 by removing the acetone under vacuum evaporation.

The OSAR4 was isolated as a highly viscous liquid and its properties are shown in Table 1.

Example 3.6EM: Preparation of the EM-OSAR4 (Emulsion of the OSAR4)

The inventive alkyd resin was emulsified (to 45% solids) as follows.

In a glass reactor equipped with a nitrogen inlet, a mechanical stirrer and a distillation column, 162.3 g of acetone were added to 400 g of the OSAR4 solution in acetone isolated previously in order to obtain an acetone solution of 55 wt % solids. This solution was heated up to 45° C. and was neutralised with 0.38 g of lithium hydroxide monohydrate. 428 g of demineralised water were slowly added under stirring at 45° C. Subsequently, 0.22 g of Byk® 028 were added to the mixture, and the acetone was removed by vacuum distillation. The emulsion thus prepared, with a solids content of 45.2%, had a milky appearance and was stable (visual inspection by the completion of 2160 hours starting from the end of the preparation of the emulsion).

For use in a coating composition a sample was further diluted to 45% solids by adding demineralised water.

3.7 Example 3.7: Preparation of the OSAR6

A reaction vessel (reactor) equipped with a thermocouple, a nitrogen inlet, a mechanical stirrer and a distillation column was charged with 61.1 g of Ymer™ N120, 667.6 g of pentaerythritol, 863.5 g of benzoic acid, 91.0 g of SSIPA, 0.54 g of lithium hydroxide monohydrate, and 1.35 g of butyl stannoic acid (catalyst). Subsequently, the reactor was flashed with N2 and under N2 flow the reaction mixture was stirred and heated up to 185° C. Once the temperature reached 185° C., the distillation of water started; subsequently the reaction mixture was heated up to 210° C. At that point the reaction mixture became clear; once this happened the reaction mixture was cooled down to 160° C. 604.8 g of phthalic anhydride was added and afterwards the reaction mixture was heated up to 210° C. Subsequently a mixture of 135.5 g of tall oil fatty acids and 423.7 g of soybean fatty acids were dosed to the precursor resin over one hour making sure that the temperature did not exceed 210° C. After the dosing was completed the reaction mixture was heated up to 235° C.; at that point 55 g of methylcyclohexane (azeotropic agent) was introduced and the polyesterification reaction was conducted using azeotropic water removal (with methylcyclohexane) until an acid value of 5.5 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the OSAR6 in order to afford a solution of the OSAR6 in acetone. This solution was discharged from the reactor and isolated.

A portion of the isolated acetone solution of the OSAR6 was used to characterize the OSAR6 by removing the acetone under vacuum evaporation.

The OSAR6 was isolated as a highly viscous liquid and its properties are shown in Table 1.

Example 3.7EM: Preparation of the EM-OSAR6 (Emulsion of the OSAR6)

The inventive alkyd resin was emulsified (to 45% solids) as follows.

In a glass reactor equipped with a nitrogen inlet, a mechanical stirrer and a distillation column, 137.6 g of acetone were added to 410 g of the OSAR6 solution in acetone isolated previously in order to obtain an acetone solution of 55 wt % solids. This solution was heated up to 45° C. and was neutralised with 1.37 g of 25% ammonia solution. 418 g of demineralised water were slowly added under stirring at 45° C. Subsequently, 0.22 g of Byk® 028 were added to the mixture, and the acetone was removed by vacuum distillation. The emulsion thus prepared, with a solids content of 45.9%, had a milky appearance and was stable (visual inspection by the completion of 2160 hours starting from the end of the preparation of the emulsion).

For use in a coating composition a sample was further diluted to 45% solids by adding demineralised water.

4. Examples of Comparative Alkyd Resins (AR Series) and their Corresponding Emulsions (EM-AR Series)

4.1 Example 4.1: Preparation of the AR1

A reaction vessel (reactor) equipped with a thermocouple, a nitrogen inlet, a mechanical stirrer and a distillation column was charged with 57 g of Ymer™ N120, 586.2 g of pentaerythritol, 472.8 g of benzoic acid, 160.6 g of SSIPA, and 2.2 g of butyl stannoic acid (catalyst). Subsequently, the reactor was flashed with $N_2$ and under $N_2$ flow the reaction mixture was stirred and heated up to 210° C. whilst the water produced as the polycondensation reaction by-product, was being removed via distillation. The reaction mixture was maintained at 210° C. for as long as it was rendered transparent. Once the reaction mixture turned transparent, it was cooled down to 160° C. 485.4 g of phthalic anhydride were added and afterwards the reaction mixture was heated up to 210° C. Subsequently a mixture of 113.2 g of tall oil fatty acids and 978.7 g of soybean fatty acids were dosed to the precursor resin over one hour making sure that the temperature did not exceed 210° C. After the dosing was completed the reaction mixture was heated up to 235° C.; at that point 60 g of methylcyclohexane (azeotropic agent) was introduced and the polyesterification reaction was conducted using azeotropic water removal (with methylcyclohexane) until an acid value of 4.1 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the AR1 in order to afford a solution of the AR1 in acetone. This solution was discharged from the reactor and isolated.

A portion of the isolated acetone solution of the AR1 was used to characterize the AR1 by removing the acetone under vacuum evaporation. The AR1 was isolated as a highly viscous liquid and its properties are shown in Table 1.

Example 4.1EM: Preparation of the EM-AR1
(Emulsion of the AR1)

The comparative alkyd resin was emulsified (to 45% solids) as follows. In a glass reactor equipped with a nitrogen inlet, a mechanical stirrer and a distillation column, 85.4 g of acetone were added to 435 g of the AR1 solution in acetone isolated previously in order to obtain an acetone solution of 55 wt % solids. This solution was heated up to 45° C. and was neutralised with 0.35 g of lithium hydroxide monohydrate. 400 of demineralised water were slowly added under stirring at 45° C. Subsequently, 0.22 g of Byk® 028 were added to the mixture, and the acetone was removed by vacuum distillation. The emulsion thus prepared, with a solids content of 45%, had a milky appearance and was stable (visual inspection by the completion of 240 hours starting from the end of the preparation of the emulsion).

4.2 Example 4.2: Preparation of the AR2

A reaction vessel (reactor) equipped with a thermocouple, a nitrogen inlet, a mechanical stirrer and a distillation column was charged with 57.4 g of Ymer™ N120, 633.2 g of pentaerythritol, 731.3 g of benzoic acid, 53.8 g of SSIPA, and 1.3 g of butyl stannoic acid (catalyst). Subsequently, the reactor was flashed with N2 and under N2 flow the reaction mixture was stirred and heated up to 210° C. whilst the water produced as the polycondensation reaction by-product, was being removed via distillation. The reaction mixture was maintained at 210° C. for as long as it was rendered transparent. Once the reaction mixture turned transparent, it was cooled down to 160° C. 614 g of phthalic anhydride were added and afterwards the reaction mixture was heated up to 210° C. Subsequently a mixture of 128.3 g of tall oil fatty acids and 703.3 g of soybean fatty acids were dosed to the precursor resin over one hour making sure that the temperature did not exceed 210° C. After the dosing was completed the reaction mixture was heated up to 235° C.; at that point 120 g of methylcyclohexane (azeotropic agent) was introduced and the polyesterification reaction was conducted using azeotropic water removal (with methylcyclohexane) until an acid value of 4 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the AR2 in order to afford a solution of the AR2 in acetone. This solution was discharged from the reactor and isolated.

A portion of the isolated acetone solution of the AR2 was used to characterize the AR2 by removing the acetone under vacuum evaporation. The AR2 was isolated as a highly viscous liquid and its properties are shown in Table 1.

Example 4.2EM: Preparation of the EM-AR2
(Emulsion of the AR2)

An effort has been made to emulsify the comparative alkyd resin (to 45% solids) as follows.

In a glass reactor equipped with a nitrogen inlet, a mechanical stirrer and a distillation column, 145.6 g of acetone were added to 380 g of the AR2 solution in acetone isolated previously in order to obtain an acetone solution of 55 wt % solids. This solution was heated up to 45° C. and was neutralised with 0.51 g of lithium hydroxide monohydrate. 400 of demineralised water were slowly added under stirring at 45° C. Subsequently, 0.22 g of Byk® 028 were added to the mixture, and the acetone was removed by vacuum distillation. By the completion of the removal of acetone the mixture had turned into an unworkable whitish semi-solid mass, failing to afford an emulsion.

The AR2 failed to provide an aqueous dispersion. Thus, no liquid (aqueous) coating composition and no coatings were prepared from the AR2.

4.3 Example 4.3: Preparation of the AR3

A reaction vessel (reactor) equipped with a thermocouple, a nitrogen inlet, a mechanical stirrer and a distillation column was charged with 57.1 g of Ymer™ N120, 591.5 g of pentaerythritol, 479.3 g of benzoic acid, 92.1 g of SSIPA, 0.48 g of lithium hydroxide monohydrate, and 1.2 g of butyl stannoic acid (catalyst). Subsequently, the reactor was flashed with N2 and under N2 flow the reaction mixture was stirred and heated up to 195° C. Once the temperature reached 195° C., the distillation of water started; subsequently the reaction mixture was heated up to 210° C. At that point the reaction mixture became clear; once this happened the reaction mixture was cooled down to 160° C. 529.2 g of phthalic anhydride was added and afterwards the reaction mixture was heated up to 210° C. Subsequently a mixture of 119.9 g of tall oil fatty acids and 1030.4 g of soybean fatty acids were dosed to the precursor resin over one hour making sure that the temperature did not exceed 210° C. After the dosing was completed the reaction mixture was heated up to 235° C.; at that point 55 g of methylcyclohexane (azeotropic agent) was introduced and the polyesterification reaction was conducted using azeotropic water removal (with methylcyclohexane) until an acid value of 3.8 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the AR3 in order to afford a solution of the AR3 in acetone. This solution was discharged from the reactor and isolated.

A portion of the isolated acetone solution of the AR3 was used to characterize the AR3 by removing the acetone under vacuum evaporation.

The AR3 was isolated as a highly viscous liquid and its properties are shown in Table 1.

Example 4.3EM: Preparation of the EM-AR3
(Emulsion of the AR3)

The comparative alkyd resin was emulsified (to 45% solids) as follows.

In a glass reactor equipped with a nitrogen inlet, a mechanical stirrer and a distillation column, 300 g of acetone were added to 350 g of the AR3 solution in acetone isolated previously in order to obtain an acetone solution of 55 wt % solids. This solution was heated up to 45° C. and was neutralised with 0.32 g of lithium hydroxide monohydrate. 360 g of demineralised water were slowly added under stirring at 45° C. Subsequently, 0.22 g of Byk® 028 were added to the mixture, and the acetone was removed by vacuum distillation. The emulsion thus prepared had a white appearance and was unstable (visual inspection by the completion of 48 hours starting from the end of the preparation of the emulsion).

4.4 Example 4.4: Preparation of the AR4

A reaction vessel (reactor) equipped with a thermocouple, a nitrogen inlet, a mechanical stirrer and a distillation column was charged with 23.8 g of Ymer™ N120, 582.4 g of pentaerythritol, 484.5 g of benzoic acid, 126.0 g of SSIPA, 0.47 g of lithium hydroxide monohydrate, and 1.18 g of butyl stannoic acid (catalyst). Subsequently, the reactor was flashed with N2 and under N2 flow the reaction mixture was stirred and heated up to 185° C. Once the temperature reached 185° C., the distillation of water started; subsequently the reaction mixture was heated up to 210° C. At that point the reaction mixture became clear; once this happened the reaction mixture was cooled down to 160° C. 497.5 g of phthalic anhydride was added and afterwards the reaction mixture was heated up to 210° C. Subsequently a mixture of 118.0 g of tall oil fatty acids and 985.9 g of soybean fatty acids were dosed to the precursor resin over one hour making sure that the temperature did not exceed 210° C. After the dosing was completed the reaction mixture was heated up to 235° C.; at that point 55 g of methylcyclohexane (azeotropic agent) was introduced and the polyesterification reaction was conducted using azeotropic water removal (with methylcyclohexane) until an acid value of 3.7 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the AR4 in order to afford a solution of the AR4 in acetone. This solution was discharged from the reactor and isolated.

A portion of the isolated acetone solution of the AR4 was used to characterize the AR4 by removing the acetone under vacuum evaporation.

The AR4 was isolated as a highly viscous liquid and its properties are shown in Table 1.

Example 4.4EM: Preparation of the EM-AR4
(Emulsion of the AR4)

The comparative alkyd resin was emulsified (to 45% solids) as follows.

In a glass reactor equipped with a nitrogen inlet, a mechanical stirrer and a distillation column, 117 g of acetone were added to 400 g of the AR4 solution in acetone isolated previously in order to obtain an acetone solution of 55 wt % solids. This solution was heated up to 45° C. 393 g of demineralised water were slowly added under stirring at 45° C. Subsequently, 0.22 g of Byk® 028 were added to the mixture, and the acetone was removed by vacuum distillation. The emulsion thus prepared, with a solids content of 45%, had a milky appearance and was stable (visual inspection by the completion of 240 hours starting from the end of the preparation of the emulsion).

4.5 Example 4.5: Preparation of the AR5

A reaction vessel (reactor) equipped with a thermocouple, a nitrogen inlet, a mechanical stirrer and a distillation column was charged with 116.3 g of Ymer™ N120, 654.9 g of pentaerythritol, 844.1 g of benzoic acid, 41.9 g of SSIPA, 0.53 g of lithium hydroxide monohydrate, and 1.33 g of butyl stannoic acid (catalyst). Subsequently, the reactor was flashed with N2 and under N2 flow the reaction mixture was stirred and heated up to 195° C. Once the temperature reached 195° C., the distillation of water started; subsequently the reaction mixture was heated up to 210° C. At that point the reaction mixture became clear; once this happened the reaction mixture was cooled down to 160° C. 627.8 g of phthalic anhydride was added and afterwards the reaction mixture was heated up to 210° C. Subsequently a mixture of 132.7 g of tall oil fatty acids and 422.4 g of soybean fatty acids were dosed to the precursor resin over one hour making sure that the temperature did not exceed 210° C. After the dosing was completed the reaction mixture was heated up to 235° C.; at that point 60 g of methylcyclohexane (azeotropic agent) was introduced and the polyesterification reaction was conducted using azeotropic water removal (with methylcyclohexane) until an acid value of 3.4 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the AR5 in order to afford a solution of the AR5 in acetone. This solution was discharged from the reactor and isolated.

A portion of the isolated acetone solution of the AR5 was used to characterize the AR5 by removing the acetone under vacuum evaporation.

The AR5 was isolated as a highly viscous liquid and its properties are shown in Table 1.

Example 4.5EM: Preparation of the EM-AR5 (Emulsion of the AR5)

The comparative alkyd resin was emulsified (to 45% solids) as follows.

In a glass reactor equipped with a nitrogen inlet, a mechanical stirrer and a distillation column, 128.3 g of acetone were added to 401 g of the AR5 solution in acetone isolated previously in order to obtain an acetone solution of 55 wt % solids. This solution was heated up to 45° C. and 400 g of demineralised water were slowly added under stirring at 45° C. Subsequently, 0.22 g of Byk® 028 were added to the mixture, and the acetone was removed by vacuum distillation. The emulsion thus prepared was unstable (visual inspection by the completion of 48 hours starting from the end of the preparation of the emulsion).

4.6 Example 4.6: Preparation of the AR6

A reaction vessel (reactor) equipped with a thermocouple, a nitrogen inlet, a mechanical stirrer and a distillation column was charged with 186.6 g of Ymer™ N120, 633.7 g of pentaerythritol, 816.8 g of benzoic acid, 41.9 g of SSIPA, 0.51 g of lithium hydroxide monohydrate, and 1.28 g of butyl stannoic acid (catalyst). Subsequently, the reactor was flashed with N2 and under N2 flow the reaction mixture was stirred and heated up to 195° C. Once the temperature reached 195° C., the distillation of water started; subsequently the reaction mixture was heated up to 210° C. At that point the reaction mixture became clear; once this happened the reaction mixture was cooled down to 160° C. 617.7 g of phthalic anhydride was added and afterwards the reaction mixture was heated up to 210° C. Subsequently a mixture of 128.4 g of tall oil fatty acids and 408.7 g of soybean fatty acids were dosed to the precursor resin over one hour making sure that the temperature did not exceed 210° C. After the dosing was completed the reaction mixture was heated up to 235° C.; at that point 55 g of methylcyclohexane (azeotropic agent) was introduced and the polyesterification reaction was conducted using azeotropic water removal (with methylcyclohexane) until an acid value of 3.7 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the AR6 in order to afford a solution of the AR6 in acetone. This solution was discharged from the reactor and isolated.

A portion of the isolated acetone solution of the AR6 was used to characterize the AR6 by removing the acetone under vacuum evaporation.

The AR6 was isolated as a highly viscous liquid and its properties are shown in Table 1.

Example 4.6EM: Preparation of the EM-AR6 (Emulsion of the AR6)

The comparative alkyd resin was emulsified (to 45% solids) as follows.

In a glass reactor equipped with a nitrogen inlet, a mechanical stirrer and a distillation column, 115.9 g of acetone were added to 405.5 g of the AR6 solution in acetone isolated previously in order to obtain an acetone solution of 55 wt % solids. This solution was heated up to 45° C. and was neutralised with 0.62 g of 25% ammonia solution. 395 g of demineralised water were slowly added under stirring at 45° C. Subsequently, 0.22 g of Byk® 028 were added to the mixture, and the acetone was removed by vacuum distillation. The emulsion thus prepared, with a solids content of 68%, had a low viscosity and white colour and was unstable (visual inspection by the completion of 48 hours starting from the end of the preparation of the emulsion).

4.7 Example 4.7: Preparation of the AR7

A reaction vessel (reactor) equipped with a thermocouple, a nitrogen inlet, a mechanical stirrer and a distillation column was charged with 87.3 g of Ymer™ N120, 657.7 g of pentaerythritol, 850.5 g of benzoic acid, 130 g of SSIPA, 0.53 g of lithium hydroxide monohydrate, and 1.33 g of butyl stannoic acid (catalyst). Subsequently, the reactor was flashed with N2 and under N2 flow the reaction mixture was stirred and heated up to 185° C. Once the temperature reached 185° C., the distillation of water started; subsequently the reaction mixture was heated up to 210° C. At that point the reaction mixture became clear; once this happened the reaction mixture was cooled down to 160° C. 577.5 g of phthalic anhydride was added and afterwards the reaction mixture was heated up to 210° C. Subsequently a mixture of 133.3 g of tall oil fatty acids and 409.8 g of soybean fatty acids were dosed to the precursor resin over one hour making sure that the temperature did not exceed 210° C. After the dosing was completed the reaction mixture was heated up to 235° C.; at that point 55 g of methylcyclohexane (azeotropic agent) was introduced and the polyesterification reaction was conducted using azeotropic water removal (with methylcyclohexane) until an acid value of 3.7 mg KOH/g was obtained. The reaction mixture was then cooled down to 200° C. while vacuum was applied to remove the methylcyclohexane. Once the methylcyclohexane was removed, the reaction mixture was cooled down to room temperature and during this cooling down and already from a temperature of about 150° C. and up until about 50° C., an amount of acetone was added to the AR7 in order to afford a solution of the AR7 in acetone. This solution was discharged from the reactor and isolated.

A portion of the isolated acetone solution of the AR7 was used to characterize the AR7 by removing the acetone under vacuum evaporation.

The AR7 was isolated as a highly viscous liquid and its properties are shown in Table 1.

Example 4.7EM: Preparation of the EM-AR7 (Emulsion of the AR7)

The comparative alkyd resin was emulsified (to 45% solids) as follows.

In a glass reactor equipped with a nitrogen inlet, a mechanical stirrer and a distillation column, 84 g of acetone were added to 405 g of the AR7 solution in acetone isolated previously in order to obtain an acetone solution of 55 wt % solids. This solution was heated up to 45° C. and was neutralised with 0.47 g of 25% ammonia solution. 370 g of demineralised water were slowly added under stirring at 45° C. Subsequently, 0.22 g of Byk® 028 were added to the mixture, and the acetone was removed by vacuum distillation. The emulsion thus prepared, with a solids content of 45.0%, had a milky appearance and was stable (visual inspection by the completion of 240 hours starting from the end of the preparation of the emulsion).

5. Examples of Inventive Liquid (Aqueous) Coating Compositions (Series InvLC) and Comparative (Aqueous) Coating Composition (Series CompLC)

General Process (GP1)

A Getzman Dispermat Cowles dissolver was charged with:
a1. 5.30 parts of demineralized water,
b1. 0.30 parts of Byk® 028 (defoamer),
c1. 1.15 parts of Nuosperse® FX-610 (pigment dispersant),
d1. 0.95 parts of Rheolate® 212 (rheology modifier), and
e1. 22.65 parts of Kronos® 2190 (TiO$_2$ white pigment).
This mixture was mixed up until a fineness—which was determined according to ISO 1524—of <10-micron Hegman was reached. The mixture with a fineness of <10-micron Hegman, is referred as Mixture A.

A propeller mixer Janke & Kunkel RW20 DZM with three-blade propeller was charged with:
a2. 9.88 parts of demineralized water,
b2. 30.35 parts of Mixture A,
c2. 56.12 parts of an emulsion of 45% solids (corresponding to 25.25 parts of a solid alkyd resin),
d2. 3.35 parts of Rheolate® 212 (rheology modifier), and
e2. 0.30 parts of Borchi® Oxy-Coat 1101 (Fe-drier).

This mixture was mixed for a total of 5 minutes to produce a liquid (aqueous) coating composition which was either inventive or comparative depending on the c2.

Example 5.1: Preparation of the Inventive Liquid (Aqueous) Coating Composition InvLC1

The general process (GP1) disclosed above was used to prepare the inventive liquid (aqueous) coating compositions:
InvLC1 using as c2 the EM-OSAR1,
InvLC2 using as c2 the EM-OSAR2,
InvLC3 using as c2 the EM-OSAR3,
InvLC4 using as c2 the EM-OSAR4,
InvLC5 using as c2 the EM-OSAR5,
InvLC6 using as c2 the EM-OSAR6,
InvLC7 using as c2 the EM-OSAR7.

Example 5.1a: Preparation of the Comparative Liquid (Aqueous) Coating Composition CompLC1

The general process (GP1) disclosed above was used to prepare the comparative liquid (aqueous) coating compositions:
CompLC1 using as c2 the EM-AR1,
CompLC4 using as c2 the EM-AR4,
CompLC7 using as c2 the EM-AR7.

6. Examples of Inventive Coatings (Series InvCR-LC) and Comparative Coatings Series (CompCR-LC Series)

The comparative liquid (aqueous) coating compositions (CompLC1, CompLC4 and CompLC7) and the inventive paint composition (InvLC1-InvLC7) were used to prepare coatings according to the following general process (GP2): an amount of each of the comparative or inventive liquid (aqueous) coating composition was applied on:
i) a glass plate [intended for the determination of the König hardness (KH)], and
ii) on a Leneta Black Scrub Test Panel P121-10N (intended for the determination of the gloss20°), using a Bird Film Applicator® with a slit of 100 micron, to afford uncured ('wet') films which were comparative or inventive depending on the liquid (aqueous) coating composition used to prepare them.

The wet films thus prepared were left to cure and dry under standard curing conditions, for a total time period of 24 h starting from the point in time these films were applied on the above-mentioned substrates, to ultimately afford the comparative (cured) coatings CompCR-LC1, CompCR-LC4 and CompCR-LC7; and the inventive (cured) coatings InvCR-LC1, InvCR-LC2, InvCR-LC3, InvCR-LC4, InvCR-LC5, InvCR-LC6, and InvCR-LC7. The film thickness of any one of the comparative and inventive (cured) coatings after 24 h of drying was estimated to be 25±5 micron.

The König hardness and the gloss20° were determined within 1 hour from the completion of the 24 h of drying.

The balance of KH and gloss20° (BKHG) was calculated as mentioned in the specification from the individual recorded values of KH and gloss20° for each of the paint compositions.

The Table 2 presents the results of the BKHG, along with those of KH and gloss20°.

TABLE 1

The inventive alkyd resins (OSAR) and the comparative alkyd resins (AR): composition and characterization.

| | Polycondensed residue of | OSAR1 | OSAR2 | OSAR3 | OSAR4 | OSAR5 | OSAR6 | OSAR7 |
|---|---|---|---|---|---|---|---|---|
| POC (% mol) | pentaerythritol | 26.6 | 28.3 | 26.6 | 23 | 25.8 | 26.6 | 26.5 |
| PAC (% mol) | phthalic anhydride | 21.9 | 23.6 | 21.9 | 18.2 | 22.7 | 22.1 | 22.1 |
| MAC (% mol) | benzoic acid | 32.5 | 27.8 | 32.5 | 39.0 | 33.0 | 38.3 | 34.2 |
| FAC (% mol) | mixture of tall oil fatty acid & soyabean oil fatty acid | 16.6 | 21.9 | 16.6 | 17.3 | 16.6 | 10.8 | 14.9 |
| IOC (% mol) | 5-(sulfo)isophtalic acid sodium salt | 2.1 | 2.1 | 2.1 | 2.2 | 1.5 | 1.8 | 1.9 |
| PALC (% mol) | polyethylene glycol (Ymer™ 1120) | 0.32 | 0.33 | 0.32 | 0.33 | 0.32 | 0.33 | 0.32 |
| | $S_1$ (see claim 1) | 51.5 | 52.1 | 51.5 | 58.8 | 51.4 | 51.3 | 51.3 |
| | $R_1$ (see claim 1) | 2.0 | 1.27 | 1.96 | 2.25 | 1.99 | 3.55 | 2.29 |
| | $R_2$ (see claim 1) | 0.15 | 0.11 | 0.15 | 0.15 | 0.11 | 0.20 | 0.15 |
| | $R_3$ (see claim 1) | 169 | 157 | 169 | 171 | 175 | 183 | 175 |
| | Oil length (%) | 32.5 | 34 | 32.5 | 32.5 | 32.7 | 22.6 | 29.8 |
| | AV (mg KOH/g) | 3.1 | 3.0 | 3.1 | 2.8 | 2.7 | 4.9 | 3.5 |
| | $M_n$ (Da) | 2510 | 2835 | 2771 | 2495 | 2922 | 2369 | 2659 |
| | $M_W$ (Da) | 68500 | 61754 | 56905 | 25627 | 49323 | 45889 | 41365 |
| | $D(=M_W/M_n)$ | 27.3 | 21.8 | 20.5 | 10.3 | 16.9 | 19.4 | 15.6 |

TABLE 1-continued

The inventive alkyd resins (OSAR) and the comparative alkyd resins (AR): composition and characterization.

| Polycondensed residue of | | AR1 | AR2 | AR3 | AR4 | AR5 | AR6 | AR7 |
|---|---|---|---|---|---|---|---|---|
| POC (% mol) | pentaerythritol | 26.6 | 25.8 | 26.6 | 26.7 | 26.4 | 26.2 | 26.5 |
| PAC (% mol) | phthalic anhydride | 20.2 | 23 | 21.9 | 20.9 | 23.3 | 23.5 | 21.4 |
| MAC (% mol) | benzoic acid | 23.9 | 33.3 | 24.0 | 24.7 | 37.9 | 37.6 | 38.3 |
| FAC (% mol) | mixture of tall oil fatty acid & soyabean oil fatty acid | 25.2 | 16.4 | 25.1 | 24.6 | 10.9 | 10.8 | 10.7 |
| IOC (% mol) | 5-(sulfo)isophtalic acid sodium salt | 3.7 | 1.1 | 2.1 | 2.9 | 0.9 | 0.9 | 2.7 |
| PALC (% mol) | polyethylene glycol (Ymer™ 1120) | 0.35 | 0.32 | 0.35 | 0.15 | 0.64 | 1.05 | 0.48 |
| $S_1$ (see claim 1) | | 53.1 | 51.1 | 51.5 | 52.4 | 50.3 | 3.5 | 52.1 |
| $R_1$ (see claim 1) | | 0.95 | 2.0 | 0.96 | 1.01 | 3.49 | 3.49 | 3.59 |
| $R_2$ (see claim 1) | | 0.16 | 0.09 | 0.10 | 0.13 | 0.14 | 0.18 | 0.29 |
| $R_3$ (see claim 1) | | 125 | 176 | 132 | 308 | 96 | 58 | 124 |
| Oil length (%) | | 44.7 | 32.5 | 44.9 | 44.5 | 22.4 | 21.7 | 21.9 |
| AV (mg KOH/g) | | 3.4 | 2.1 | 2.6 | 3.1 | 2.6 | 2.9 | 2.7 |
| $M_n$ (Da) | | 2980 | 3480 | 3264 | 2931 | 2344 | 2338 | 2393 |
| $M_W$ (Da) | | 124700 | 78800 | 54789 | 37978 | 20553 | 17273 | 49201 |
| $D(=M_W/M_n)$ | | 41.8 | 22.6 | 16.8 | 12.7 | 8.8 | 7.4 | 20.6 |

TABLE 2

The inventive and the comparative coatings their properties & characterization (for convenience it contains also the references to their corresponding alkyd resins, emulsions, and liquid coating compositions)

| Alkyd Resin | | | | | | | |
|---|---|---|---|---|---|---|---|
| OSAR1 | OSAR2 | OSAR3 | OSAR4 | OSAR5 | OSAR6 | OSAR7 | |
| | | Emulsion | | | | | |
| EM-OSAR1 | EM-OSAR2 | EM-OSAR3 | EM-OSAR5 | EM-OSAR4 | EM-OSAR6 | EM-OSAR7 | |
| | | Liquid (Aqueous) Coating Composition | | | | | |
| InvLC1 | InvLC2 | InvLC3 | InvLC4 | InvLC5 | InvLC6 | InvLC7 | |
| | | Coating Property & Characterization | | | | | |
| InvCR-LC1 | InvCR-LC2 | InvCR-LC3 | InvCR-LC4 | InvCR-LC5 | InvCR-LC6 | InvCR-LC7 | |

| | InvCR-LC1 | InvCR-LC2 | InvCR-LC3 | InvCR-LC4 | InvCR-LC5 | InvCR-LC6 | InvCR-LC7 |
|---|---|---|---|---|---|---|---|
| BKHG (GU-s) | 1218 | 1116 | 1222 | 1369 | 1575 | 1260 | 1380 |
| BKHG (Excellent or Poor) | Excellent | Excellent | Excellent | Excellent | Excellent | Excellent | Excellent |
| Gloss20° (GU) | 29 | 36 | 26 | 37 | 35 | 15 | 23 |
| KH (s) | 42 | 31 | 47 | 37 | 45 | 84 | 60 |
| KH (Good or Poor) | Good | Good | Good | Good | Good | Good | Good |

| Alkyd Resin | | | | | | | |
|---|---|---|---|---|---|---|---|
| AR1 | AR2 | AR3 | AR4 | AR5 | AR6 | AR7 | |
| | | Emulsion | | | | | |
| EM-AR1 | n.p.p | Unstable | EM-AR4 | Unstable | Unstable | EM-AR7 | |
| | | Liquid (Aqueous) Coating Composition | | | | | |
| CompLC1 | n.p.p | n.p. | CompLC4 | n.p. | n.p. | CompLC7 | |
| | | Coating Property & Characterization | | | | | |
| CompCR-LC1 | n.p.p | n.p. | CompCR-LC4 | n.p. | n.p. | CompCR-LC7 | |

| | CompCR-LC1 | | | CompCR-LC4 | | | CompCR-LC7 |
|---|---|---|---|---|---|---|---|
| BKHG (GU-S) | 528 | n.a. | n.p. | 713 | n.p. | n.p. | 948 |
| BKHG (Excellent or Poor) | Poor | n.a. | n.p. | Poor | n.p. | n.p. | Poor |
| Gloss20°(GU) | 22 | n.a. | n.p. | 23 | n.p. | n.p. | 12 |
| KH (s) | 24 | n.a. | n.p. | 31 | n.p. | n.p. | 79 |
| KH (Good or Poor; | Poor | n.a. | n.p. | Good | n.p. | n.p. | Good | n.p.p: not possible to prepare (because it was not possible to even prepare an emulsion).
n.p.: not prepared (because the emulsion was unstable).
BKHG: balance of KH and gloss20° (BKHG = KH × gloss20°)
KH: könig hardness The object of the invention was to provide for coatings which are prepared from aqueous coating compositions comprising a stable aqueous dispersion or a stable emulsion of oxidizing alkyd resins, the coatings having at least an excellent balance of König hardness (KH) and gloss20° with the proviso that the coatings maintain also a good König hardness and a gloss20° of at least 5.

By the term 'good König hardness' (referring to a coating) is meant in the specification that the König hardness (KH)—as this is determined as disclosed in the specification—is at least 25 s, preferably at least 27 s, more preferably at least 29 s.

By the term 'poor König hardness' (referring to a coating) is meant in the specification that the König hardness (KH)—as this is determined as disclosed in the specification—is lower than 25 s.

By the term 'balance of König hardness (KH) and gloss20° ' (referring to a coating) (abbreviated as BKHG) is meant in the specification the multiplication product of the KH and gloss20° values of a coating—as each of KH and gloss20° is determined in the specification-. In other words, the BKHG of a coating is calculated by the following equation:

$$BKHG = KH \times gloss20°$$

By the term 'excellent balance of König hardness (KH) and gloss20° ' (referring to a coating) is meant in the specification that the BKHG is at least 1000, preferably at least 1050, more preferably at least 1100 GU·s (wherein 'GU' represents gloss unit—as defined in the specification, and 's' represents second).

By the term 'poor balance of König hardness (KH) and gloss20° ' (referring to a coating) is meant in the specification that the BKHG is lower than 1000 GU·s.

Each of the comparative alkyd resins AR1 to AR7 either failed to even produce an emulsion (case of the AR2), or failed to produce a stable emulsion (case of the AR3, AR5 and AR6), or failed to afford coatings having at least an excellent balance of König hardness (KH) and gloss20° with the proviso that the coatings maintain also a good König hardness and a gloss20° of at least 5 (case of the AR1, AR4 and AR7). The comparative coating CompCR-LC1 had a poor balance of KH and gloss20° (poor BKHG), and a poor KH. Each of the comparative coatings CompCR-LC4 and CompCR-LC7 had a poor balance of KH and gloss20° (poor BKHG).

It was surprisingly found that the object of the invention was achieved only by an oxidizing, ionic and short oil alkyd resin (OSAR) as disclosed in the specification. The inventive coatings (InvCR-LC1 to InvCR-LC7) prepared from the aqueous coating compositions comprising a surprisingly stable emulsion of the OSAR of the invention, had surprisingly an excellent balance of König hardness (KH) and gloss20° (excellent BKHG) and at the same time surprisingly maintained also a good KH and a gloss20° of at least 5.

The invention claimed is:
1. An oxidizing, ionic and short oil alkyd resin (OSAR) comprising one or both of: i) conjugated ethylenic unsaturations, and ii) diallylic ethylenic unsaturations, and wherein the OSAR has:
   an acid value as determined titrimetrically by ISO 2114 of at most 20 mg KOH/g, and
   a $M_{n\text{-}OSAR}$ as determined by Gel Permeation Chromatography (GPC) according to the description, of at least 1500 and at most 10000 Da, and
   a $M_{w\text{-}OSAR}$ as determined by GPC according to the description of at least 20000 and at most 400000 Da, and
   a polydispersity ($D = M_{w\text{-}OSAR}/M_{n\text{-}OSAR}$) of at least 5 and at most 100, and
   an oil length of at least 18 and at most 38,
and wherein
the OSAR is the reaction product of at least the following components POC, PAC, MAC, FAC, IOC, and PALC as each of them is defined below, and wherein the OSAR comprises polycondensed residues of at least the following components POC, PAC, MAC, FAC, IOC, and PALC:
   a polyol component (POC) selected from the group consisting of trialcohols, tetralcohols, pentalcohols, hexalcohols and mixtures thereof, and wherein each of the trialcohols, tetralcohols, pentalcohols, and hexalcohols has a theoretical molecular weight of at most 400 Da, and wherein the amount of the polycondensed residue of POC in the OSAR is at least 10 and at most 35 mol %, and
   a polycarboxylic acid component (PAC) selected from the group consisting of $C_8$-$C_{12}$ cycloaliphatic polycarboxylic acids, $C_8$-$C_{12}$ cycloaliphatic polycarboxylic acid anhydrides, $C_{10}$-$C_{16}$ esters of cycloaliphatic polycarboxylic acids, $C_8$-$C_{12}$ aromatic polycarboxylic acids, $C_8$-$C_{12}$ aromatic polycarboxylic acid anhydrides, $C_{10}$-$C_{16}$ esters of aromatic polycarboxylic acids, and mixtures thereof,
   and wherein the amount of the polycondensed residue of PAC in the OSAR is at least 10 and at most 30 mol %, and
   a monocarboxylic acid component (MAC) selected from the group consisting of $C_7$-$C_{11}$ aromatic monocarboxylic acids, $C_8$-$C_{13}$ esters of aromatic monocarboxylic acids, $C_7$-$C_{11}$ saturated cycloaliphatic monocarboxylic acids, $C_8$-$C_{13}$ esters of saturated cycloaliphatic monocarboxylic acids, and mixtures thereof, and wherein the amount of the polycondensed residue of MAC in the OSAR is at least 20 and at most 50 mol %, and
   a fatty acid component (FAC) selected from the group consisting of fatty acids and mixtures thereof, and wherein the FAC comprises ethylenic unsaturations and has an iodine number (ION) as determined by DIN 53241-1, of at least 15 and at most 300 cg/g, and wherein the amount of the polycondensed residue of FAC in the OSAR is at least 1 and at most 30 mol %,
   an ionic component (IOC) selected from the group consisting of aromatic monocarboxylic acid sulfonate salts, aromatic monocarboxylic acid alkyl ester sulfonate salts, aromatic dicarboxylic acid sulfonate salts, aromatic dialkyl ester sulfonate salts, and mixtures thereof, and wherein the amount of the polycondensed residue of IOC in the OSAR is at least 1.2 and at most 3 mol %, and
   a polyalkylene component (PALC) selected from the group consisting of:
   i) polyalkylene glycols A1 according to formula A1 (PG-A1)

(formula A1)

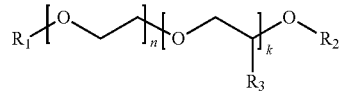

wherein
n is an integer of at least 1 and at most 200, and
k is an integer of at least 0 and at most 50, and
$R_1$ is either H or $CH_3$, and
$R_2$ is selected from the group consisting of H, $CH_3$, and $C_2$-$C_{10}$ optionally substituted hydrocarbyl having at most three substituents each of which is a hydroxyl group, and
$R_3$ is $CH_3$, or a $C_2$-$C_{10}$ hydrocarbyl, and
wherein the formula A1 has at least one and at most four hydroxyl groups, ii) polyalkylene glycols A2 according to formula A2 (PG-A2),

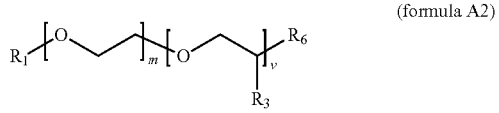

(formula A2)

wherein
m is an integer of at least 1 and at most 100, and
v is an integer of at least 0 and at most 40, and
$R_4$ is either H or $CH_3$, and
$R_5$ is $CH_3$, or a $C_2$-$C_{10}$ hydrocarbyl, and
$R_6$ is selected from the group consisting of H, $CH_3$, and $C_2$-$C_{10}$ optionally substituted hydrocarbyl having at most four substituents selected from the group consisting of hydroxyl and amino groups and at least one of them is a hydroxyl group, and
wherein the formula A2 has at least one and at most four hydroxyl groups, iii) polyether amines A1 according to formula PE1 (PE-A1),

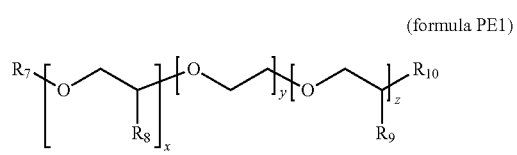

(formula PE1)

wherein
x ranges from 0 up to and including 30, and
y ranges from 1 up to and including 100, and
z ranges from 0 up to and including 30 when x is different than 0, and from 1 up to and including 40 when x is 0, and
$R_7$ is selected from the group consisting of $CH_3$, and $C_2$-$C_{10}$ optionally substituted hydrocarbyl having at most two substituents each of which is an amino group, and
$R_8$ is $CH_3$, or a $C_2$-$C_{10}$ hydrocarbyl, and
$R_9$ is $CH_3$, or a $C_2$-$C_{10}$ hydrocarbyl, and
$R_{10}$ is $NH_2$,
and
iv) mixtures thereof,
and wherein
each of the PG-A1, PG-A2 and PE-A1 has a theoretical molecular weight of at least 500 and at most 5000 Da, and wherein
the amount of the polycondensed residue of PALC in the OSAR is at least 0.01 and at most 1 mol %, and wherein
the sum ($S_1$) of the amounts in mol % of the polycondensed residues of MAC, FAC, IOC and PALC components ($S_1$=$MAC_{mol\ \%}$+$FAC_{mol\ \%}$+$IOC_{mol\ \%}$+$PALC_{mol\ \%}$) in the OSAR, is at least 40 and at most 70 mol %,
and wherein
the ratio ($R_1$) of the amount of the polycondensed residue of MAC in mol % ($MAC_{mol\ \%}$) to the amount of the polycondensed residue of FAC in mol % ($FAC_{mol\ \%}$) ($R_1$=$MAC_{mol\ \%}$/$FAC_{mol\ \%}$) in the OSAR is at least 1 and at most 5,
and wherein
the ratio ($R_2$) of the sum of the amounts in mol % of the polycondensed residues of IOC and PALC components ($IOC_{mol\ \%}$ and $PALC_{mol\ \%}$, respectively) to the amount of the polycondensed residue of FAC in mol % ($R_2$=($IOC_{mol\ \%}$+$PALCmol\ \%$)/$FAC_{mol\ \%}$) in the OSAR, is at least 0.1 and at most 0.5,
and wherein
the ratio ($R_3$) of the sum of the amounts in mol % of the polycondensed residues of PAC and MAC components to the amount of the polycondensed residue of PALC in mol % ($R_3$=($PAC_{mol\ \%}$+$MAC_{mol\ \%}$)/$PALC_{mol\ \%}$) in the OSAR, is at least 150, and at most 1500,
and wherein
the mol % is based on the OSAR.

2. The OSAR as claimed in claim 1, wherein the MAC is selected from the group consisting of $C_7$-$C_{11}$ aromatic monocarboxylic acids, $C_7$-$C_{11}$ saturated cycloaliphatic monocarboxylic acids, and mixtures thereof.

3. The OSAR as claimed in claim 1, wherein the FAC is selected from the group consisting of soybean oil fatty acids, sunflower oil fatty acids, tall oil fatty acids, linseed oil fatty acids, dehydrated castor oil fatty acids, cottonseed oil fatty acids, corn oil fatty acids, tung oil fatty acids, calendula oil fatty acids, safflower oil fatty acids, hemp oil fatty acids, and mixtures thereof.

4. The OSAR as claimed in claim 1, wherein the IOC is selected from the group consisting of aromatic dicarboxylic acid sulfonate salts.

5. The OSAR as claimed in claim 1, wherein the PALC is selected from the group consisting of polyalkylene glycols A1 according to formula A1, polyalkylene glycols A2 according to formula A2, and mixtures thereof.

6. The OSAR as claimed in claim 1, wherein the OSAR is substantially-free of one or any combination of i) to vii): i) polycondensed residues of silanols, ii) polycondensed residues of $C_3$-$C_4$ unsaturated monocarboxylic acids, iii) polycondensed residues of $C_3$-$C_4$ saturated monocarboxylic acids, iv) reacted residue of an acrylic resin, v) reacted residue of a polyurethane resin, vi) reacted residue of a urethane alkyd (uralkyd), and vii) reacted residue of a polysiloxane.

7. The OSAR as claimed in claim 1, wherein the OSAR has:
an acid value of at most 20 mg KOH/g, and
a $M_{n\text{-}OSAR}$ of at least 2000 and at most 7000 Da, and
a $M_{w\text{-}OSAR}$ of at least 20000 and at most 80000 Da, and
a D of at least 8, and
an oil length of at least 20, and wherein
the POC is selected from the group consisting of glycerol, trimethylolpropane, pentaerythritol, dipentaerythritol, and mixtures thereof, and wherein the amount of the polycondensed residue of POC in the OSAR is at least 15 and at most 33 mol %, and
the PAC is selected from the group consisting of isophthalic acid, terephthalic acid, phthalic acid, phthalic acid anhydride, tetrahydrophthalic anhydride, hexahydrophthalic anhydride, and wherein the amount of the polycondensed residue of PAC in the OSAR is at least 10 and at most 30 mol %, and the MAC is selected from the group consisting of $C_7$-$C_{11}$ aromatic monocarboxylic acids, $C_7$-$C_9$ saturated cycloaliphatic monocarboxylic acids, and mixtures thereof, and wherein the amount of the polycondensed residue of MAC in the OSAR is at least 25 and at most 45 mol %, and the FAC has an ION of at least 80 and at most 200 cg/g, and wherein the amount of the polycondensed residue of FAC in the OSAR is least 5 and at most 26 mol %, and the IOC is selected from the group consisting of 5-(sulfo)isophthalic acid sodium salt, 5-(sulfo)isophthalic acid lithium salt and mixtures thereof, and wherein the amount of the polycondensed residue of IOC in the OSAR is at least 1.2 and at most 3 mol %, and the PALC is selected from the group consisting of:
i) polyalkylene glycols A1 according to formula A1 (PG-A1) wherein
  n is an integer of at least 1 and at most 100, and
  k is an integer of at least 0 and at most 10, and
  $R_1$ is either H or $CH_3$, and
  $R_2$ is selected from the group consisting of H, $CH_3$, and $C_2$-$C_{10}$ optionally substituted hydrocarbyl having at most two substituents each of which is a hydroxyl group, and
  $R_3$ is $CH_3$, or a $C_2$-$C_{10}$ hydrocarbyl, and
  wherein the formula A1 has at least one and at most three hydroxyl groups,
ii) polyalkylene glycols A2 according to formula A2 (PG-A2), wherein
  m is an integer of at least 1 and at most 50, and
  v is an integer of at least 0 and at most 20, and
  $R_4$ is either H or $CH_3$, and
  $R_5$ is $CH_3$, or a $C_2$-$C_{10}$ hydrocarbyl, and
  $R_6$ is selected from the group consisting of H, $CH_3$, and $C_2$-$C_6$ optionally substituted hydrocarbyl having at most three substituents selected from the group consisting of hydroxyl and amino groups and at least one of them is a hydroxyl group, and
  wherein the formula A2 has at least one and at most three hydroxyl groups,
iii) mixtures thereof,
and wherein
each of the PG-A1 and PG-A2 has a theoretical molecular weight of at least 800 and at most 2000,
and wherein the amount of the polycondensed residue of PALC in the OSAR is at least 0.2 and at most 0.4 mol %,
and wherein
the $S_1$ is at least 50 and at most 60 mol %,
and wherein
the $R_1$ is at least 1 and at most 4,
and wherein
the $R_2$ is at least 0.1, and at most 0.5,
and wherein
the $R_3$ is at least 150 and at most 1500.

8. A composition (C) comprising:
i) a Binder-C selected from the group consisting of an OSAR as claimed in claim 1, and a mixture of an OSAR with an oxidizing alkyd resin other than the OSAR, and
ii) a drier.

9. A liquid composition (LC) comprising:
i) a Binder-LC selected from the group consisting of an OSAR as claimed in claim 1, and a mixture of an OSAR with an oxidizing alkyd resin other than the OSAR, and
ii) one or both of water and an organic solvent.

10. The liquid composition as claimed in claim 9, wherein the liquid composition is a water-borne composition.

11. The liquid composition as claimed in claim 9 further comprising: iii) a drier.

12. A cured composition (CR-C) obtained upon curing of a composition (C) as claimed in claim 8.

13. A cured composition (CR-LC) obtained upon curing of a liquid composition (LC) as claimed in claim 9.

14. An object or a kit-of-parts comprising:
i) an article, and
ii) an OSAR as claimed in claim 1.

15. A process for making at least one of paints, coatings, polishes, varnishes, inks, adhesives, pastes, compositions suitable for 3D-printing, 3D-printed objects, objects for automotive applications, objects for marine applications, objects for aerospace applications, objects for medical applications, objects for defense applications, objects for sports/recreational applications, objects for architectural applications, objects for bottling applications, objects for household applications, objects for machinery applications, objects for can applications, objects for coil applications, objects for energy applications, objects for textile applications, objects for electrical applications, objects for building and construction applications, objects for packaging applications, objects for telecommunications, and consumer goods, wherein the process comprises including an OSAR as claimed in claim 1.

16. The OSAR as claimed in claim 1, wherein the OSAR is free of one or any combination of i) to vii): i) polycondensed residues of silanols, ii) polycondensed residues of $C_3$-$C_4$ unsaturated monocarboxylic acids, iii) polycondensed residues of $C_3$-$C_4$ saturated monocarboxylic acids, iv) reacted residue of an acrylic resin, v) reacted residue of a polyurethane resin, vi) reacted residue of a urethane alkyd (uralkyd), and vii) reacted residue of a polysiloxane.

17. The OSAR as claimed in claim 1, wherein the $R_1$ is H and the $R_2$ is H; or the $R_1$ is $CH_3$ and the $R_2$ is selected from the group consisting of H, $CH_3$, and $C_2$-$C_{10}$ optionally substituted hydrocarbyl having at most three substituents each of which is a hydroxyl group.

18. The OSAR as claimed in claim 1, wherein the $R_1$ is $CH_3$ and the Reis selected from the group consisting of H, $CH_3$, and $C_2$-$C_{10}$ optionally substituted hydrocarbyl having at most three substituents each of which is a hydroxyl group.

19. The OSAR as claimed in claim 1, wherein the polyalkylene glycols A1 are selected from the group consisting of polyethylene glycols, and the polyalkylene glycol having the following formula:

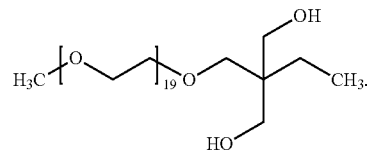

20. The OSAR as claimed in claim 1, wherein the polyalkylene glycol A1 is the polyalkylene glycol having the following formula:

21. The OSAR as claimed in claim 1, wherein the PALC is selected from the group consisting of polyethylene glycols, the polyalkylene glycol having the following formula:

$$H_3C-[O-CH_2CH_2]_{19}-O-C(CH_2OH)(CH_3)-CH_2OH$$

and mixtures thereof.

22. The OSAR as claimed in claim 1, wherein the PALC is the polyalkylene glycol having the following formula:

$$H_3C-[O-CH_2CH_2]_{19}-O-C(CH_2OH)(CH_3)-CH_2OH$$

23. The OSAR as claimed in claim 7, wherein the $R_1$ is H and the $R_2$ is H; or the $R_1$ is $CH_3$ and the $R_2$ is selected from the group consisting of H, $CH_3$, and $C_2$-$C_{10}$ optionally substituted hydrocarbyl having at most three substituents each of which is a hydroxyl group.

24. The OSAR as claimed in claim 7, wherein the $R_1$ is $CH_3$ and the $R_2$ is selected from the group consisting of H, $CH_3$, and $C_2$-$C_{10}$ optionally substituted hydrocarbyl having at most three substituents each of which is a hydroxyl group.

25. The OSAR as claimed in claim 7, wherein the polyalkylene glycols A1 are selected from the group consisting of polyethylene glycols, and the polyalkylene glycol having the following formula:

$$H_3C-[O-CH_2CH_2]_{19}-O-C(CH_2OH)(CH_3)-CH_2OH$$

26. The OSAR as claimed in claim 7, wherein the polyalkylene glycol A1 is the polyalkylene glycol having the following formula:

$$H_3C-[O-CH_2CH_2]_{19}-O-C(CH_2OH)(CH_3)-CH_2OH$$

27. The OSAR as claimed in claim 7, wherein the PALC is selected from the group consisting of polyethylene glycols, the polyalkylene glycol having the following formula:

$$H_3C-[O-CH_2CH_2]_{19}-O-C(CH_2OH)(CH_3)-CH_2OH$$

and mixtures thereof.

28. The OSAR as claimed in claim 7, wherein the PALC is the polyalkylene glycol having the following formula:

$$H_3C-[O-CH_2CH_2]_{19}-O-C(CH_2OH)(CH_3)-CH_2OH$$

29. The OSAR as claimed in claim 1, wherein the OSAR has an acid value of at most 10 mg KOH/g and an oil length of at least 20 and at most 36%.

30. The OSAR as claimed in claim 7, wherein the OSAR has an acid value of at most 10 mg KOH/g and an oil length of at least 20 and at most 36%.

31. The OSAR as claimed in claim 16, wherein the OSAR has an acid value of at most 10 mg KOH/g and an oil length of at least 20 and at most 36%.

32. The OSAR as claimed in claim 17, wherein the OSAR has an acid value of at most 10 mg KOH/g and an oil length of at least 20 and at most 36%.

33. The OSAR as claimed in claim 18, wherein the OSAR has an acid value of at most 10 mg KOH/g and an oil length of at least 20 and at most 36%.

34. The OSAR as claimed in claim 19, wherein the OSAR has an acid value of at most 10 mg KOH/g and an oil length of at least 20 and at most 36%.

35. The OSAR as claimed in claim 20, wherein the OSAR has an acid value of at most 10 mg KOH/g and an oil length of at least 20 and at most 36%.

36. The OSAR as claimed in claim 21, wherein the OSAR has an acid value of at most 10 mg KOH/g and an oil length of at least 20 and at most 36%.

37. The OSAR as claimed in claim 22, wherein the OSAR has an acid value of at most 10 mg KOH/g and an oil length of at least 20 and at most 36%.

38. The OSAR as claimed in claim 23, wherein the OSAR has an acid value of at most 10 mg KOH/g and an oil length of at least 20 and at most 36%.

39. The OSAR as claimed in claim 24, wherein the OSAR has an acid value of at most 10 mg KOH/g and an oil length of at least 20 and at most 36%.

40. The OSAR as claimed in claim 25, wherein the OSAR has an acid value of at most 10 mg KOH/g and an oil length of at least 20 and at most 36%.

41. The OSAR as claimed in claim 26, wherein the OSAR has an acid value of at most 10 mg KOH/g and an oil length of at least 20 and at most 36%.

42. The OSAR as claimed in claim 27, wherein the OSAR has an acid value of at most 10 mg KOH/g and an oil length of at least 20 and at most 36%.

43. The OSAR as claimed in claim 28, wherein the OSAR has an acid value of at most 10 mg KOH/g and an oil length of at least 20 and at most 36%.

\* \* \* \* \*